United States Patent
Moore et al.

(10) Patent No.: US 12,177,180 B2
(45) Date of Patent: Dec. 24, 2024

(54) METHODS AND SYSTEMS FOR EFFICIENT CYBERSECURITY POLICY ENFORCEMENT ON NETWORK COMMUNICATIONS

(71) Applicant: Centripetal Networks, LLC, Portsmouth, NH (US)

(72) Inventors: Sean Moore, Hollis, NH (US); Vincent Mutolo, Portsmouth, NH (US); Alexander Chinchilli, Medford, MA (US); Paul Sprague, North Berwick, ME (US); Christopher T. Rodney, New Ipswich, NH (US); Justin Makoto Leach, Bow, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/672,353

(22) Filed: May 23, 2024

(65) Prior Publication Data
US 2024/0396871 A1    Nov. 28, 2024

Related U.S. Application Data

(60) Provisional application No. 63/547,166, filed on Nov. 3, 2023, provisional application No. 63/468,401, filed on May 23, 2023.

(51) Int. Cl.
*H04L 9/40*    (2022.01)
(52) U.S. Cl.
CPC ...... *H04L 63/0236* (2013.01); *H04L 63/0263* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 11,012,417 B2 | 5/2021 | Moore et al. | |
| 11,159,546 B1 | 10/2021 | Moore et al. | |
| 11,762,826 B2 | 9/2023 | Asai et al. | |
| 11,902,250 B2 * | 2/2024 | Moore | H04L 63/0245 |

(Continued)

OTHER PUBLICATIONS

H. Zhang, et al., "SuRF: Practical Range Query Filtering with Fast Succinct Tries," SIGMOD'18, Jun. 10-15, 2018, Houston, TX, USA.

(Continued)

*Primary Examiner* — Piotr Poltorak
*Assistant Examiner* — Suman Debnath
(74) *Attorney, Agent, or Firm* — Banner & Witcoff, Ltd.

(57) ABSTRACT

Methods, apparatuses, systems, and machine-readable media are disclosed for improving packet filtering efficiency by reducing processing time and/or by reducing memory usage. Any of various types of data structures, such as flat hash maps and/or ruletrees, may be used by a packet filtering appliance to search for cybersecurity policy packet filtering rules that should be applied to in-transit packets. The packet filtering appliance may search the index data structures for matches of search objects, in the form of values that the packet filtering appliance extracts from in-transit packets, to threat indicator matching criteria of the policy rules. Each of the index data structures may map rule identifiers (rule IDs) of policy rules to keys that are based on (or that comprise) the matching criteria of those rules.

30 Claims, 31 Drawing Sheets

(56) References Cited

U.S. PATENT DOCUMENTS

| | | | |
|---|---|---|---|
| 2021/0049207 A1* | 2/2021 | Cao | H04L 63/101 |
| 2021/0297263 A1* | 9/2021 | Mutnuru | H04L 9/50 |
| 2023/0353597 A1* | 11/2023 | Ratzloff | H04L 63/1425 |
| 2024/0007437 A1 | 1/2024 | Moore et al. | |

OTHER PUBLICATIONS

V. Leis, et al., "The Adaptive Radix Tree: ARTful Indexing for Main-Memory Databases," 2013 IEEE 29th International Conference on Data Engineering (ICDE).

H. Asai, et al., "Poptrie: A Compressed Trie with Population Count for Fast and Scalable Software IP Routing Table Lookup," ACM SIGCOMM Computer Communication Review, vol. 45, No. 4, pp. 57-70, 2015.

T. Stimpfling, et al., "SHIP: A Scalable High-performance IPv6 Lookup Algorithm that Exploits Prefix Characteristics," IEEE/ACM Transactions on Networking (vol. 27, Issue: 4, Aug. 2019).

Morrison, D. "PATRICIA—Practical Algorithm to Retrieve Information Coded in Alphanumeric," Journal of the Association for Computing Machinery, vol. 15, No. 4, Oct. 1968, pp. 514-534.

D. Jiang, et al., "Heuristic Binary Search: Adaptive and Fast IPV6 Route Lookup with Incremental Updates," APNET '23: Proceedings of the 7th Asia-Pacific Workshop on Networking, Jun. 2023, pp. 47-53.

\* cited by examiner

METHODS AND SYSTEMS FOR EFFICIENT CYBERSECURITY POLICY ENFORCEMENT ON NETWORK COMMUNICATIONS

CROSS-REFERENCE TO RELATED APPLICATIONS

This application claims priority to U.S. provisional patent application Ser. No. 63/547,166, filed Nov. 3, 2023, and also claims priority to U.S. provisional patent application Ser. No. 63/468,401, filed May 23, 2023. Each of application Ser. No. 63/547,166 and application Ser. No. 63/468,401, in its entirety, is incorporated by reference herein.

BACKGROUND

Inclusion of any statement in this Background should not be treated as an admission that any system, device, method, or other feature described or referenced by such statement is prior art, nor as an admission that such statement reflects common knowledge or knowledge of persons skilled in the art.

Network security is becoming increasingly important as the information age continues to unfold. Network threats/attacks may take a variety of forms (e.g., unauthorized requests or data transfers, viruses, malware, large volumes of traffic designed to overwhelm resources, and the like).

To counter these kinds of threats and attacks, various cyber defense methodologies and systems have been developed and deployed. One variety of cyber defense system uses packet security gateways to protect networks from threats/attacks. A packet security gateway may comprise a network packet filtering device (e.g., an inline, non-endpoint device) that mediates data transmission between communication endpoints with a capability to apply an ordered list of packet filtering rules, which may represent and/or be comprised by a network protection policy, to in-transit TCP/IP packets, to enforce the policy and thereby protect a network. When the packet-matching criteria of the packet filtering rules of the policy are derived from cyber threat intelligence (CTI), then the packet security gateway may be called a threat intelligence gateway (TIG), and the policy may be called a cybersecurity policy. The TIG may act as a gateway, or interface, between a network that is being protected, or secured, by CTI (for example, a private enterprise network connected to the Internet) and a network that is not similarly secured/protected (for example, the Internet). Accordingly, a TIG or TIGs may be located at the boundary or boundaries between the networks.

The packet filtering rules may be derived from databases of threat indicators supplied by sources of CTI, such as CTI provider organizations. The ordered list of packet filtering rules may represent a TIG-enforced cybersecurity policy for securing/protecting a network. Threat indicators may be used as the rules' packet-matching criteria to identify packets associated with threats. Threat indicators, which may be indicators supplied by CTI providers or other CTI sources, may comprise Internet network addresses (which may be in the form of IP addresses, IP address ranges, IP subnet addresses represented in Classless Inter-Domain Routing (CIDR) notation, combinations of L3 IP addresses with L4 ports and L3 protocol types (e.g., "5-tuples"), domain names, Uniform Resource Identifiers (URIs, for example, Uniform Resource Locators (URLs) and Uniform Resource Names (URNs), and the like) of networked resources, for example network host computers, that may be controlled or operated by threat actors, or that may otherwise be associated with malicious activity. Note that at the present time of disclosure, URIs in CTI are typically URLs (and not URNs). Threat indicators may also comprise identifiers for certificates and associated certificate authorities that are used to secure some TCP/IP communications (e.g., X.509 certificates used by the Transport Layer Security (TLS) protocol to secure communications, for example, Hypertext Transfer Protocol (HTTP)-mediated sessions). In the cybersecurity context, threat indicators may also comprise geoIP information, which associates IP addresses to geographic locations and may comprise geopolitical information such as countries and cities. An in-transit packet may be said to "match" a "CTI-derived" packet filtering rule, or CTI-derived rule, when any of the packet's field values that correspond to IP addresses, 5-tuples, domain names, URIs, certificate identifiers, certificate authorities, and the like, match the threat indicators, or matching criteria, comprised by that packet filtering rule. A CTI-derived cybersecurity policy (or CTI-derived policy), which may comprise a list of CTI-derived packet filtering rules, may be enforced by a TIG.

CTI providers may associate threat metadata with each threat indicator, which may comprise, for example, the threat/attack type, the threat name, the threat risk score and/or a confidence level, the threat actor (attribution), and the like. Furthermore, CTI providers may provide information services for looking up the threat intelligence reports associated with a threat indicator. A TIG and associated applications may use the threat metadata and other threat intelligence information to further increase protections from threats and further improve network security posture.

A network security policy manager may create a CTI-derived network protection/cybersecurity policy as an ordered list of CTI-derived packet filtering rules by receiving threat indicators and associated threat metadata from one or more CTI providers and generating packet filtering rules based on the indicators and metadata. Each packet filtering rule may comprise (a) criteria for matching packet data, such as one or more threat indicators, (b) an action or combination of actions, including a dispositive action of block/drop/deny the packet or allow/forward/pass the packet, to be applied to the packet if there is a match with the criteria, and (c) metadata associated with the threat indicator(s). In general, packet filtering devices typically enforce a policy on an (in-transit) packet by applying any matching packet filtering rules to the packet in the order that the rules are stored in the list. A packet filtering rule may match a packet if the criteria of the rule match values in one or more fields of the packet that correspond to the criteria. Within a policy, each packet filtering rule may be associated with a rule identifier, which may be unique relative to other rules within the policy. Rule identifiers may be associated with a rank, or rank order, that may indicate the ordering of application of a set of rules to a packet, e.g., a higher-ranked rule may be applied to a packet before a lower-ranked rule may be applied to a packet. In some contexts, the rule identifier may correspond to the rank, or rank order, of the rule in the ordered list of rules comprising the policy. For example, the rule at the head, or front, of the list may have the highest rank order, and the rule at the end of the list may have the lowest rank order. The rank order of the rules in the list/policy may correspond to the order in which a TIG may apply matching rules to in-transit packets. The matching criteria of each rule may comprise one or more pairs comprised of a packet field name (e.g., the L3/Internet-layer destination IP address field) and the field value. The field(s) value(s) may be one or more threat indicators in the form of a network address (for example, an IP address, IP address range, 5-tuple, domain name, URI, and the like) or an identifier for a certificate or a certificate authority. The action or combination of actions may comprise some combination of blocking/dropping/denying the packet, allowing/forwarding/passing the packet, logging the packet, capturing the packet, re-directing or re-routing the packet, modifying or transforming the packet in some way to protect the network, and the like. In the context of TIGs and CTI-derived policies, a rule action may be called a packet transformation function (PTF), which may transform a packet in such a way as to protect the network. Multiple rule actions/PTFs may be combined to further protect the network and may be applied sequentially or concurrently or both. For example, a rule action/PTF may block a TCP SYN packet that may be initiating a connection setup with a threat endpoint but also transform the TCP SYN packet into a corresponding TCP RST packet that may be sent to the sender of the TCP SYN packet in order to halt the connection setup process, which for example may halt an attack that may be associated with the threat and thereby protect the associated network. Another rule action/PTF may create a log of the TCP SYN packet, and the log may be packetized and sent to a network protection application. For another example, a PTF may transform a packet that is blocked/dropped into a null, which may similarly protect the network. The threat metadata may be used, for example, to signal a (human or machine) cyber analyst to the location of the associated cyber threat intelligence report, to compute a threat risk score, to select a threat analysis methodology to be applied to the packet and the communications associated with the packet, to select or compute the action(s) to be applied to the packet in accordance with the threat risk, etc.

One or more TIGs may be inserted inline with, for example, one or more of the (protected) network's Internet access links. A policy manager associated with one or more TIGs may be configured to (a) receive CTI (e.g., threat indicators and associated metadata) from one or more CTI providers; (b) generate one or more (network protection/cybersecurity) policies comprised of packet filtering rules derived from the threat indicators and metadata; and (c) download the one or more policies or transfer the one or more policies into one or more (subscribing) TIGs, which may be associated with the policy manager by a policy subscription. The TIGs may be configured with the policies and may then enforce the policies by applying the associated packet filtering rules to each in-transit packet as the packet traverses an Internet access link (in either direction). If a match is found between a rule and an in-transit packet, the rule's action(s) may be applied to the packet in order to protect the network (according to the associated policy).

CTI providers may update the CTI they provide to their subscribers, for example, by adding or deleting threat indicators comprising existing CTI feeds, providing new CTI feeds, or deleting existing CTI feeds. Accordingly, a subscribing policy manager that may be providing/distributing CTI-derived policies to TIGs may update the policies with the updated CTI and distribute the updated policies to TIGs. Upon receiving an updated policy, a TIG may process the updated policy for efficient enforcement and then swap the updated policy with the existing policy being enforced. The policy updating, processing, and swapping cycle may be done on a regular basis, for example, every 15 minutes, in accordance with the rate of updates to CTI by the CTI providers.

The effectiveness of protecting networks using TIGs and associated CTI is often a function of the scope and quality of the threat indicators and metadata and associated packet filtering rules being applied by the TIG, and of the performance of the TIG. At the present time of disclosure, in aggregate there are hundreds of millions of threat indicators (and associated threat metadata) available from multiple sources of CTI, for example hundreds of CTI providers, with the threat indicators being in the form of IP addresses, IP address ranges (for example, which may be represented in CIDR notation), 5-tuples, domain names, URIs, and the like, as well as certificate identifiers, certificate authority identifiers, and the like. These large databases of threat indicators may be translated into a similar or corresponding number of packet filtering rules. Because the threat indicators that may be observed in a given network's communications traffic may not be known before they are observed, all available CTI or associated packet filtering rules may be applied by a TIG at any time to ensure effective protections. At the present time of disclosure, in aggregate the CTI providers may be supplying several hundreds of millions of threat indicators; accordingly, TIG policies may be composed of millions, tens of millions, or even hundreds of millions of rules. Given CTI growth trends, the threat indicators available from CTI providers may soon number in the billions, and thus TIG policies may soon include billions of packet filtering rules. Accordingly, the TIG must be capable of applying the many millions of packet filtering rules to each in-transit packet without adversely impacting network performance, for example, without incurring more than a few microseconds of latency and without dropping packets because of, for example, in-transit packet buffer overflows (which may be caused by latencies being too large). Additionally, as the available CTI and associated TIG policies grow, a TIG's main memory, or space, requirements for policy enforcement logic may also grow.

At the present time of disclosure, 100 Mb, 1Gb, 10Gb and/or 40/100Gb network links typically may be used at TIG insertion points, which means that packet transmission rates may be millions or tens of millions of packets per second. The TIG must filter each in-transit packet through the many millions of rules in order to enforce a policy, without adversely affecting network performance. With such large policies and high packet rates, even when the policies and associated logic can be stored in main memory, and even when fast (e.g., sublinear) policy search algorithms are used, TIG performance may be insufficient and may result in unacceptable performance degradations. For example, high latencies may result in packet drops due to packet buffer overflows. The latency incurred during packet filtering should be low and packets should not be dropped (e.g., due to buffer overflows).

A TIG may be designed, architected, and configured to achieve the necessary performance for enforcement of CTI-derived policies, where TIG performance may be measured by the time and (main) memory, or space, required to enforce a policy on in-transit packets, by some combination of (a) high-performance central processing units (CPUs) and associated computer platforms, which may be architected and/or configured for network packet processing, in combination with software development kits (SDKs) designed to exploit a CPU's architecture and resources (e.g., multithreading, multicores, high-performance registers and caches), to maximize packet processing performance; (b) fast/efficient algorithms and associated time- and space-efficient data structures for searching the rules for matches between the rules' indicators/matching criteria and the current in-transit packet's corresponding field values; and (c) storing the policy (which may include many millions of packet filtering rules) and associated policy enforcement logic in high-speed local memory (for example, on-board SDRAM, which is often called "main memory") so that the CPU(s) may access the main memory quickly via a high-speed, high-bandwidth data bus.

At the time of the present disclosure, with regard to (a) above, there are multiple available CPUs/processors, for example the x86 family, the ARM family, and the PowerPC family, that may be integrated with computer platforms and combined with SDKs, such as the Data Plane Development Kit (DPDK), in order to support a TIG's network packet processing requirements. With regard to (b) above, fast/efficient algorithms and associated data structures for searching for matching rules in a policy, as described in U.S. Pat. No. 11,012,417 ("the '417 patent") (incorporated by reference herein), may support a TIG's policy search requirements. With regard to (c) above, the '417 patent describes methods, algorithms, and data structures, for example efficient probabilistic set data structures (e.g., Bloom filters, Cuckoo filters, and the like), for reducing a policy's memory requirements relative to policy size such that (large) CTI-derived policies may be stored in a TIG's available main memory and enforced on network packet traffic while meeting latency or packet filtering rate requirements.

However, some current trends in cyber threat intelligence and network protections, including continual fast growth in the volume and diversity of CTI, new/emerging threats, new/emerging threat indicator types (e.g., IPv6 indicators, base/registrable domain names), faster link speeds, higher network traffic rates, etc., may cause the existing methods, algorithms, and data structures to be insufficient for satisfying the requirements for enforcing modern/future CTI-derived policies on network packet communications. It is often impractical to overcome the insufficiencies, for example, by significantly increasing CPU/processor speeds and resources and/or by significantly increasing main memory. The adverse effects of these insufficiencies may include reduced effectiveness of, or gaps in, network protections from the global cyberthreat.

Thus, there is a need for new technology (e.g., new and more efficient methods, algorithms, and data structures) for enforcing comprehensive CTI-derived policies on network communications while satisfying performance requirements but without requiring significant increases in TIG computer resources.

SUMMARY

This Summary is provided to introduce a selection of some concepts in a simplified form as a prelude to the Detailed Description. This Summary is not intended to identify key or essential features.

Using one or more of a variety of index data structures disclosed herein, a packet filtering appliance may efficiently search packet filtering rules of a cybersecurity policy for rules that should be applied to in-transit packets. The packet filtering appliance may search the index data structures for matches of search objects, in the form of values that the packet filtering appliance extracts from the in-transit packets, to threat indicator matching criteria of the policy rules. The extracted values and the matching criteria may, for example, comprise IP addresses (or portions thereof), domain names (or portions thereof), URIs (or portions thereof), and/or other types of values. Each of the index data structures may map keys, that are based on (or that comprise) the matching criteria of policy rules, to rule identifiers (rule IDs) of those policy rules.

The index data structures may comprise flat hash maps that map keys that comprise hashes of threat indicators, from matching criteria of policy rules, to rule IDs of those policy rules. The flat hash maps may be efficiently searched and/or stored by a packet filtering appliance. The hashes may comprise hashes of less than all portions of a value that may be found in in-transit packets. For example, a flat hash map may map a hash of a threat indicator, from matching criteria of a policy rule and that comprises a top-level domain (TLD) and one or more sub-domains below the TLD, to a rule ID of that policy rule. However, that threat indicator may not comprise all of the subdomains that may be found in fully qualified domain names (FQDNs) extracted from in-transit packets. As another example, a flat hash map may map a hash of a threat indicator, from matching criteria of a policy rule and that comprises less than all path segments that may be found in URLs extracted from in-transit packets, to a rule ID of that policy rule. When searching a flat hash map associated with such threat indicators, a domain name, URL, or other value extracted from an in-transit packet may be incrementally hashed, and the flat hash map may be searched for the incrementally hashed portions of the domain name, URL, or other value.

The index data structures may comprise flat hash maps that map keys that comprise compressions (e.g., lossless compressions) of threat indicators, from matching criteria of policy rules, to rule IDs of those policy rules. Such flat hash maps may also be efficiently searched and/or stored by a packet filtering appliance. The compressions may comprise compressions of less than all portions of a value that may be found in in-transit packets. For example, a flat hash map may map a compression of a threat indicator, from matching criteria of a policy rule and that comprises a TLD and one or more sub-domains below the TLD, but that may not comprise all of the subdomains that may be found in FQDNs extracted from in-transit packets, to a rule ID of the policy rule. As another example, a flat hash map may map compressions of a threat indicator, from the matching criteria of a policy rule and that comprises less than all path segments that may be found in URLs extracted from in-transit packets, to a rule ID of the policy rule. When searching a flat hash map associated with such threat indicators and compressions, a domain name, URL, or other value extracted from an in-transit packet may be incrementally compressed, and the flat hash map may be searched for the incrementally compressed portions of the domain name, URL, or other value.

The index data structures may comprise ruletrees that map bit string representations of threat indicators (e.g., IP addresses), from matching criteria of policy rules, to rule IDs of those policy rules. The ruletrees may be efficiently searched and/or stored by a packet filtering appliance and may facilitate dynamic runtime updating. A ruletree may comprise multiple levels of internal nodes that may be searched based on successive k-bit chunks of a search object. During a search, at any internal node of a ruletree, multiple rule IDs may be added to a list comprising search results based on a match of a k-bit chunk of a search object to associated values/rule IDs associated with the internal node. A search of a ruletree may continue after a first match and associated rule IDs are found, and other matches and associated rule IDs may be found at other internal nodes in deeper levels of the ruletree based on additional portions/chunks of the search object.

Searches of the index data structures described herein may be combined with membership testing based on searches of set data structures. Prior to searching an index data structure, a search object may be used to search a set data structure to determine if that search object (or a portion thereof, or a value based on the search object or a portion thereof) is a member of the set of all keys represented in any of the threat criteria-to-rule ID mappings of an associated index data structure. If that search object (or a portion thereof, or a value based on the search object or a portion thereof) is a member of that set, the search of the index data structure may proceed. If that search object (or a portion thereof, or a value based on the search object or a portion thereof) is not a member of that set, the search of the index data structure may be unnecessary and may be omitted, thereby saving processing time. Alternatively, searches of a set data structure and of an associated index data structure may be performed concurrently. If search of the set data structure indicates that a search object (or a portion thereof, or a value based on the search object or a portion thereof) is not a member of the set of all keys represented in the associated index data structure, the search of the associated index data structure may be terminated before completion, thereby conserving processing resources.

Index data structures may be selected for each of multiple types of threat indicators (e.g., a first type of threat indicator comprising URLs, a second type of threat indicator comprising domain names, a third type of threat indicator comprising first types of IP addresses, a fourth type of indicator comprising second types of IP addresses, etc.), thereby facilitating more efficient use of processing and memory resources. Multiple instances of a particular type of data structure may be used for a particular type of threat indicator (e.g., one instance for threat indicators of a particular type but that share a first common characteristic, another instance for threat indicators of that particular type but that share a second common characteristic) or for different types of threat indicators (e.g., a first ruletree for IPv4 threat indicators and a second ruletree for IPv6 threat indicators). Alternatively, multiple instances of different types of index data structures may be used for a particular type of threat indicator. A single data structure instance may be used for multiple types of threat indicators (e.g., a single flat hash map may be used for domain name threat indicators and for URL threat indicators). A packet filtering appliance may simultaneously search, using multiple concurrent processing threads, multiple index data structures based on different values extracted from an in-transit packet. Each of those concurrent processing threads may output one or more rule IDs determined based on the index data structure search performed in that processing thread (or may determine that the search found no rule IDs). Rule IDs, if any, determined in each of the processing threads may be collected, and rules corresponding to some or all of those rules IDs may be applied to the in-transit packet based rank/priority of those rules.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Aspects described herein generally relate to computer hardware and software and to network security. In particular, one or more aspects of the disclosure generally relate to computer hardware and software for efficient filtering of in-transit packets based on packet filtering rules derived from cyber threat intelligence (CTI). Disclosed herein are methods, apparatuses, systems, and machine-readable media that may, for example, relate to efficient packet filtering for CTI-based applications, including enforcement of CTI-derived cybersecurity policies on in-transit packets by TIGs. The herein-disclosed methods, apparatuses, systems, and machine-readable media may facilitate improved packet filtering efficiency, and may comprise improvements relating to processing time and/or memory usage.

In this detailed description, reference is made to the accompanying drawings, which form a part hereof, and in which are shown various examples in which aspects of the disclosure may be practiced. It is to be understood that practice of the disclosure may take other forms, and that structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect (e.g., connected via one more networks), wired or wireless, physical or logical (e.g., virtual or software-defined), in any combination.

Figure 1:
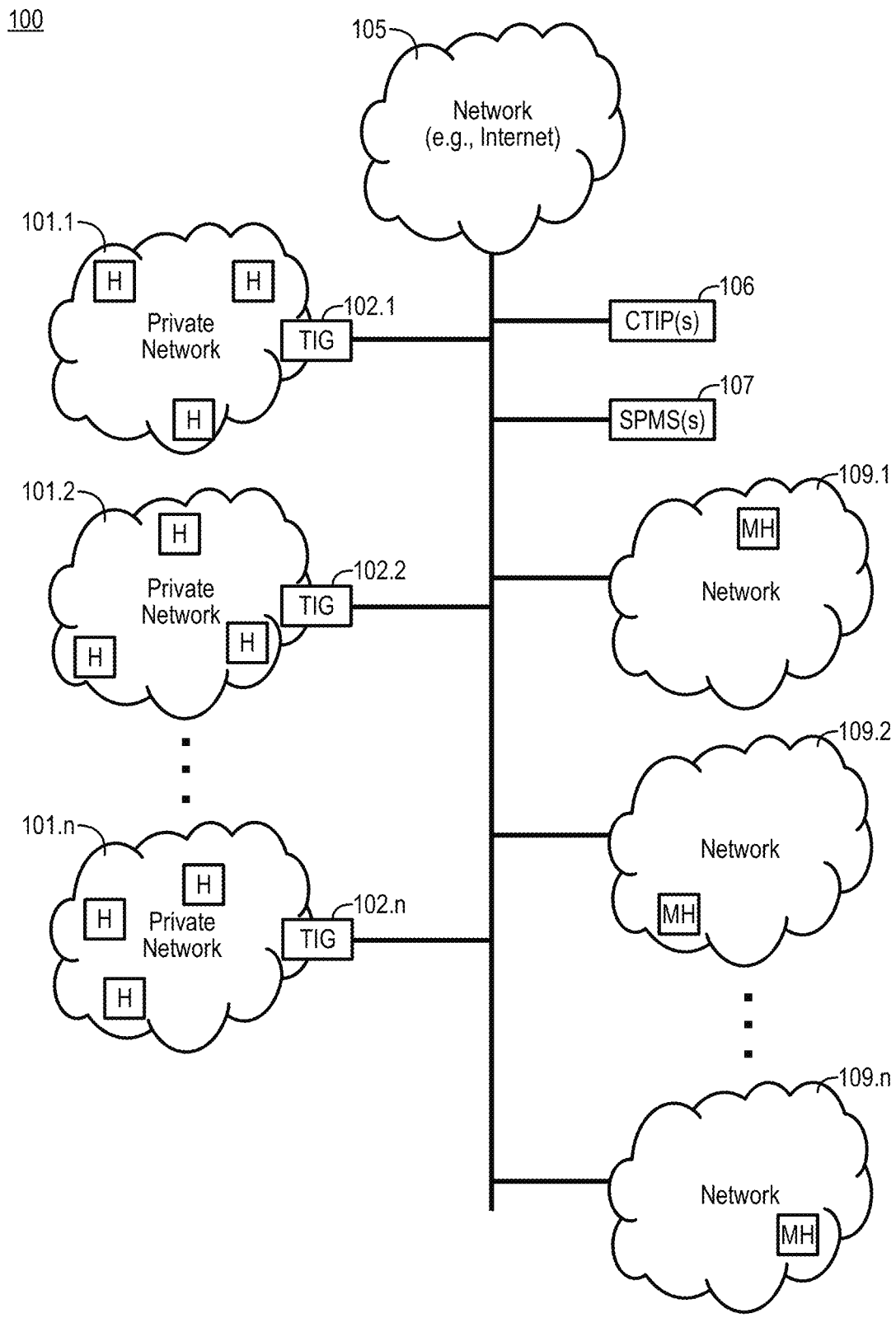
FIG. 1 shows an example network environment for efficient cybersecurity policy enforcement.

FIG. 1 shows an example network environment 100 for more efficient cybersecurity policy enforcement, and in which some or all aspects of the present disclosure may be implemented. The network environment 100 comprises a plurality of private networks 101.1-101.$n$, where "n" may be an arbitrary integer value. An arbitrary one of networks 101.1-101.$n$ may be referred to as a network 101, and the networks 101.1-101.$n$ may be collectively referred to as networks 101. A similar convention will be used for other sets of similarly numbered elements in the drawings.

Each of the networks 101 may, for example, be an enterprise network comprising one or more packet filtering devices that enforce one or more cybersecurity policies using one or more methods described herein. In the network environment 100, the network 101.1 comprises a TIG 102.1 at a boundary between the network 101.1 and a network 105, the network 101.2 comprises a TIG 102.2 at a boundary between the network 101.2 and the network 105, and the network 101.$n$ comprises a TIG 102.$n$ at a boundary between the network 101.$n$ and the network 105. The network 105 may, for example, be a public and/or unprotected network such as the Internet. The TIGs 102 (which may also or alternatively be configured as a gateway or other interface) may be configured so that all traffic between protected networks 101 and unprotected networks (such as the network 105) must transit a TIG 102, thereby securing data communications across boundaries between the networks 101 and unprotected networks. The network environment 100 may further comprise one or more CTI providers (CTIP(s)) 106 and one or more Security Policy Management Servers (or Services) (SPMS(s)) 107 connected to the network 105. The network environment 100 may also include one or more additional networks 109.1-109.$n$ that are connected to the network 105. Although shown for convenience in FIG. 1 as directly connected to the network 105, the CTIP(s) 106 and SPMS(s) may be hosts within other networks connected to the network 105. The network environment 100 may comprise other types of computing devices connected to the network 105 (or as part of a network connected to the network 105), e.g., Domain Name System (DNS) servers/devices, Security Operations Center (SOC) servers/devices, Global Threat Context Servers (GTCS), and/or other devices.

The networks 101 may comprise hosts H (e.g., servers, laptop or desktop computers, and/or other networked computing devices) that are configured to communicate, via the network 105, with hosts in the network 105 or networks connected to the network 105. Some hosts in the network 105 and/or in networks connected to the network 105 may be malicious. For example, the networks 109 may comprise malicious hosts MH that may instigate, support, or otherwise be associated with one or more types of network threats or attacks. To detect, prevent, stop, and/or otherwise take action regarding such network threats/attacks, each of TIGs 102 may filter data traffic (incoming and outgoing) between hosts H in a network 101 and hosts outside that network 101. Although TIGs 102 are used herein as examples of packet-filtering appliances configured to carry out operations described herein, other types of packet-filtering appliances may also or alternatively be configured to carry out operations described herein for TIGs.

The CTIP(s) 106 may continually identify threats or potential threats associated in the network 105 (or in networks accessible via the network 105), create threat intelligence reports on the threats/potential threats, determine indicators associated with the threats/potential threat, and publish (e.g., stream) lists, or feeds, of the threat indicators. The SPMS(s) 107 may receive the feeds from the CTIP(s) 106, may create rules based on the threat indicators from the feeds and combine those rules into policies, may output those policies to the TIGs 102, may generate (e.g., based on additional feeds from the CTIP(s) 106) and output policy and/or rule updates to the TIGs 102, and/or may otherwise manage or control policy-related functions of the TIGs 102. The SPMS(s) 107 and/or the TIGs may also, as further described herein, determine index data structures to be used for mapping search keys (e.g., corresponding match criteria from rules) and rule identifiers, determine set (e.g., membership-test) data structures for determining whether a set of rules include criteria that would match a particular value, populate index and set data structures, and/or perform other operations.

Each TIG 102 may receive the policies/updates, may store the policies/updates, and/or may filter packet traffic based on packet filtering rules of those policies/updates. The traffic may comprise in-transit packets being transmitted from (or to) host(s) H, of a network 101 protected by that TIG 102, to (or from) external hosts outside of that network 101 (e.g., a host in the network 105 or in another network connected to the network 105). Packet filtering rules may comprise packet matching criteria having one or more pairs comprising a packet field name and a value that is based on one or more threat indicators. Examples of threat indicators may include, without limitation, IP addresses, IP address ranges, IP subnet addresses represented in CIDR notation, combinations of L3 IP addresses with L4 ports and L3 protocol types (e.g., "5-tuples"), domain names or portions of domain names, URIs (e.g., URLs or URNs) or portions of URIs, identifiers for certificates and/or associated certificate authorities, geoIP information, and/or other types of threat indicators. A packet matching criteria value based on a threat indicator may comprise a value of that indicator (or a portion of the indicator value) and/or a value that is derived from the indicator value (or a portion thereof). Packet-matching criteria of a packet filtering rule may match a packet if the packet comprises, in a field or fields indicated by the criteria, a value that matches (either directly or after hashing or other processing) the value of the criteria, or that is within a range indicated by the value of the criteria. If a packet matches one or more packet-matching criteria of a rule, the TIG 102 may perform one or more actions specified by the rule (e.g., blocking/dropping/denying the packet, allowing/forwarding/passing the packet, logging the packet, capturing the packet, re-directing or re-routing the packet, modifying or transforming the packet in some way to protect the network, generating and/or sending a response to the packet, etc.).

As part of filtering packet traffic, and to determine if a policy comprises rules with packet-matching criteria that may match a packet, a TIG 102 may perform one or more of the methods described herein. Those methods may comprise searching a set data structure to determine membership, in an associated index data structure for policy rules, of a value that matches a value based on a field of a packet. A value based on a packet field (packet field-based value or field-based value) may comprise an actual value (or portion of an actual value) in that field and/or may comprise a value (e.g., a hash or compressed data value) that has been derived from the actual value in that field (or from a portion of that actual value). The methods performed by a TIG 102 may also or alternatively comprise searching the associated index data structure for a value that matches a field-based value and, if a matching value is found, determining a rule identifier that corresponds to that matching value. As also described herein, searching of a set data structure may be omitted, and/or may occur prior to, or concurrently with, searching an index data structure associated with that set data structure.

A TIG 102 may filter a large quantity of packets based on a large quantity of policies and rules. But in practice, typically only a small fraction of in-transit packets filtered by a TIG 102 will match any CTI-derived packet-filtering rule in a TIG-enforced cybersecurity policy. Thus, time-efficient and space-efficient methods for determining if an in-transit packet will match any rule (or not) in the cybersecurity policy before searching (or not) through the rules of the security policy for a matching rule may eliminate a large number of the policy searches, and thus may reduce the average or expected time to filter packets.

Set data structures with time- and/or space-efficient set operations for inserting elements into a set, deleting elements from a set, and testing elements for membership or existence in a set may support such methods. Each CTI-derived packet-filtering rule of a policy may be characterized by the one or more threat indicators that comprise the rule's packet-matching criteria. For each CTI-derived rule in a policy, the associated threat indicators (or values based on the threat indicators) may be inserted as elements into one or more set data structures. When filtering an in-transit packet, the TIG 102 may first perform a membership test to determine if the packet matches any rule(s) in the policy before searching the policy by testing if values based on any of the packet's field values that correspond to threat indicator values (e.g., IP addresses, 5-tuples, domain names, URIs, certificate identifiers, certificate authorities, and the like) are members of or exist in the set data structure(s). If the membership/existence test returns True, then the policy search of an associated index data structure may proceed; otherwise (i.e., the membership/existence test returns False), the policy search may be omitted and the TIG 102 may immediately send the packet towards its destination.

If the membership/existence tests are on-average/expected to be significantly faster than a search through an associated policy index data structure, then expected policy search time per packet may be significantly reduced when averaged over a sufficiently large amount of representative packet traffic. Furthermore, overall packet filtering time may be further reduced by initiating and executing the membership/existence test(s) at the same time or otherwise concurrently with the policy search instead of waiting for the membership/existence test to complete before initiating policy search. If the membership test returns True, then the policy search will complete earlier (by some time amount comparable to the time to execute the membership test). If the membership test returns False, then the policy search may be abandoned or otherwise ignored (and, for example, the TIG 102 may immediately send the packet towards its destination without waiting for the policy search to complete).

In addition to supporting fast/time-efficient membership/existence tests, the associated set data structures may also support space-efficiency, for example, memory requirements for storing a set's elements may be relatively small and may grow slowly, for example sub-linearly or by a small constant, when elements are added to/inserted into the set. Data compression techniques may also be useful for controlling memory requirements, but often must be balanced against time-efficiency. Furthermore, the type of set data structure for membership/existence testing may be different depending on the type of threat indicator. For example, for IPv4 addresses, which may be represented as 32 bits (and which allows for $2^{32}$ possible IPv4 addresses), a bit array of length/size $2^{32}$ bits (which requires 4 Gbits, or 512 MBytes, of memory) may be a good choice of set data structure because it may support very fast element insertions, element deletions, and element membership tests. Each bit of such an array would correspond to a different one of the $2^{32}$ possible IPv4 addresses, and may hold a value (e.g., 1) indicating that the corresponding IPv4 address is part of a set (e.g., a set of IPv4 addresses that are part of matching criteria of policy rules) or a value (e.g., 0) indicating that the corresponding IPv4 address is not part of the set. To insert (resp. delete) an IPv4 address into (resp. from) the set, the array's bit value at the index, or location, corresponding to the IPv4 address' 32-bit representation may be set to 1 (resp. 0). Similarly, a membership test for an IPv4 address/element may be to read the bit value at the index, or location, of the array corresponding to the IPv4 address' 32-bit representation and return True if the bit value is 1 and False if the bit value is 0.

Although the bit array set data structure for IPv4 addresses may be time-efficient and space-efficient for relevant applications (for example, cybersecurity policy enforcement by TIGs), it may not be so for other types of threat indicators. For example, IPv6 addresses, which have a 128-bit representation, correspondingly would use a bit array of length/size $2^{128}$ bits, which may be impractically large (and therefore not space-efficient). A bit array set data structure may still be used effectively for IPv6 addresses, however. For example, a bit array of length/size $2^{32}$ bits (which requires 4 Gbits, or 512 MBytes, of memory) may be allocated, and to insert an IPv6 address/element into the bit array/set, the array's bit value at the index, or location, corresponding to the IPv6 address' /32 prefix bit representation (i.e., the IPv6 address' most significant 32 bits) may be set to 1. Similarly, a membership test for an IPv6 address/element may be to read the bit value at the index, or location, of the array corresponding to the IPv6 address' /32 prefix bit representation and return True if the bit value is 1 and False if the bit value is 0. However, IPv6 addresses in such a bit array may result in performance downgrades, such as element membership searches returning a non-zero false positive rate and inability to dynamically delete IPv6 addresses from the bit array.

Note that the above-described adaptation of the element membership test for IPv6 address prefixes may be applied to IPv4 addresses to reduce memory requirements. For example, for IPv4 addresses, if the 2^32-bit array for membership testing of full IPv4 addresses (which requires 4 Gbits, or 512 MBytes, of memory) is considered too large, then a smaller array may be used instead by storing elements corresponding to IPv4 address prefixes. For example, a bit array of length/size 2^30 bits (which requires 1 Gbit, or 128 MBytes, of memory) may be allocated, and to insert an IPv4 address/element into the bit array/set, the array's bit value at the index, or location, corresponding to the IPv4 address' /30 prefix bit representation (i.e., the IPv4 address' most significant 30 bits) may be set to 1. Similarly, a membership test for an IPv4 address/element may be to read the bit value at the index, or location, of the array corresponding to the IPv4 address' /30 prefix bit representation and return True if the bit value is 1 and False if the bit value is 0. An IP address may be a full IP address or a partial IP address. A full IP address may be an IP address that is represented by all 32 bits (IPv4) or 128 bits (IPv6). In CIDR/prefix notation, a full IP address may be represented as a /32 (IPv4) or /128 (IPv6) address. A partial IP address may comprise an IP address prefix, which is an IP address represented by 32 bits or less (IPv4) or by 128 bits or less (IPv6), where the missing bits are the least-significant bits. IP address prefixes may be denoted as /X, where X may be a number that is 32 or less (IPv4) or 128 or less (IPv6), and "X" refers to the X most-significant bits (MSBs) of the IP address. IP address prefixes may be associated with subnet addresses.

For other types of threat indicators, such as domain names and URIs, the bit array set data structure may be similarly inefficient and may not have a straightforward mapping from the threat indicators to bit array indices. Thus, other types of set data structures may be used for performing membership/existence tests. For example, the '417 patent describes methods, algorithms, and data structures, for example efficient probabilistic set data structures (e.g., Bloom filters, Cuckoo filters, and the like), that may be used for performing membership/existence tests for domain name and URI threat indicators (and IP address threat indicators, as well as other types of threat indicators). For these probabilistic set data structures, time-efficiency and space-efficiency may be a function of the false positive rate (e.g., a false positive occurs when a membership/existence test returns True for an element that is not in the set). In general, increasing the false positive rate increases the time- and space-efficiency of these probabilistic set data structures. Each false positive, however, may cause an unnecessary policy search that may not find a match between a packet and a packet filtering rule; therefore, the false positive rate may be selected such that time spent executing unnecessary policy searches does not cause the expected packet-filtering time to increase beyond requirements.

As noted above, there is also a need to improve time- and space-efficiencies for policy searching. For example, it may be impractical to satisfy some requirements for enforcing modern/future CTI-derived policies by significantly increasing CPU/processor speeds and resources and/or by significantly increasing main memory. Failure to satisfy these requirements may result in reduced effectiveness of, or gaps in, network protections from the global cyberthreat.

Although Bloom filters, Cuckoo filters, and the like, may be used to significantly improve the time- and space-efficiencies for policy searching, the time- and space-efficient packet filtering methods based on probabilistic set data structures may be problematic in some cases, which may be related to the type of threat indicator. For example, probabilistic set data structures may be inefficient or impractical for processing IPv4 and IPv6 threat indicators that are represented in CIDR notation, e.g., subnet addresses. For another example, probabilistic set data structures may be partially inefficient at storing domain name threat indicators (as well as URI threat indicators, which may comprise domain name threat indicators) because they do not exploit redundancies or similarities that may occur across a set of domain name threat indicators, e.g., when the set has relatively low information entropy; for example, they may not exploit the redundancies in effective top-level domains (eTLDs) across a set of domain name threat indicators as well as the redundancies in commonly used prefix subdomain labels (e.g., "www", "mail", "remote", "blog", "webmail", etc.). For yet another example, CTI for domain names may often be provided in the form of "base domain names", or "registrable domain names", or "eTLD+1" domain names, for example, domain names that effectively have "starred" prefix subdomains that may not be fully qualified domain names (FQDNs). Base/registrable domain names may cause further inefficiencies when probabilistic set data structures are used in packet filtering methods. For yet another example, CTI for URLs may often be provided with partial paths, or effectively "starred" paths, i.e., only a subset of the path segments comprising a URL path may comprise the URL. Also, the membership/existence test methods described above, in which a packet's network address(es) that may correspond to a threat indicator(s) is first checked for existence in the rules of a policy before searching the policy for a matching rule, implies that each threat indicator may be stored redundantly, i.e., twice, in main memory. These inefficiencies may cause the time and/or space requirements for policy enforcement to be unsatisfied. For example, there may be insufficient main memory to store a policy, or policy search time may be too long, or both.

Described herein are new efficient index data structures and associated algorithms that may solve the threat indicator processing inefficiencies and gaps associated with probabilistic set data structures while satisfying time and space requirements for CTI-derived policy enforcement by TIGs. In general, index data structures may map keys to values. In the relevant context of CTI-derived policy search and enforcement, for example, the keys may be threat indicators (or values derived from threat indicators) associated with one or more packet-filtering rules in the policy and the values may be packet-filtering rule identifiers. Then, for example, a policy search through an index data structure for a potential threat indicator may output one or more rule identifiers, if the threat indicator is comprised by the packet-matching criteria for each identified rule. If the output is empty (e.g., no rule identifiers), then the potential threat indicator is not in the policy.

These new index data structures for efficient policy search may include: "ruletrees", which may be based on prefix tree index data structures and adaptive radix tree index data structures that have been adapted, extended, parameterized, and/or optimized for use with threat indicators, and which map keys that are bit-string representations of threat indicators to rule identifiers; and flat hash maps, which map keys that may be hashed or compressed threat indicators to rule identifiers.

One issue with matching threat indicators of packet filtering rules with domain names and URIs contained in (in-transit) packets is that (1) domain name threat indicators may be supplied in the form of base/registrable domain names or "starred" domain names (for example, domain names that do not have unambiguous entries in the DNS, such as *.example.com), which may never be observed in packets, and (2) similarly, URL threat indicators may be supplied with "starred" paths, e.g., only a portion of the path segments comprising a complete path may be represented in the URL indicator (for example, http://www.example.com/path-segment-1/*), which also may never be observed in packets. However, in both cases, domain names and URLs contained in in-transit packets that partially match these starred indicators may be treated as matching the corresponding packet filtering rule. For example, a (fully qualified) domain name "www.example.com", which may be observed in an in-transit packet, may match a packet-filtering rule with matching criteria "example.com". Similarly, a complete or full URL http://www.example.com/path-segment-1/path-segment-2/path-segment-3, which may be observed in an in-transit packet, may match a packet-filtering rule with matching criteria http://www.example.com/path-segment-1/.

Thus, for both domain names and URLs, threat indicators of type domain name and URL may often be viewed as prefixes for domain names and URLs that may be contained in (in-transit) packets. In packet filtering applications such as cybersecurity policy enforcement, a match between domain name and URL threat indicators comprising the matching criteria of packet filtering rules and the corresponding values contained in (in-transit) packets may be determined if the matching criteria may be prefixes of the values contained in packets. Similarly, IP threat indicators are often supplied in the form of prefixes, for example in CIDR notation, and similarly a match between IP threat indicators comprising the matching criteria of packet filtering rules and the corresponding values contained in (in-transit) packets may be determined if the matching criteria may be prefixes of the values contained in packets.

Another issue with domain name and URI threat indicators is that in their native character/text representation (e.g., the representation used in packets), the memory/space requirements for storing them in data structures may be high compared to typical TIG main memory budgets for cybersecurity policy enforcement. For example, at the time of this disclosure, CTI providers in aggregate may be supplying many tens of millions of domain name indicators (e.g., 50 million) and a few hundreds of millions of URI indicators (e.g., 200 million), which in their unprocessed form may require more than 20 GB of main memory/space; whereas a typical TIG main memory budget for cybersecurity policy enforcement may be 5-10 GB.

One or more of these issues can be addressed by using flat hash map index data structures to search for policy rule IDs. A flat hash map index data structure may map hashes, of threat indicators (e.g., domain names and URIs) and/or portions of threat indicators, to rule IDs. Also, or alternatively, a flat hash map index data structure may map compressions (e.g., lossless compressions), of threat indicators (e.g., domain names and URIs) and/or portions of threat indicators, to rule IDs. As explained below, the structure of domain names and URIs may be exploited and combined with hashing and/or lossless compression methods to support efficient storage and efficient searches for threat indicators of these types. A flat hash map index data structure may significantly reduce main memory requirements to within typical TIG budgets while supporting efficient matching between partial domain name indicators and partial URI indicators in CTI, and full domain names and URIs observed in in-transit packets. A flat hash map index data structure simultaneously exploits the structure of domain names and URIs and the data compression effects of (lossy) hashing and/or of lossless compression methods.

In an exemplary flat hash map, each key/indicator may be represented as, for example, a 64-bit (8-byte) hash, or fingerprint, and mapped into a hash table of a size corresponding to the number of keys. Given that at the present time of disclosure that domain names in CTI are typically 7-27 octets/bytes in length, with a maximum of 255 octets/bytes, and that URIs in CTI are typically 35-175 octets/bytes in length, with a maximum of 2048 octets/bytes, a 64-bit/8-byte representation, for example, for domain names and URIs in CTI may result in significant reductions in memory/space requirements. Note, however, that the collision rate of hashes varies inversely with the size of the fingerprint. Thus, for example, although a 32-bit fingerprint size may reduce memory requirements to approximately half the memory required for 64-bit fingerprints, in practice the collision rate may be too high. Approaches for managing/balancing collision rates and fingerprint size (and therefore memory requirements) are described below.

An exemplary technique used to create fingerprints of domain names may be called "Incremental Label Hashing"; similarly, an exemplary technique used to create fingerprints of URLs may be called "Incremental Path Segment Hashing".

Incremental Label Hashing may be used to create fingerprints of domain names. Domain names may be represented as a sequence of subdomain labels separated by dot "." characters, with the rightmost label representing the top-level subdomain (e.g., "com", "net", "edu", "org", etc.) relative to the (implicit) root domain. For example, let a domain name $D_i$ be represented as a list of i subdomain labels $L_i L_{i-1} \ldots L_1$ with each label separated by a dot "." character, and let H be a hash function that outputs an X-bit hash (for example, a 64-bit hash) for an arbitrarily sized input. Examples of such hash functions that are often available in standard libraries include, without limitation, xxh3, murmur2, abseil, anker1, etc. Let "||" be a concatenation operator. The process for creating a fingerprint for a domain name $D_i$ may be defined recursively as $$H(D_1) = H(L_1), \text{ and}$$

$$H(D_i) = H(H(L_i) \| H(D_{i-1})),$$

which results in the X-bit fingerprint $H(D_i)$ for the domain name $D_i$. Wildcards in a threat indicator (e.g., "*" in "*.example.com"), if present, may be omitted when creating a fingerprint. Note that the domain name $D_i$ is processed on a per subdomain label basis beginning with the rightmost, or top-level, subdomain label. For example, the domain name C.B.A may be processed as $$H(CBA) = H(H(C) \| H(H(B) \| H(A))).$$

Because the domain names are processed on a per subdomain label basis starting with the rightmost/top-level subdomain label, then during enforcement of a CTI-derived policy on in-transit packet traffic, fully qualified domain names (FQDNs) contained in packets may be readily and efficiently matched with partial or base/registrable domain names in CTI that may comprise the rules of the policy. For example, suppose the domain name C.B.A—but not the domain names E.D.C.B.A, D.C.B.A, B.A, or A—is in CTI and associated with a packet filtering rule with rule ID $R_k$ comprised by a policy. When the policy is created and processed for efficient enforcement, the fingerprint H(CBA) key and rule ID $R_k$ value may be inserted in a flat hash map index data structure F. Suppose an (in-transit) packet contains the domain name E.D.C.B.A. The TIG policy enforcement logic may efficiently check if E.D.C.B.A matches one or more packet filtering rules in the policy using the following exemplary policy search algorithm (in pseudocode):

Step 1: Compute H(A); Search(F, H(A))=Null;
Step 2: Compute H(B); Compute H(H(B)∥H(A))=H(BA); Search(F, H(BA))=Null;
Step 3: Compute H(C); Compute H(H(C)∥H(BA))=H(CBA); Search(F, H(CBA))={$R_k$};
Step 4: Compute H(D); Compute H(H(D)∥H(CBA))=H(DCBA); Search(F, H(DCBA))=Null;
Step 5: Compute H(E); Compute H(H(E)∥H(DCBA))=H(EDCBA); Search(F, H(EDCBA)=Null;

Note that in each Step above, because of the processing on a per subdomain label basis, the hash function H is computed at most twice. Thus, the algorithm is efficient in both time and memory/space because the time complexity is a linear function of the number of subdomain labels, and the space complexity is a constant function of the hash size X. Note also that a corresponding algorithm for inserting a domain name indicator into a flat hash map index data structure has similar time and space complexity. And note also that if hashes of each individual label are not needed, then a variation of the fingerprint creation process may be $H(D_1)=H(L_1)$, and $H(D_i)=H(L_i\|H(D_{i-1}))$, which results in the hash function H being computed only once per label in the corresponding policy search algorithm.

Incremental Path Segment Hashing may be used to create fingerprints of URLs. A URL in CTI often may have the form <scheme>://<host><path><query>, where <scheme> often may be "http" or "https" (at the present time of disclosure, URLs in CTI are predominantly schemed as http or https), <host> may be a hostname (e.g., a domain name $D_i$) or an IP address, <path> $P_j$ may be a sequence of j path-segments $S_1S_2S_3 \ldots S_j$, where each path segment Si may begin with the slash "/" character, and <query> may be a character string comprising a sequence of pairs of parameter names and associated values. The <query> may often be ignored in the context of CTI applications such as cybersecurity policy enforcement; however, if applicable, then query strings may be processed in a similar way as labels or path segments. For example, a <query> may be incrementally processed in units of {parameter name, value} pairs. The process for creating a fingerprint for the <host><path> portion of a URL $U_{ij}=D_iP_j$ is similar to the Incremental Label Hashing process described above for creating a fingerprint for a domain name. The fingerprint $H(U_{ij})$ may be computed, for example, as $H(U_{ij})=H(H(D_i)\|H(P_j))$, or similar, where $H(D_i)$ may be computed as above, and where $H(P_j)$ is defined recursively as $H(P_1)=H(S_1)$, and $H(P_j)=H(H(S_j)\|H(P_{j-1}))$, which results in the X-bit fingerprint $H(U_{ij})$ for the URL $U_{ij}$. Note that the path $P_j$ is processed on a per path segment basis beginning with the leftmost path segment. And, similar to the fingerprint creation process for domain names, a variation on the computation of $H(P_j)$ may be $H(P_1)=H(S_1)$, and $H(P_j)=H(S_j\|H(P_{j-1}))$, which results in the hash function H being computed only once per path segment in the corresponding policy search algorithm.

For purposes of generating hashes for mapping to rule IDs in a flat hash map index data structure, and for purposes of incrementally hashing a search object to search that flat hash map index data structure, a domain name (or a <host> portion of a URL in domain name format) may be processed from right to left (e.g., from the highest-level domain (or TLD) to the lowest level subdomain). Conversely, for purposes of generating hashes for mapping to rule IDs in a flat hash map index data structure, and for purposes of incrementally hashing a search object to search that flat hash map index data structure, a path portion of a URL may be processed from left to right. Stated more generally, and for a URL $U_{ij}=D_iP_j$, with $D_i=L_i.L_{i-1}.L. \ldots L_3.L_2.L_1$ and $P_j=S_1/S_2/ \ldots /S_j$, domain name labels L and path segments S may be processed in this order:

$L_1.L_2.L_3. \ldots L_{i-1}.L_i/S_1/S_2/ \ldots /S_j$

A hash value for the above URL may be incrementally generated as follows, where "$K_c$" is a key generated by incremental hashing and c is a counter having a final value equal to a total quantity of hostname labels L and path segments S of a URL (i.e., i+j):

if $c=1$, $K_c=H(L_1)$, if $1<c\leq i$, $K_c=H(L_c\|K_{c-1})$, or if $i<c\leq j$, $K_c=H(S_{c-i}\|K_{c-1})$ For the URL "http://www.example.com/pathseg-1/pathseg-2/pathseg-3" for example, i=3 and j=3, and hash-based keys $K_1$ through $K_6$ may be incrementally generated as follows:

$K_1=H(com)$ $K_2=H(example\|K_1)=H(example\|H(com))$ $K_3=H(www\|K_2)=H(www\|H(example\|H(com)))$ $K_4=H(\text{pathseg-1 }\|K_3)=H(\text{pathseg-1 }|H(www\|H(example\|H(com))))$ $K_5=H(\text{pathseg-2 }\|K_4)=H(\text{pathseg-2 }|H(\text{pathseg-1 }|H(www\|H(example\|H(com)))))$ $K_6=H(\text{pathseg-3}\|K_5)=H(\text{pathseg-3}\|H(\text{pathseg-2 }|H(\text{pathseg-1}\|H(www\|H(example\|H(com))))))$ Use of the above incremental hashing allows a single flat hash map index data structure to be used for rules based on domain name CTI (e.g., rules in which matching criteria are domain names) and for rules based on URL CTI (e.g., rules in which matching criteria are <host> and <path> portions of URLs). This allows for simplified search logic (e.g., using the same search logic for different types of threat indicators) and reduced memory usage (e.g., by using a single index data structure for rules having different types of matching criteria). An efficient approach to computing fingerprints $H(U_{ij})$ for the URLs $U_{ij}$ may be to:
(1) Configure a single instance of a flat hash map to store and process all relevant domain name CTI (and associated policy rules) and all relevant URL CTI (and associated policy rules), and
(2) Calculate fingerprints for domain names $D_i$ and for URLs $D_iP_j$ using the above formulas for hash-based keys $K_c$. For example, a fingerprint added to the single flat hash map for a domain name $D_i=L_i.L_{i-1}\ldots L_3.L_2.L_1$ would be $H(L_i\|H(L_{i-1})\|\ldots\|H(L_3)\|H(L_2)\|H(L_1)))\ldots))$, and a fingerprint added to the single flat hash map for a URL $U_{ij}=D_iP_j=L_i.L_{i-1}\ldots L_3.L_2.L_1/S_1/S_2/\ldots/S_{j-1}/S_j$ would be $H(S_j\|H(S_{j-1}\ldots\|H(S_2)\|H(S_1)\|H(L_i)\|H(L_{i-1})\|\ldots\|H(L_3)\|H(L_2)\|H(L_1)))\ldots))))\ldots))$.

Similar to the case described above for domain names, because the <path> portions of URLs are processed on a per path segment basis starting with the leftmost path segment, then during enforcement of a CTI-derived policy on in-transit packet traffic, full URLs contained in packets may be readily and efficiently matched with URLs in CTI with partial paths that comprise the rules of the policy. For example, a URL with a <host> E.D.C.B.A and a <path> $/S_1/S_2/S_3$ contained in an in-transit packet may match a packet filtering rule with matching criterion being a CTI URL with the same <host> E.D.C.B.A but with a (partial) <path> $/S_1/S_2$.

Note that a <host> portion of a URL may also be an IP address (IPv4 or IPv6). In this case, the IP address may be incrementally hashed in a way that is similar to incremental label hashing for domain names, but going from left to right of that IP address. For example, an IPv4 address may be represented in dotted decimal notation, which may be a sequence of four (4) integers N, with each of those four integers in the range [0,255], and with each integer separated by the dot "." character. Accordingly, when the <host> portion of a URL is an IPv4 address, the IPv4 address may be processed similarly as a domain name, with the four (4) integers corresponding to four subdomain labels, separated by dot "." characters, and with the four integers numbered from left to right (e.g., $N_1.N_2.N_3.N_4$). In the above formulas for hash-based keys $K_c$, for example, and when incrementally hashing URLs having IPv4 addresses as the <host> portion, i=4 and $L_1$ through $L_4$ would respectively become $N_1$ through $N_4$. An IPv6 address may be represented as eight (8) groups of four (4) hexadecimal digits, and where each group is separated by the colon ":" character. Accordingly, when the <host> portion of a URL is an IPv6 address, the IPv6 address may be processed similarly as a domain name, with the eight (8) groups corresponding to eight subdomain labels, separated by colon ":" characters instead of "." characters, and with the eight groups numbered from left to right (e.g., $H_1:H_2:H_3:H_4:H_5:H_6:H_7:H_8$). In the above formulas for hash-based keys $K_c$, for example, and when incrementally hashing URLs having IPv6 addresses as the <host> portion, i=8 and $L_1$ through $L_8$ would respectively become $H_1$ through $H_8$.

Note that the form of URLs that may be in CTI and used for, for example, e-mail addresses, VoIP addresses, messaging addresses, etc., may be similarly processed using the above techniques. Such URLs may have the form <scheme>:<name>@<host>, where <scheme> may be, for example, "mailto", "sip", "sips", "h323", "im", "xmpp", etc., <name> may be, for example, a typical username, and <host> may be a hostname (e.g., a domain name $D_i$ as above). Methods similar to the above fingerprinting approaches may be used to process such URLs.

When processing a CTI-derived policy for efficient enforcement, the domain names and URLs of the packet-filtering rules comprised by the policy may be fingerprinted as described above, the fingerprints (keys) may be paired with their associated rule identifiers/rule IDs (values), and the {fingerprint, rule ID} pairs may be inserted into a hash table, which may be the flat hash map index data structure. The flat hash map, however, may not natively support efficient dynamic runtime updates to the packet filtering rules of a policy currently being enforced by a TIG (see description below). If dynamic runtime policy updating is a requirement, then an alternative index data structure that does natively support dynamic runtime updates, such as a ruletree (described below), may be used instead. In this case, the {fingerprint, rule ID} pairs are inserted into a ruletree instead of a hash table. This index data structure—a ruletree that stores keys that are hash-based fingerprints in their bit-string representation—may be called a fingerprint ruletree. Note that a fingerprint ruletree may have different memory requirements than a corresponding flat hash map, with the tradeoff being the support for dynamic runtime updates.

In some cases, hash-based fingerprints and associated index data structures may have issues associated with hash collisions. For example, as an index data structure becomes more populated with fingerprints, hash collisions between a fingerprint H(A) that is already contained in the index data structure and a fingerprint H(B) that is being inserted or is being searched for, where A and B may be domain names or URLs, may be more likely to occur, i.e., the hash collision rate may increase. Because hash functions may be lossy and may be irreversible, it may be difficult or impossible to determine if A equals B or if A does not equal B. The hash collision rate may be reduced by, for example: (1) limiting the number of entries/keys/elements in the associated index data structure; and/or (2) using a perfect (zero collisions) hash function; and/or (3) partitioning the set of domain name and URL threat indicators/elements and inserting the elements in each partition into a different instance of the index data structure; and/or (4) increasing the hash size; and/or (5) using multiple different hash functions, or multiple different fingerprints, for each key in combination with logic that reduces the effective collision rate. Note, however, that these exemplary methods may have tradeoffs. For example, (1) and (2) may not be practical for some applications, (3) may increase time requirements, memory requirements, and logical complexity, and (4) and (5) may increase the memory requirements. On the other hand, these techniques may be used to reduce the effective collision rate such that a true collision, i.e., when H(A)=HB) but A does not equal B, may never occur or may rarely occur in practice, but while still satisfying time requirements and memory/space requirements.

In the context of the present disclosure, for an X-bit fingerprint, the effective collision rate may be lower if multiple different hash functions are used to generate the X-bit fingerprint than if a single hash function is used to generate the X-bit fingerprint. This may be caused by multiple factors, but a primary factor is that for time performance reasons, non-cryptographic hash functions (NCHFs) may be used to compute fingerprints instead of cryptographic hash functions (CHFs), which are relatively slow compared to NCHFs, and that relative slowness may adversely impact performance in the context of at least some applications described herein. If a (strong) CHF could be used, then an effective way to reliably reduce collision rates is to use a single CHF but increase the hash size (and the size of the fingerprint), as noted above in (4). Compared to a strong CHF, however, an NCHF's estimated collision rates may be less reliable and may depend on and vary with the data being hashed. Also, different NCHFs may have different data dependencies and variances. Furthermore, NCHFs that are available in standard libraries are often optimized to particular hash sizes, and thus, for example, an NCHF optimized for computing 64-bit output hashes may have reduced performance (e.g., higher collision rates) when producing hashes with sizes different than 64 bits. To reduce the adverse effects on collision rates of these various factors, one may select multiple different NCHFs to compute an X-bit fingerprint, where each different NCHF may be optimized to an output of a particular size, where the outputs of the NCHFs may be concatenated to form the fingerprint, and where the sum of the output sizes totals to X. This way, the effective collision rate for the multiple NCHFs may be reduced when compared to the collision rate of any single one of the NCHFs when computing fingerprints of size X.

The following is an example of how effective collision rate may be reduced by using multiple non-cryptographic hash functions. Let $H_1$ be a first non-cryptographic hash function, let $H_2$ be a second non-cryptographic hash function different from $H_1$, and let $H_3$ be a third non-cryptographic hash function different from $H_1$ and $H_2$. For a URL $Uij=D_iP_j$ (with $D_i=L_i.L_{i-1}.L. \ldots L_3.L_2.L_1$ and $P_j=S_1/S_2/ \ldots /S_j$), where c is a counter having a final value equal to a total quantity of hostname labels L and path segments S of a URL (i.e., c=i+j), where $K_c$ is a $c^{th}$ key, where $K\_1_c$ is a component of the $c^{th}$ key generated using $H_1$, where $K\_2_c$ is a component of the $c^{th}$ key generated using $H_2$, and where $K\_3_c$ is a component of the $c^{th}$ key generated using $H_3$, $K_c$ may be generated as follows:

$K_c=K\_3_c\|K\_2_c\|K\_1_c$, wherein if $c=1$, $K\_3_c=H_3(L_1)$, $K\_2_c=H_2(L_1)$, and $K\_1_c=H_1(L_1)$, if $1<c\le i$, $K\_3_c=H_3(L_c\|K\_3_{c-1})$, $K\_2_c=H_2(L_c\|K\_2_{c-1})$, and $K\_1_c=H_1(L_c\|K\_1_{c-1})$, or if $i<c\le j$, $K\_3_c=H_3(S_{c-i}\|K\_3_{c-1})$, $K\_2_c=H_2(S_{c-i}\|K\_2_{c-1})$, and $K\_1_c=H_1(S_{c-i}\|K\_1_{c-1})$ If $H_1$ is a hash function that generates an 8-byte (64-bit) hash, if $H_2$ is a hash function that generates a 3-byte (24-bit) hash, and if $H_3$ is a hash function that generates a 3-byte (24-bit) hash, each key K generated using the above procedure would be 14 bytes (112 bits).

The above example of incrementally hashing using three non-cryptographic hash functions is but one example of how multiple hash functions may be used. Fewer hash functions may be used (e.g., $K_c=K\_2_c\|K\_1_c$) or more hash functions may be used (e.g., $K_c=K\_4_c\|K\_3_c\|K\_2_c\|K\_1_c$). Non-cryptographic hash functions may be used with one or more cryptographic hash functions. And although cryptographic hash functions may not be preferred in some applications, cryptographic hash functions may be used (e.g., without non-cryptographic hash functions). Moreover, multiple hash functions may be combined for incremental hashing in ways other than as set forth above. Such other combinations may, for given input, produce different outputs, but may, for a large population of threat indicators (e.g., hundreds of millions of unique threat indicators), achieve the same utility and effect (e.g., reduced collision rate) as the combined use of $H_1$, $H_2$, and $H_3$ described above. For example, using the non-cryptographic hash functions $H_1$, $H_2$, and $H_3$ described above, and for a URL Uij as described above, $K_c$ may be generated as follows:

$K_c=K\_3_c\|K\_2_c\|K\_1_c$, wherein if $c=1$, $K\_3_c=H_3(L_1)$, $K\_2_c=H_2(L_1)$, and $K\_1_c=H_1(L_1)$, if $1<c\le i$, $K\_3_c=H_3(L_c\|K_{c-1})$, $K\_2_c=H_2(L_c\|K_{c-1})$, and $K\_1_c=H_1(L_c\|K_{c-1})$, or if $i<c\le j$, $K\_3_c=H_3(S_{c-i}\|K_{c-1})$, $K\_2_c=H_2(S_{c-i}\|K_{c-1})$, and $K\_1_c=H_1(S_{c-i}\|K_{c-1})$ An efficient lossless compression method may be used in combination with or as an alternative to the hash function-based methods above. Lossless compression may mitigate or eliminate uncertainties such as hash collisions while retaining time and space/memory efficiencies. An efficient, lossless compression function C may encode and process domain names and URLs, in combination with or as an alternative to the hash function-based methods described above, which may be viewed as lossy compression methods. For example, C may be based on Huffman coding, a type of prefix coding method, which is a lossless compression method that provides for time efficiency and space/memory efficiency and may avoid the collision issues associated with hash functions. Other lossless compression methods may be, for example, arithmetic coding and asymmetric numerical systems. Note that lossless compression functions are often reversible functions, which may be assumed in this disclosure unless otherwise noted. These lossless compression methods and associated compression functions may be characterized by their compression ratio. The compression ratio for a given compression function may be the expected value of dividing the size of the output of the compression function by the size of the input to the compression function. Compression ratios may vary with the information entropy of the input, i.e., the lower the information entropy of the input, the lower (and therefore better) the compression ratio. Information entropy may correspond to the amount of redundant information in the input. For example, at the present time of disclosure, typical public domain names in CTI are comprised of eTLDs that are formed from a relatively small set (for example, a few thousand elements) of labels, such as "com", "net", and country codes such as "ru" and "cn". Furthermore, at the time of the present disclosure, the "com" label may be found in approximately 35% of the eTLDs of domain names in CTI. Such redundancies may be exploited by lossless compression methods to achieve good compression (i.e., relatively low compression ratios). For example, Huffman coding and other coding methods exploit redundancies and low information entropy to achieve better compression factors (e.g., because often less data is required to represent an information element of size X and N−1 repetitions of that element than may be needed to represent N different elements of size X). Additionally, at the present time of disclosure, there are approximately 10,000 eTLDs in the Public Suffix List (PSL). An enumeration of these eTLDs in the PSL, and an associated 1-1 mapping between a number and an eTLD, may be encoded in 14 bits. Thus, significant (lossless) compression may be achieved by representing the eTLD of any domain name by its 14-bit enumeration. In practice, 16 bits, or 2 bytes, may be used to future proof against growth of the PSL (up to 64K eTLDs) and to align with byte-sized logic.

An exemplary technique used to create efficient compressed representations, or compressions, of domain names may be called "Incremental Label Compression"; similarly, an exemplary technique used to create efficient compressions of URLs may be called "Incremental Path Segment Compression".

Incremental Label Compression may be used to create efficient compressed representations, or compressions, of domain names. This technique is similar in approach to Incremental Label Hashing (described above) but substitutes a (lossless) compression function C for a hash function H. As above, domain names may be represented as a sequence of subdomain labels separated by dot "." characters, with the rightmost label representing the top-level subdomain (e.g., "com", "net", "edu", "org", etc.) relative to the (implicit) root domain. For example, let a domain name $D_i$ be represented as a list of i subdomain labels $L_i L_{i-1} \ldots L_1$ with each label separated by a dot "." character, let C be a compression function that outputs an efficiently coded version of the input, and let "‖" be a concatenation operator. The process for creating a "compression" $C(D_i)$ for a domain name $D_i$ with i labels may be defined recursively as $C(D_1)=C(L_1)$, and $C(D_i)=C(L_i)\|C(D_{i-1})$, which results in the compression $C(D_i)$ for the domain name $D_i$. Note that the domain name $D_i$ is processed on a per subdomain label basis beginning with the rightmost, or top-level, subdomain label. For example, the domain name C.B.A may be processed as $C(CBA)=C(C)\|C(B)\|C(A)$.

Because the domain names are processed on a per subdomain label basis starting with the rightmost/top-level subdomain label, then during enforcement of a CTI-derived policy on in-transit packet traffic, fully qualified domain names (FQDNs) contained in packets may be readily and efficiently matched with partial or base/registrable domain names in CTI that comprise the rules of the policy. For example, suppose the domain name C.B.A—but not the domain names E.D.C.B.A, D.C.B.A, B.A, or A—is in CTI and associated with a packet filtering rule with rule ID $R_k$ comprising a policy. When the policy is created and processed for efficient enforcement, the compression C(CBA) key and rule ID $R_k$ value may be inserted in a flat hash map index data structure F. Suppose an in-transit packet contains the domain name E.D.C.B.A. The TIG policy enforcement logic may efficiently check if E.D.C.B.A matches one or more packet filtering rules in the policy using the following exemplary policy search algorithm (in pseudocode):
Step 1: Compute C(A); Search(F, C(A))=Null;
Step 2: Compute C(BA); Search(F, C(BA))=Null;
Step 3: Compute C(CBA); Search(F, C(CBA))={$R_k$};
Step 4: Compute C(DCBA); Search(F, C(DCBA)=Null;
Step 5: Compute C(EDBCA); Search(F, C(EDCBA)=Null.

Note that in each step above, because of the processing on a per subdomain label basis, the compression function C is computed only once per subdomain label. Thus, the algorithm is efficient in both time and space/memory because the time complexity may be a linear function of the number of subdomain labels, and the space complexity may be a function of the compression ratio (which may be less than 1). Note also that a corresponding algorithm for inserting a domain indicator into a flat hash map index data structure may have similar time and space complexity.

Incremental Path Segment Compression may be used to create efficient compressions of URLs. This technique is similar in approach to Incremental Path Segment Hashing (described above) but substitutes a (lossless) compression function C for a hash function H. A URL may have the form <scheme>://<host><path><query>, where <scheme> may be "http" or "https", <host> may be a hostname (e.g., a domain name $D_i$=) or an IP address, <path> $P_j$ may be a sequence of j path-segments $S_1 S_2 S_3 \ldots S_j$, where each path segment Si may begin with the slash "/" character, and <query> may be a character string comprising parameter names and associated values. The <query> may often be ignored in the context of CTI applications such as cybersecurity policy enforcement; however, if applicable, then query strings may be processed in a similar way as labels or path segments. The process for creating a compression for the <host><path> portion of a URL $U_{ij}=D_i P_j$ is similar to the Incremental Label Compression process described above for creating a compression for a domain name. The compression $C(U_{ij})=C(D_i)\|C(P_j)$, where $C(D_i)$ may be computed as above, and where $C(P_j)$ is defined recursively as $C(P_1)=C(S_1)$, and $C(P_j)=C(S_j)\|C(P_{j-1})$, which results in the compression $C(U_{ij})$ for the URL $U_{ij}$. Note that the path $P_j$ is processed on a per path segment basis beginning with the leftmost path segment.

Similar to the case described above for domain names, because the <path> portions of URLs are processed on a per path segment basis starting with the leftmost path segment, then during enforcement of a CTI-derived policy on in-transit packet traffic, full URLs contained in packets may be readily and efficiently matched with URLs in CTI with partial paths that comprise the rules of the policy. For example, a URL with a <host> E.D.C.B.A and a <path> /$S_1$/$S_2$/$S_3$ contained in an in-transit packet may match a packet filtering rule with matching criterion being a CTI URL with the same <host> E.D.C.B.A but with a (partial) <path> /$S_1$/$S_2$.

For purposes of generating compressions for mapping to rule IDs in a flat hash map index data structure, and for purposes of incrementally compressing a search object to search that flat hash map index data structure, a domain name (or a <host> portion of a URL in domain name format) may be processed from right to left, and a path portion of a URL may be processed from left to right. A compression for a URL Uij=$D_i P_j$, with $D_i=L_i.L_{i-1}.L. \ldots L_3.L_2.L_1$ and $P_j=S_1/S_2/\ldots/S_j$, may be incrementally generated as follows, where "$K_c$" is a key generated by incremental compression and c is a counter having a final value equal to a total quantity of hostname labels L and path segments S of a URL (i.e., i+j):

if $c=1$, $K_c=C(L_1)$, if $1<c\leq i$, $K_c=C(L_c)\|K_{c-1}$, or if $i<c\leq j$, $K_c=C(S_{c-i})\|K_{c-1}$ For the URL "http://www.example.com/pathseg-1/pathseg-2/pathseg-3", for example, compression-based keys $K_1$ through $K_6$ may be incrementally generated as follows:

$K_1=C(com)$ $K_2=C(example)\|K_1=C(example)\|C(com)$ $K_3=C(www)\|K_2=C(www)\|C(example)\|C(com)$ $K_4=C(pathseg\text{-}1)\|K_3=C(pathseg\text{-}1)\|C(www)\|C(example)\|C(com)$ $K_5=C(pathseg\text{-}2)\|K_4=C(pathseg\text{-}2)\|C(pathseg\text{-}1)\|C(www)\|C(example)\|C(com)$ $K_6=C(pathseg\text{-}3)\|K=C(pathseg\text{-}3)\|C(pathseg\text{-}2)\|C(pathseg\text{-}1)\|C(www)\|C(example)\|C(com)$ Use of the above incremental compression allows a single flat hash map index data structure to be used for rules based on domain name CTI (e.g., rules in which matching criteria are domain names) and for rules based on URL CTI (e.g., rules in which matching criteria are <host> and <path> portions of URLs). This allows for simplified search logic (e.g., using the same search logic for different types of threat indicators) and reduced memory usage (e.g., by using a single index data structure for rules having different types of matching criteria). An efficient approach to computing compressions $C(U_{ij})$ for the URLs $U_{ij}$ may be to:

(1) Configure a single instance of a flat hash map to store and process all relevant domain name CTI (and associated policy rules) and all relevant URL CTI (and associated policy rules), and (2) Calculate compressions for domain names $D_i$ and for URLs $D_iP_j$ using the above formulas for compression-based keys $K_c$. For example, a compression added to the single flat hash map for a domain name $D_i=L_i.L_{i-1}\ldots L_3.L_2.L_1$ would be $C(L_i)\|C(L_{i-1})\|\ldots\|C(L_3)\|C(L_2)\|C(L_1)))\ldots))$, and a compression added to the single flat hash map for a URL $U_{ij}=D_iP_j=L_i.L_{i-1}\ldots L_3.L_2.L_1/S_1/S_2/\ldots/S_{j-1}/S_j$ would be $C(P_j)\|C(P_{j-1})\|\ldots\|C(P_2)\|C(P_1)\|C(L_i)\|C(L_{i-1})\|\ldots\|C(L_3)\|C(L_2)\|C(L_1)$.

Note that a <host> portion of a URL may also be an IP address (IPv4 or IPv6). In this case, the IP address may be incrementally compressed in a way that is similar to incremental label compression for domain names, but going from left to right of that IP address. An IPv4 address may be represented in dotted decimal notation, which may be a sequence of four (4) integers N, with each of those four integers in the range [0,255], and with each integer separated by the dot "." character. Accordingly, when the <host> portion of a URL is an IPv4 address, the IPv4 address may be processed similarly as a domain name, with the four (4) integers corresponding to four subdomain labels, separated by dot "." characters, and with the four integers numbered from left to right (e.g., $N_1.N_2.N_3.N_4$). In the above formulas for compression-based keys $K_c$, for example, and when incrementally compressing URLs having IPv4 addresses as the <host> portion, $i=4$ and $L_1$ through $L_4$ would respectively become $N_1$ through $N_4$. An IPv6 address may be represented as eight (8) groups H, with each group having four (4) hexadecimal digits, and where each group is separated by the colon ":" character. Accordingly, when the <host> portion of a URL is an IPv6 address, the IPv6 address may be processed similarly as a domain name, with the eight (8) groups corresponding to eight subdomain labels, separated by colon ":" characters instead of "." characters, and with the eight groups numbered from left to right (e.g., $H_1:H_2:H_3:H_4:H_5:H_6:H_7:H_8$). In the above formulas for compression-based keys $K_c$, for example, and when incrementally compressing URLs having IPv6 addresses as the <host> portion, $i=8$ and $L_1$ through $L_8$ would respectively become $H_1$ through $H_8$.

Similar to above, when processing a CTI-derived policy for efficient enforcement, the domain names and URLs of the packet-filtering rules comprised by the policy may be compressed as described above, the compressions (keys) may be paired with their associated rule identifiers/rule IDs (values), and the {compression, rule ID} pairs may be inserted into a table, which is the flat hash map index data structure. The flat hash map, however, may not natively support efficient dynamic runtime updates to the packet filtering rules of a policy currently being enforced by a TIG (see description below). In the present context, dynamic runtime updates means updating the matching criteria of packet filtering rules by inserting or deleting threat indicators from the set of indicators comprising the matching criteria while the associated policy is being enforced on in-transit packets. If dynamic runtime policy updating is a requirement, then an alternative index data structure that does natively support dynamic runtime updates, such as a ruletree, may be used instead. In this case, the {compression, rule ID} pairs are inserted into a ruletree instead of a hash table. This index data structure—a ruletree that stores keys that are compressions in their bit-string representation—may be called a compression ruletree. Note that the compression ruletree may require more memory than a corresponding flat hash map, with the tradeoff being the support for dynamic runtime updates.

In some cases, a combination of lossy hashing and lossless compression methods may be effective. For example, because the redundancy measures of domain names often may be greater than the redundancy measures of paths, a URL may be processed by using (lossless) compression functions for the hostname (i.e., domain name) portion of the URL and by using (lossy) hashing functions for the path portion of the URL.

Figure 2A:
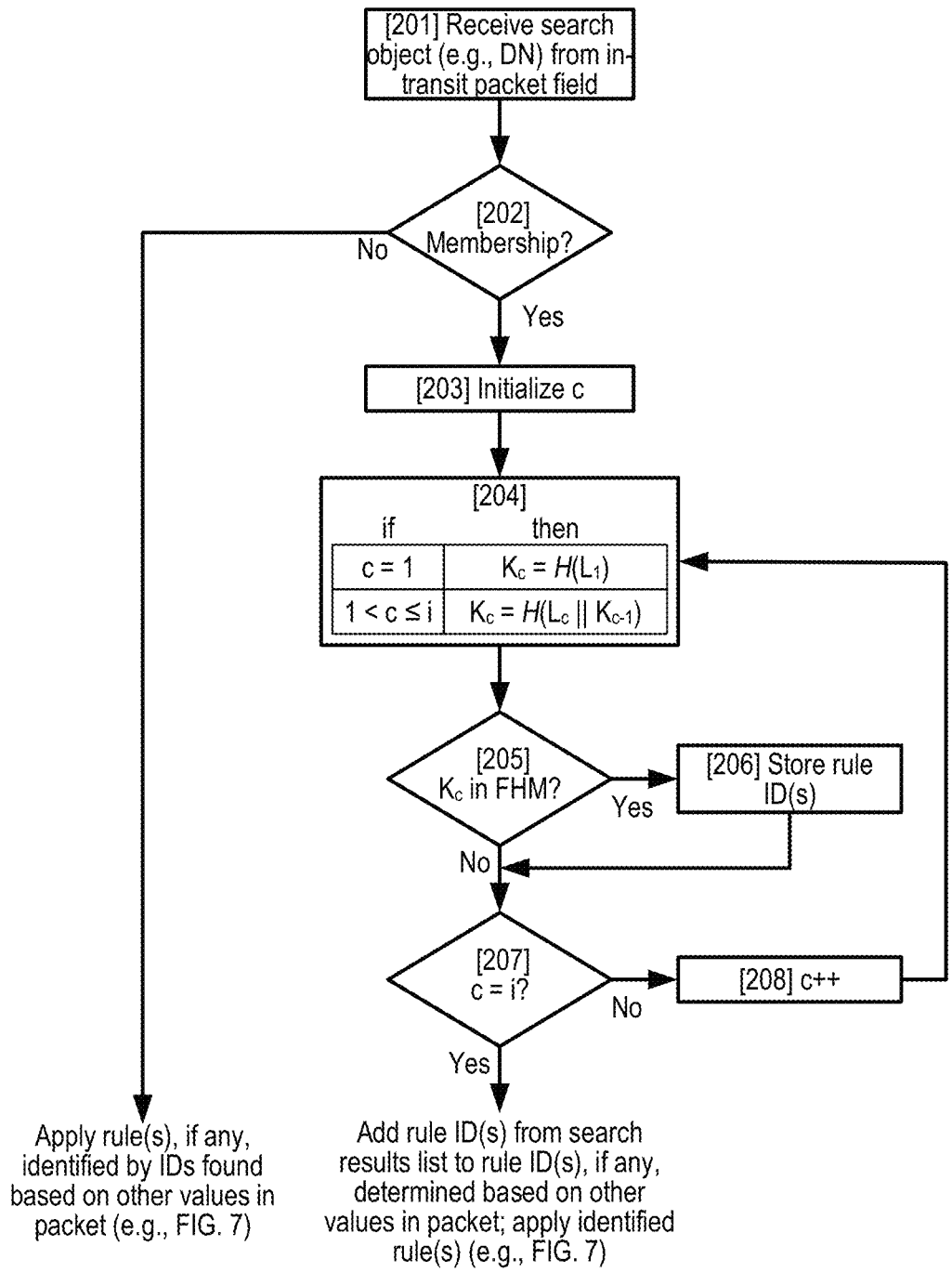
FIGS. 2A, 2B, 2C, 2D, 2E, 2F, and 2G are flow charts showing example methods for searching flat hash map index data structures based on keys derived from values obtained from fields of in-transit packets.

FIG. 2A is a flow chart showing an example method for searching, based on a search object that is a value obtained from a field of an in-transit packet, a flat hash map index data structure that comprises {fingerprint, rule ID} index pairs for a policy (or portion of a policy). For each of the index pairs of the flat hash map index data structure, the rule ID may comprise an identifier of a policy rule, and the fingerprint may comprise a value that has been generated, using incremental hashing as described above, based on matching criteria (e.g., a threat indicator) of the policy rule. There may be multiple index pairs that comprise the same fingerprint (e.g., there may be multiple rules that comprise the same match criteria). Although the example of FIG. 2A uses domain/subdomain names as examples for the types of policy rule matching criteria and packet field values for which the method is performed, the method of FIG. 2A could also or alternatively be performed in connection with other types of matching criteria and packet field values. The method of FIG. 2A may, for example, be performed by a TIG 102. One or more steps of the example method of FIG. 2A may be rearranged (e.g., performed in a different order), combined, omitted, and/or otherwise modified, and/or other steps added.

In step 201, a search object in the form of a domain name may be received (e.g., from a process that parses packet fields specified by policy rule criteria and that extracts data from those fields). In step 202, one or more set data structures are searched for membership, of the domain name received in step 201 (and/or of subdomain of that domain name), in the set of domain and subdomain names that are matching criteria of the policy rules corresponding to the index pairs of the flat hash map index data structure. Step 202 may comprise use of one or more Bloom filters, Cuckoo filters, or other types of probabilistic set data structures and associated methods described in the '417 patent. Also or alternatively, step 202 may comprise use of a non-probabilistic set data structure to test membership. If the TIG 102 determines non-membership in step 202 (i.e., that the search object is not in the set of search objects that would match to matching criteria of the policy rules corresponding to the index pairs of the flat hash map index data structure), the TIG 102 may skip searching the flat hash map data structure and may apply rule(s), if any, that may be determined using other values from the in-transit packet. As described in more detail in connection with FIG. 7, the TIG 102 may concurrently search groups of policy rules by searching multiple index data structures based on multiple different values from a packet.

If the TIG 102 determines membership in step 202 (e.g., that the search object or a portion of the search object is in the set of matching criteria of the policy rules corresponding to the index pairs of the flat hash map index data structure), the TIG 102 may initialize a counter c to 1 in step 203. In step 204, the TIG 102 may calculate a hash-based key $K_c$ based on the $c^{th}$ label $L_c$ of the domain name search object. For example, if c=1, $K_c$ may be calculated as $H(L_1)$, and if 1<c≤i, $K_c$ may be calculated as $H(L_c \| K_{c-1})$. In step 205, the TIG 102 may search the flat hash map index data structure (FHM) for any fingerprints that match the value of $K_c$ calculated in step 204. Each of the keys/fingerprints in the flat hash map index data structure has been calculated, using incremental hash generation comprising one or more steps like step 204, from a matching criteria (e.g., a threat indicator) of a policy rule that corresponds to the rule ID to which the key/fingerprint is mapped in the flat hash map index data structure. If one or more matching fingerprints are found, in step 206 the TIG 102 may store, in a results list data structure, a value of the rule ID of each index pair with a matching fingerprint. As used herein, "results list" generically refers to a data structure that may store multiple values such as rule IDs; a results list data structure need not take the form of an actual list.

Also or alternatively, step 204 of the method of FIG. 2A may comprise calculating keys using a different procedure, and step 205 may comprise searching a flat hash map index data structure that comprises keys/fingerprints also calculated using that different procedure. For example, key calculation in step 204, as well as key/fingerprint calculation for a flat hash map index data structure searched in step 205, may be based on hashes that are based on hashes of multiple individual labels (e.g., if c=1, $K_c=H(L_1)$, if 1<c≤i, $K_c=H(H(L_c) \| K_{c-1})$). As but another example, key calculation in step 204, as well as key/fingerprint calculation for a flat hash map index data structure searched in step 205, may be based on multiple hash functions (e.g., any of the procedures, described above, that uses the hash functions $H_1$, $H_2$, and $H_3$).

After step 206, or after a determination in step 205 that the flat hash map index data structure lacks a key/fingerprint that matches the value of $K_c$ calculated in step 204, the TIG 102 may continue to search the flat hash map index data structure for keys/fingerprints that match additional values of $K_c$ calculated based on additional portions of the search object value. For example, consider the example domain name "abc.example.com". A first policy rule, which may be based on first CTI that indicates an association of the domain "example.com" with cyber threats/attacks, may indicate that packets with this field value should be allowed but that the existence of such packets should be logged. A second policy rule, which may be based on second CTI that indicates another association of the subdomain "abc.example.com" with cyber threats/attacks, may indicate that packets with this field value should be blocked. A fingerprint of example.com, and thus the first rule, would be found before a fingerprint of abc.example.com, and thus before the second rule. If the search were stopped after finding the first rule, a potentially more serious rule could be missed.

In step 207, the TIG 102 may determine if it has processed all relevant portions of the search object (e.g., if all labels L of the domain/subdomain name have been processed). If no (e.g., if c is not equal to i), the c counter is incremented by 1 in step 208, and the TIG 102 may repeat portions of the method beginning at step 204. If yes (e.g., if c=i), the TIG 102 adds stored rule ID(s) (stored in a results list during one or more performances of step 206) to rule ID(s), if any, that may be determined using other values from the in-transit packet, and the rule(s) corresponding to all determined rule ID(s) may be applied to the packet. This is described further in connection with FIG. 7.

Figure 2B:
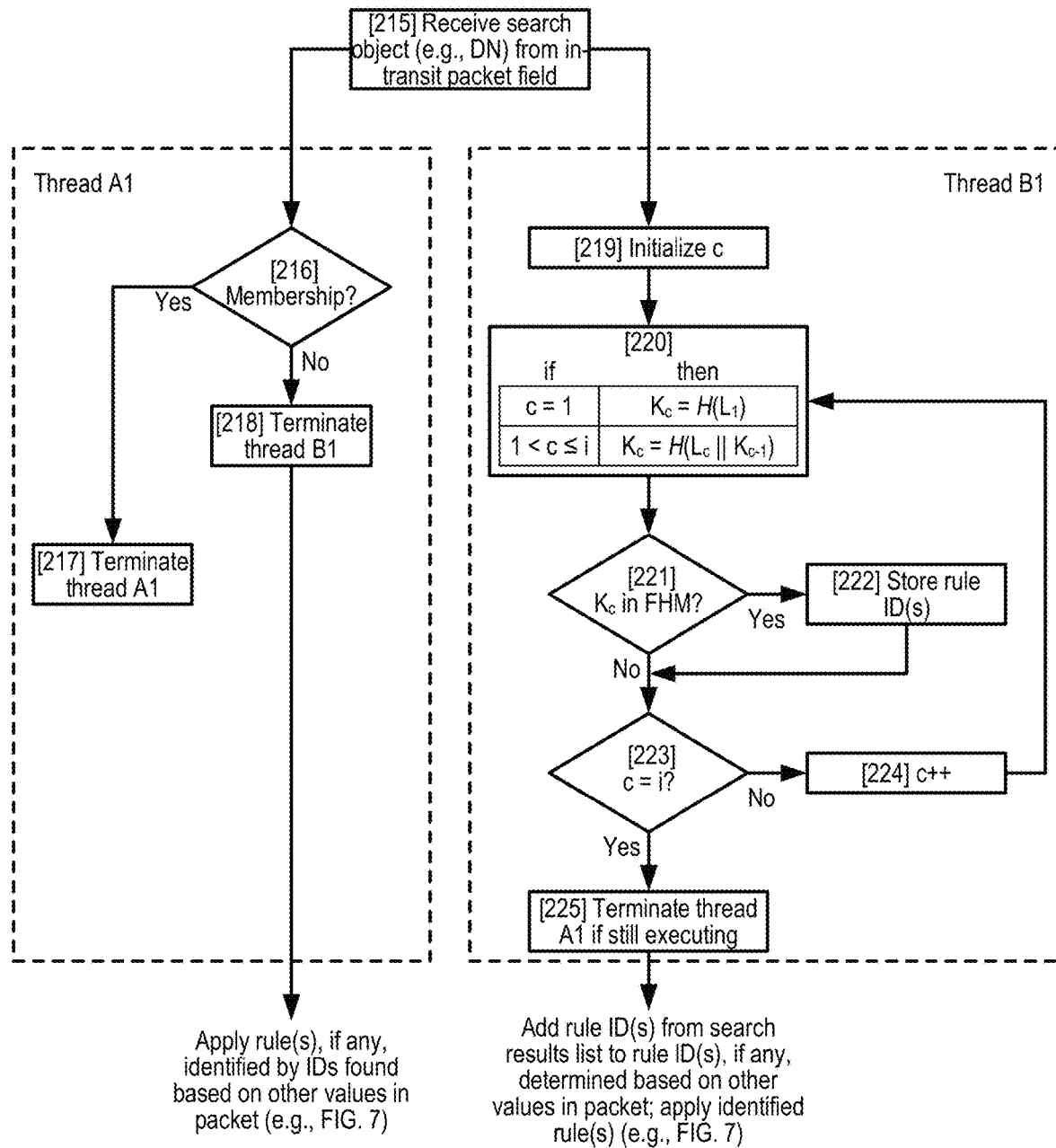

FIG. 2B is a flow chart showing another example method for searching, based on a search object that is obtained from a field of an in-transit packet, a flat hash map index data structure that comprises {fingerprint, rule ID} index pairs for a policy (or portion of a policy). One or more steps of the example method of FIG. 2B may be rearranged (e.g., performed in a different order), combined, omitted, and/or otherwise modified, and/or other steps added. The method of FIG. 2B is similar to the method of FIG. 2A and includes steps 215 and 219-224 that may respectively be the same as steps 201 and 203-208 of FIG. 2A. Step 216 of FIG. 2B may similarly be the same as step 202 of FIG. 2A. In the method of FIG. 2B, however, step 216 is performed in a first processing thread A1, and steps 219-224 are performed in a concurrent second processing thread BL. In the method of FIG. 2B, based on receipt of a search object in step 215, membership testing is initiated in thread A1 and a search of the flat hash map index data structure is initiated in thread B1. If the TIG 102 determines membership in step 216, the thread A1 may be terminated in step 217. If the TIG 102 determines no membership in step 216, thread B1 may be terminated in step 218, and rules, if any, determined using other values from the in-transit packet may be applied.

The method of FIG. 2B may be selected based on an estimated or expected time for performing step 216 being less than an estimated or expected time for completing a search of the index data structure. Thread B1 may include a step 225 that may be performed after a "no" determination in step 223, and that may cause termination of thread A1 if those time estimations are incorrect or the deviations from the expected times result in a search being faster than a membership test. In step 225, the TIG 102 may determine if the thread A1 is still executing and, if it is, terminate execution of the thread A1.

Figure 2C:
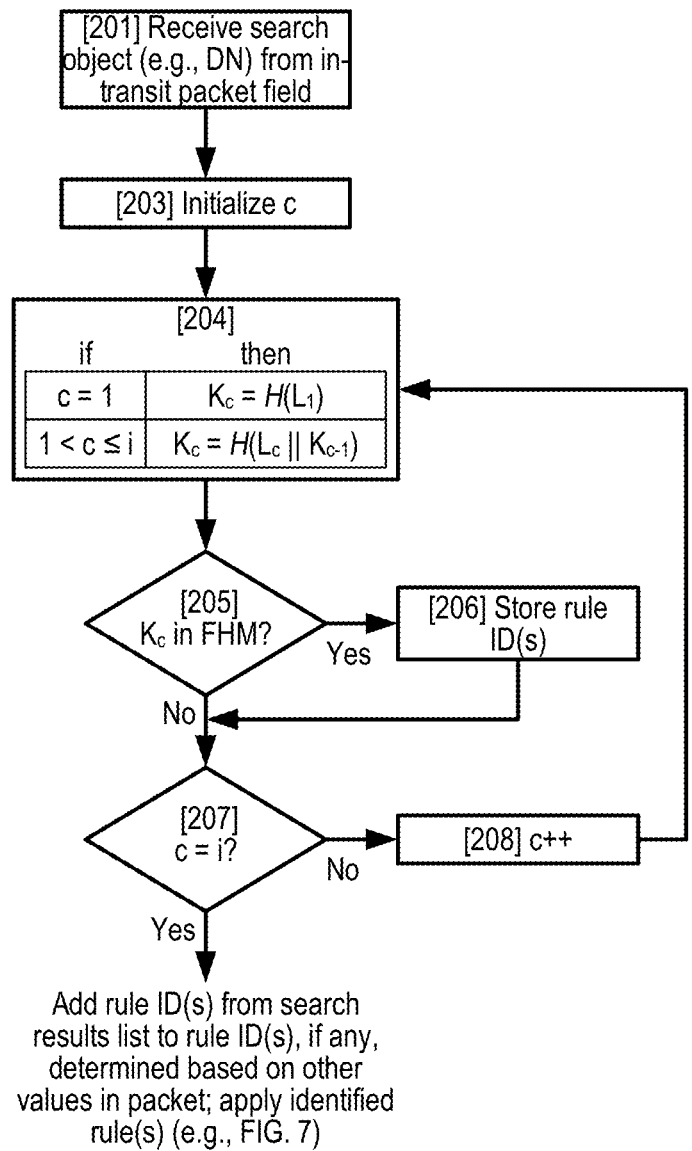

Membership testing may be omitted. For example, if membership testing is unlikely to require significantly less time than index data structure searching, devoting memory resources to a set data structure may be inefficient. FIG. 2C is a flow chart showing another example method for searching, based on a search object that is obtained from a field of an in-transit packet, a flat hash map index data structure that comprises {fingerprint, rule ID} index pairs for a policy (or portion of a policy). The method of FIG. 2C is similar to the method of FIG. 2A, with the exception that step 202 is omitted.

Figure 2D:
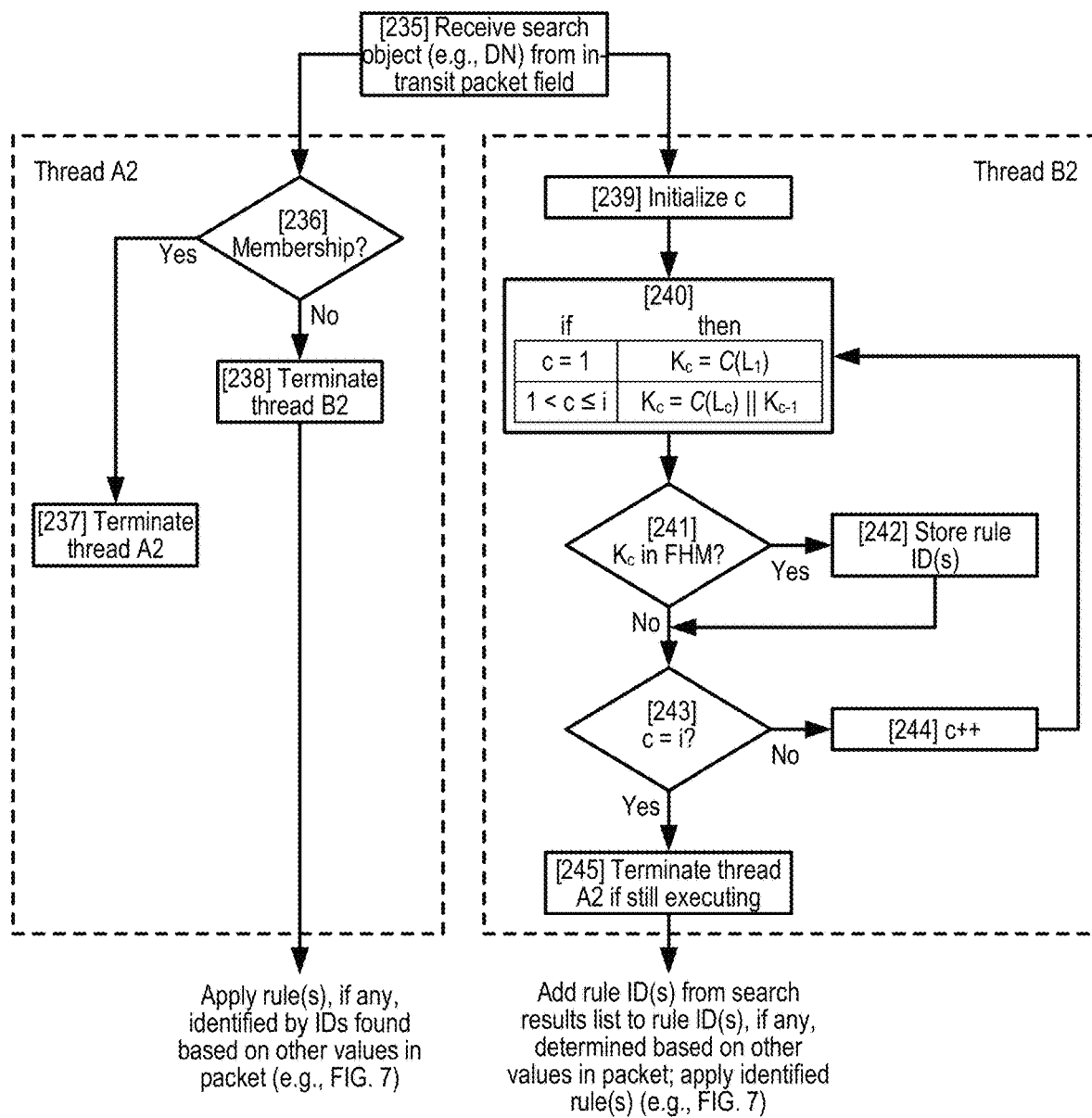

FIG. 2D is a flow chart showing another example method for searching, based on a search object that is obtained from a field of an in-transit packet, a flat hash map index data structure that comprises index pairs for a policy (or portion of a policy). One or more steps of the example method of FIG. 2D may be rearranged (e.g., performed in a different order), combined, omitted, and/or otherwise modified, and/or other steps added. The method of FIG. 2D may be performed by a TIG 102 and is similar to the method FIG. 2B, except that incremental label compression is used instead of incremental label hashing. In the example method of FIG. 2D, the flat hash map index data structure comprises, instead of hash-based fingerprints, compressions (compressed values) calculated, as described above, using a lossless compression function C. Steps 235-239 and 242-245 of FIG. 2D are respectively similar to steps 215-219 and 222-225 of FIG. 2B. Step 240 of FIG. 2D is similar to step 220 of FIG. 2B, except that in step 240, the TIG 102 may calculate a compression-based key $K_c$ based on the $c^{th}$ label $L_c$ of the domain name search object. For example, if c=1, $K_c$ may be calculated as $C(L_1)$, and if $1<c\le i$, $K_c$ may be calculated as $C(L_c)\|C(K_{c-1})$. Step 241 of FIG. 2D is similar to step 221 of FIG. 2B, except that in step 241, the TIG 102 may search the flat hash map index data structure for a key/compression that matches the value of $K_c$ calculated in step 240. Each of the keys/compressions in the flat hash map index data structure has been calculated, using incremental compression comprising one or more steps like step 240, from a matching criteria (e.g., a threat indicator) of a policy rule that corresponds to the rule ID to which the key/compression is mapped in the flat hash map index data structure.

In a variation of the method of FIG. 2D, the method may be performed in a single thread similar to the method of FIG. 2A, with step 236 performed before step 239, with a "yes" membership determination being a prerequisite to performance of the remaining method steps, and with steps 237, 238, and 245 omitted. In yet another variation of the method of FIG. 2D, membership testing may be omitted (similar to the method of FIG. 2C).

Figure 2E:
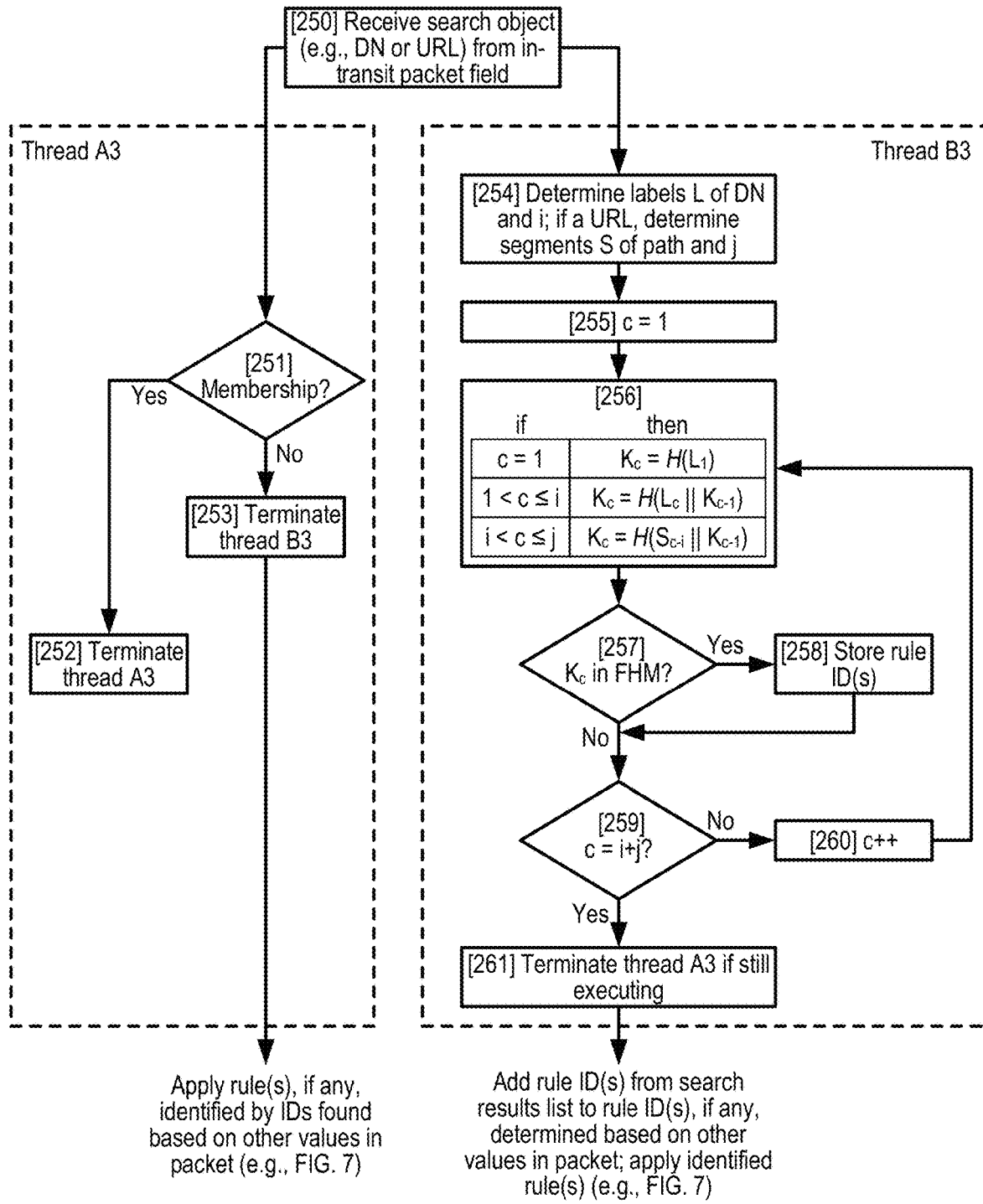

FIG. 2E is a flow chart showing another example method for searching, based on a search object that is obtained from a field of an in-transit packet, a flat hash map index data structure that comprises index pairs for a policy (or portion of a policy). The example method of FIG. 2E, which may be performed by a TIG 102, may comprise incremental label hashing, as described above, and incremental path segment hashing, as also described above. One or more steps of the example method of FIG. 2E may be rearranged (e.g., performed in a different order), combined, omitted, and/or otherwise modified, and/or other steps added.

In step 250, a search object may be received (e.g., from a process that parses specified packet fields of policy rule criteria and that extracts data from those fields). The search object may comprise a domain name. Also or alternatively, the search object may comprise a URL having a <host> portion and a <path> portion. In particular, the method of FIG. 2E may be performed using a single instance of a flat hash map index data structure that has been configured based on threat indicators in rules created based on domain name CTI and that has also been configured based on threat indicators in rules created based on URL CTI. For example, that single instance of the flat hash index data structure may maps keys, generated by incrementally hashing domain names (or portions of domain names) from matching criteria of first policy rules based on all relevant domain name CTI, to rule IDs of those first policy rules. That single instance of the flat hash index data structure may also map keys, generated by incrementally hashing URLs (or portions of URLs) from matching criteria of second policy rules based on all relevant URL CTI, to rule IDs of those second policy rules.

Similar to the methods of FIGS. 2B and 2D, the method of FIG. 2E includes concurrent processing threads A3 and B3. Based on receipt of a search object in step 250, membership testing may be initiated in thread A3 and a search of the flat hash map data structure may be initiated in thread B3. If the TIG 102 determines membership in step 251 (which may be similar to steps 202, 216, and 236), the thread A3 may be terminated in step 252. If the TIG 102 determines no membership in step 251, thread B3 may be terminated in step 253, and rules, if any, determined using other values from the in-transit packet may be applied.

In step 254, the TIG 102 may determine portions of the search object that are labels of a domain name, the quantity (i) of labels, and the order of the labels. The TIG 102 may in step 254 also determine whether there is a path portion of the search object and, if there is a path portion, the segment (s) S of that path portions, the quantity (j) segment, and the order of the segments. If there is no path portion of the search object, the TIG 102 may set the value of j to zero for purposes of step 259 (described below). Also or alternatively, the TIG 102 may in step 254 be configured to determine if a search object is a URL with a <host> portion in the form of an IPv4 address or and IPv6 address. If the search object is a URL with an IPv4 address as a <host> portion, the TIG 102 may in step 254 set i=4 and determine the integers $N_1.N_2.N_3.N_4$ to be treated labels $L_1$ through $L_4$ in step 256 (described below). If the search object is a URL with an IPv6 address as a <host> portion, the TIG 102 may in step 254 set i=8 and determine the hexadecimal digit groups $H_1:H_2:H_3:H_4:H_5:H_6:H_7:H_8$ to be treated labels $L_1$ through $L_8$ in step 256.

In step 255, the TIG 102 may initialize a counter c to 1. In step 256, the TIG 102 may calculate a hash-based key $K_c$ based on a label or path segment of the search object. For example, if c=1, $K_c$ may be calculated as $H(L_1)$. If $1<c\le i$, $K_c$ may be calculated as $H(L_c\|K_{c-1})$. If there is a path portion of the search object, and if $i<c\le j$, $K_c$ may be calculated as $H(S_{c-1}\|K_{c-1})$. In step 257, the TIG 102 may search the flat hash map index data structure for any keys/fingerprints that match the value of $K_c$ calculated in step 256. Each of the keys/fingerprints in the flat hash map index data structure has been calculated, using incremental hash generation comprising one or more steps like step 256, from a matching criteria (e.g., a threat indicator) of a policy rule that corresponds to the rule ID to which the key/fingerprint is mapped in the flat hash map index data structure. If one or more matching fingerprints are found, in step 258 the TIG 102 may store, in a results list data structure, a value of the rule ID of each index pair with a matching fingerprint.

Also or alternatively, step 256 of the method of FIG. 2E may comprise calculating keys using a different procedure, and step 257 may comprise searching a flat hash map index data structure that comprises keys/fingerprints also calculated using that different procedure. For example, key calculation in step 256, as well as key/fingerprint calculation for a flat hash map index data structure searched in step 257, may be based on hashes that are based on hashes of multiple individual labels (e.g., if c=1, $K_c$=H($L_1$), if 1<c≤i, $K_c$=H(H($L_c$)||$K_{c-1}$)). As but another example, key calculation in step 256, as well as key/fingerprint calculation for a flat hash map index data structure searched in step 257, may be based on multiple hash functions (e.g., any of the procedures, described above, that uses the hash functions $H_1$, $H_2$, and $H_3$).

After step 258, or after a determination in step 257 that the flat hash map index data structure lacks a key/fingerprint that matches the value of $K_c$ calculated in step 256, the TIG 102 may continue to search the flat hash map index data structure for keys/fingerprints that match additional values of $K_c$ calculated based on additional portions of the search object value. In step 259, the TIG 102 may determine if it has processed all labels and path segments (if present) of the search object. If no, (e.g., if c has not reached a value of i+j), the c counter is incremented by 1 in step 260, and the TIG 102 may repeat portions of the method beginning at step 256. If yes (e.g., if c=i+j), the TIG 102 may in step 261 determine if the thread A3 is still executing and, if it is, terminate execution of the thread A3. After step 261 the TIG 102 may add stored rule ID(s) (stored in a results list during one or more performances of step 258) to rule ID(s), if any, that may be determined using other values from the in-transit packet, and the rule(s) corresponding to all determined rule ID(s) may be applied to the packet. This is described further in connection with FIG. 7.

In a variation of the method of FIG. 2E, the method may be performed in a single thread similar to the method of FIG. 2A, with step 251 performed before step 254, with a "yes" membership determination being a prerequisite to performance of the remaining method steps, and with steps 252, 253, and 261 omitted. In yet another variation of the method of FIG. 2E, membership testing may be omitted (similar to the method of FIG. 2C).

Figure 2F:
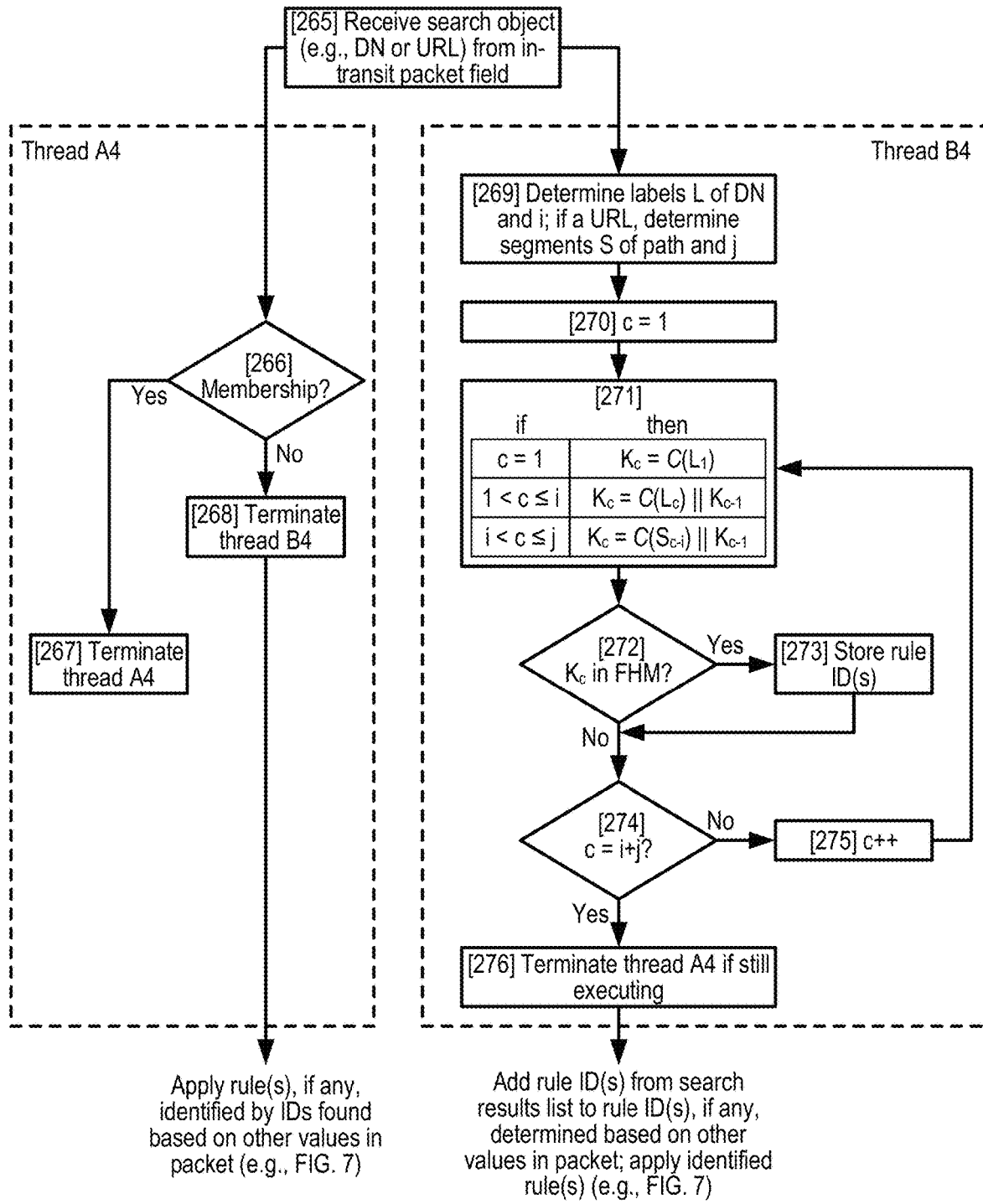

FIG. 2F is a flow chart showing another example method for searching, based on a search object that is obtained from a field of an in-transit packet, a flat hash map index data structure that comprises index pairs for a policy (or portion of a policy). One or more steps of the example method of FIG. 2F may be rearranged (e.g., performed in a different order), combined, omitted, and/or otherwise modified, and/or other steps added. The method of FIG. 2F may be performed by a TIG 102 and is similar to the method FIG. 2E, except that incremental label (and segment, for URL search objects) compression is used instead of incremental label and segment hashing. In the example method of FIG. 2E, the flat hash map index data structure comprises, instead of hash-based fingerprints, compressions (compressed values) calculated, as described above, using a lossless compression function C. Similar to the method of FIG. 2E, the method of FIG. 2F may be performed using a single instance of a flat hash map index data structure that has been configured based on threat indicators in rules created based on domain name CTI and that has also been configured based on threat indicators in rules created based on URL CTI. For example, that single instance of the flat hash index data structure may maps keys, generated by incrementally compressing domain names (or portions of domain names) from matching criteria of first policy rules based on all relevant domain name CTI, to rule IDs of those first policy rules. That single instance of the flat hash index data structure may also map keys, generated by incrementally compressing URLs (or portions of URLs) from matching criteria of second policy rules based on all relevant URL CTI, to rule IDs of those second policy rules.

Steps 265-270 and 273-276 of FIG. 2F are respectively similar to steps 250-255 and 258-261 of FIG. 2E. Step 271 of FIG. 2F is similar to step 256 of FIG. 2E, except that in step 271, the TIG 102 may calculate a compression-based key $K_c$ based on a label or path segment of the search object. For example, if c=1, $K_c$ may be calculated as C($L_1$). If 1<c≤i, $K_c$ may be calculated as C($L_c$)||C($K_{c-1}$). If there is a path portion of the search object, and if i<c≤j, $K_c$ may be calculated as C($S_{c-i}$)||$K_{c-1}$. Step 272 of FIG. 2D is similar to step 257 of FIG. 2E, except that in step 272, the TIG 102 may search the flat hash map index data structure for a key/compression that matches the value of $K_c$ calculated in step 271. Each of the keys/compressions in the flat hash map index data structure has been calculated, using incremental compression comprising one or more steps like step 271, from a matching criteria (e.g., a threat indicator) of a policy rule that corresponds to the rule ID to which the key/compression is mapped in the flat hash map index data structure.

In a variation of the method of FIG. 2F, the method may be performed in a single thread similar to the method of FIG. 2A, with step 266 performed before step 269, with a "yes" membership determination being a prerequisite to performance of the remaining method steps, and with steps 267, 268, and 276 omitted. In yet another variation of the method of FIG. 2F, membership testing may be omitted (similar to the method of FIG. 2C).

Figure 2G:
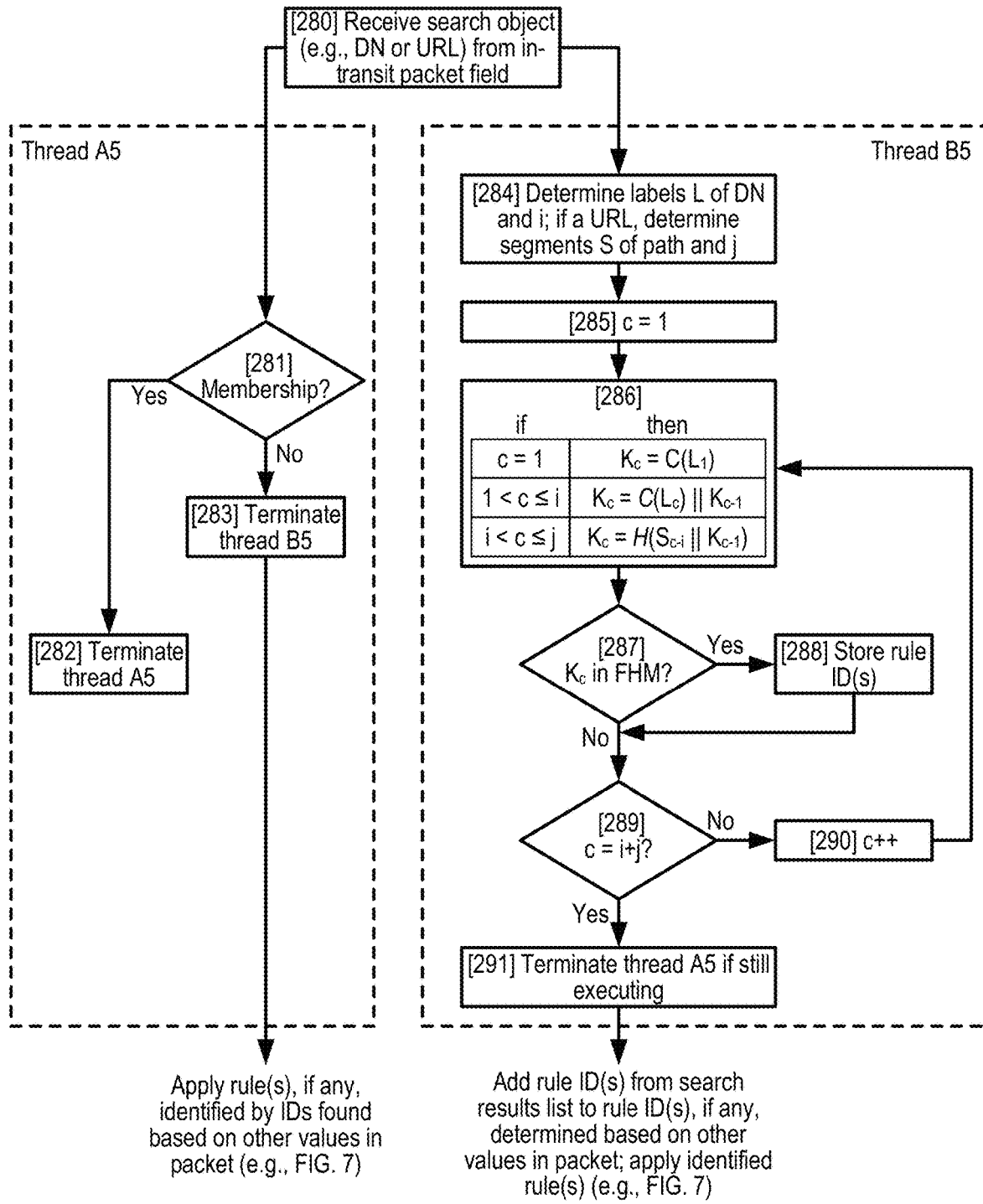

FIG. 2G is a flow chart showing another example method for searching, based on a search object that is obtained from a field of an in-transit packet, a flat hash map index data structure that comprises index pairs for a policy (or portion of a policy). One or more steps of the example method of FIG. 2G may be rearranged (e.g., performed in a different order), combined, omitted, and/or otherwise modified, and/or other steps added. The method of FIG. 2G may be performed by a TIG 102 and is similar to the methods of FIGS. 2E and 2F, except that a combination of incremental hashing and incremental compression is used. In the example method of FIG. 2G, the flat hash map index data structure may comprise compressions and fingerprints based on compression and hashing. Similar to the methods of FIGS. 2E and 2F, the method of FIG. 2G may be performed using a single instance of a flat hash map index data structure that has been configured based on threat indicators in rules created based on domain name CTI and that has also been configured based on threat indicators in rules created based on URL CTI. For example, that single instance of the flat hash index data structure may maps keys, generated by incrementally compressing domain names (or portions of domain names) from matching criteria of first policy rules based on all relevant domain name CTI, to rule IDs of those first policy rules. That single instance of the flat hash index data structure may also map keys, generated by incrementally compressing and hashing URLs (or portions of URLs) from matching criteria of second policy rules based on all relevant URL CTI, to rule IDs of those second policy rules.

Steps 280-285 and 288-291 of FIG. 2G are respectively similar to steps 250-255 and 258-261 of FIG. 2E. Step 286 of FIG. 2G is similar to step 256 of FIG. 2E, except that in step 286, the TIG 102 may calculate a key $K_c$ based on compression or based on combination of compression and hashing. For example, if c=1, $K_c$ may be calculated as C($L_1$). If 1<c≤i, $K_c$ may be calculated as C($L_c$)||C($K_{c-1}$). If there is a path portion of the search object, and if i<c≤j, $K_c$ may be calculated as H($S_{c-i}$||$K_{c-1}$). Step 287 of FIG. 2G is similar to step 257 of FIG. 2E, except that in step 287, the TIG 102 may search the flat hash map index data structure for a key that matches the value of $K_c$ calculated in step 286. Each of the keys in the flat hash map index data structure has been calculated, using incremental compression/hashing comprising one or more steps like step 286, from a matching criteria (e.g., a threat indicator) of a policy rule that corresponds to the rule ID to which the key is mapped in the flat hash map index data structure.

In a variation of the method of FIG. 2G, the method may be performed in a single thread similar to the method of FIG. 2A, with step 281 performed before step 284, with a "yes" membership determination being a prerequisite to performance of the remaining method steps, and with steps 282, 283, and 291 omitted. In yet another variation of the method of FIG. 2G, membership testing may be omitted (similar to the method of FIG. 2C).

The ruletree index data structure disclosed herein is designed to efficiently store keys that are binary strings that may represent full or prefix IPv4 and IPv6 addresses, where the keys may index to identifiers of CTI-derived rules that comprise a cybersecurity policy. Ruletrees may be viewed as an adaptation of a succession of adaptations of well-known index data structures.

Those known trie index data structures include a prefix tree, or trie, an n-ary tree which is designed to efficiently store keys that share prefixes. Links/edges between nodes, i.e., between parent nodes and child nodes, are labeled by a single character comprising the key(s). For binary strings, the prefix tree may be a 2-ary tree with links/edges labeled by a 0 or a 1. Efficient adaptations of the prefix tree include the patricia trie, the radix tree, and the adaptive radix tree.

Those known trie index data structures also include a multi-way trie, or M-way trie, or M-ary trie, where $M=2^k$, k an integer, when the keys are binary strings. The parameter k is called the stride, and the value of k is called the stride length. Each (internal) node in the trie comprises an array with $2^k$ elements. When the keys are binary strings, then the array comprises all possible bit strings of length k. For example, if k=3, then a node's array may be {000,001,010, 011,100,101,110,111}, which requires at least 24 bits to represent. Each node may have up to $2^k$ children, or child nodes. The depth, or number of levels, of a $2^k$-ary trie, may correspond to L/k, where L is the length of the longest key/bit string.

Those known trie index data structures further include a poptrie (described in H. Asai and Y. Ohara, "Poptrie: A Compressed Trie with Population Count for Fast and Scalable Software IP Routing Table Lookup", ACM SIGCOMM Computer Communication Review, vol. 45, no. 4, pp. 57-70, 2015), which is a multi-way trie, or $2^k$-ary trie, that has been adapted and optimized for storing keys that are bit strings representing prefixes of any length and for searching the keys on a per bit basis. The inputs being searched for/looked up are bit strings, and a given input may match a key/prefix of any length that may be less than or equal to the length of the input. A poptrie is optimized for a target application of memory-efficient, fast IP routing table lookups, where the searches/lookups are searching for the single longest prefix match in Internet router tables and where a search/lookup halts when a first matching prefix is found. The keys are bit strings representing IPv4 and IPv6 addresses, which may be both full addresses (32-bit strings for IPv4 and 128-bit strings for IPv6) and prefix addresses (of length less than 32 or less than 128, respectively). The keys map to a router's forwarding information base (FIB) entries. The poptrie adapts the multi-way/$2^k$-ary trie in multiple ways to improve time and space/memory complexity for a target application of IP routing table lookups.

For example, a poptrie may fix the stride length k=6. For the poptrie target application of IP routing table lookups, this value of k may jointly optimize time and space/memory complexities. For example, $2^k=64$, which corresponds to the size of registers of a 64-bit CPU architecture (used in modern Internet routers). Accordingly, many of the poptrie data structures, such as indexing arrays, are of size 64-bits or of sizes that are integer multiples or sub-multiples of 64 and thus can be efficiently processed by the CPU. Furthermore, the data stored in the poptrie, i.e., the keys (IPv4 and IPv6 address prefixes), as well as the input to the lookup/search (i.e., typically full IPv4 and IPv6 addresses), are often bit strings that are multiples (i.e., 128-bit IPv6 addresses) or sub-multiples (i.e., 32-bit IPv4 addresses) of 64 bits.

As another example, the $2^k$-element descendant array comprising an internal node in a $2^k$-ary trie is replaced in part with a $2^k$-bit vector descendant array in a poptrie. The $2^k$-bit vector descendant array requires k times less memory and may require less processing logic with better time complexity than the corresponding $2^k$-element descendant array in a $2^k$-ary trie. The use of a $2^k$-bit vector in poptrie is made possible by the poptrie requirements noted above that searches/lookups may search for the single longest prefix match in Internet router tables and that a search/lookup halts when a first matching prefix is found.

As an additional example, in a poptrie, each key maps to a single leaf node, where each leaf node comprises an index to a corresponding router FIB entry (which may correspond directly to a RIB entry). In a corresponding multi-way/$2^k$-ary trie data structure that does not have the adaptations and optimizations of a poptrie, there may be many duplicate and redundant leaves, which results from the target application's characteristic that many keys may map to the same router FIB entry. A poptrie exploits these redundancies to significantly reduce space/memory requirements. A poptrie internal node may comprise a bit vector called a leafvec that when combined with associated logic may compress duplicate and redundant leaves, which may significantly reduce memory requirements.

As an additional example, a poptrie uses a technique called "direct pointing" that may significantly improve search time performance, although at the cost of a relatively small amount of additional memory. Direct pointing exploits the fact that many keys have prefixes that are longer than the stride length k. By adding an array of length $2^s$ at the root of the poptrie, where s is an integer multiple of k, for example s=12 and k=6, and using the s most significant bits of a key as the direct index into the array, then subsequent searches of the poptrie avoid searching the first s/k levels of the poptrie and instead jump directly in O(1) constant time to an internal node or a (leaf) FIB value.

A ruletree, which may share some characteristics of a poptrie and which may be optimized for storing keys that may be bit strings representing prefixes of any length and for searching the keys on a per bit basis, changes the poptrie data structure to minimize time and space/memory complexity for a target application of CTI-derived rule lookups/searches when enforcing cybersecurity policies comprised of CTI-derived rules. The ruletree's target application has different requirements and constraints than the poptrie's target application, and accordingly the ruletree's internal data structures and logic differ from those of the poptrie. For example: (i) in a poptrie, a key maps to a single leaf node, whereas in a ruletree, a key may map to multiple leaf nodes;

(ii) in a ruletree, a key/prefix may comprise one or more sub-keys/sub-prefixes, each of which may map to one or more leaf nodes as in (i) above, whereas in a poptrie, a key is atomic, i.e., a key/prefix is not comprised of any sub-keys/sub-prefixes; and (iii), in a poptrie, a search/lookup halts when a first leaf node is encountered, whereas in a ruletree, a search/lookup does not halt when a first leaf node is encountered. Accordingly, the poptrie cannot be used for the ruletree's target application. Note that this is not just theoretical—in practice, note in a representative collection of approximately 10 million IPv4 addresses in representative CTI, approximately 9 million are full IPv4 addresses, or /32 IPv4 addresses, and when this IPv4 CTI is stored in a ruletree, >99% of the full IPv4 addresses/keys have two or more leaf nodes. Ruletree adaptations may, without limitation, include the following:

(a) A ruletree internal node comprises internal data structures and logic that are different than those of a poptrie and that accordingly support the requirements (i), (ii), and (iii) above. For example, a poptrie internal node includes a "vector" data structure, which is a 2k-bit array, that comprises the descendant array. The bit value at each index/location in the array indicates whether the corresponding descendant/child node, or transition destination, is a leaf node (e.g., bit value is "0"), in which case the search halts, or another internal node (e.g., bit value is "1"), in which case the search continues. Although this poptrie "vector" bit array may be memory efficient, it cannot support ruletree requirements for CTI-derived rule lookups/searches. Regarding ruletree requirement (i), a single bit value of "0" indicating that the descendant node is a leaf node cannot indicate if there is more than one leaf node. Regarding ruletree requirements (ii) and (iii), a single bit value of "0" indicating that the descendant node is a leaf node cannot indicate if the key indexing the associated leaf node data is a subkey and therefore if the search should continue.

(b) Whereas the poptrie stride k is set to 6 in order to optimize the poptrie's target application, the ruletree stride k may be parameterized and the associated stride length value may be adjusted to jointly optimize time and space/memory complexity relative to time and space/memory requirements and to the data distribution characteristics of the keys. For example:

(b.i) In general, a lower value of k may increase a ruletree's expected search times when compared to a higher value of k because the depth, or number of levels, of the ruletree may increase.

(b.ii) For a given set of keys, different values of k may result in different values for the memory/space required to store the keys in a ruletree.

(b.iii) At the present time of disclosure, for a set of keys comprising a significant portion of available IPv4 CTI, which may be many millions of IPv4 addresses, k=4 may jointly optimize time and space/memory complexity.

(b.iv) If a set of keys has a key length distribution that is highly modal, a particular value of k may result in jointly optimized time and space complexity. For example, if the keys are mostly or all 64-bit strings and/or 128-bit strings, as may occur for example in IPv6 CTI, or as may occur for example in a 64-bit or 128-bit fingerprint ruletree, then k=6 may optimize time and space complexity. Also, for such modal distributions, the poptrie direct pointing strategy may significantly improve time complexity and associated search performance. Furthermore, direct pointing may be used at one or more non-root levels to further improve time complexity. And yet furthermore, highly modal key length distributions may reduce the number of internal leaf nodes, resulting in increased space savings;

(b.v) For a given set of keys, optimal performance may be achieved by using different values of k for different sub-trees of a ruletree;

(c) In a poptrie, where the target application may be fast IP routing table lookups, a leaf node may index to a FIB entry for the key (i.e., an IP address prefix). Whereas in a ruletree, where the target application may be CTI-derived rule lookups/searches when enforcing cybersecurity policies comprised of CTI-derived rules, a key's one or more leaf nodes may associate to a set of rule identifiers, where each rule identifier may associate to a rule with matching criteria comprising the key. The rule identifiers, or elements, in the set may be stored in an efficient data structure that may preserve the rank ordering of the rule identifiers, where the rank ordering indicates the order in which the rules are to be applied to a matching packet (i.e., an in-transit packet comprising a value matching the key). For example, the elements may be stored in rank order in an ordered linked list, where the head of the list comprises the rule identifier of the highest-ranked rule, and the element at the end of the list comprises the rule identifier of the lowest-ranked rule. In some cases, for example when the rules include a "quick" keyword/directive, only the highest-ranked rule may be applied to a matching packet. In such cases, the rule identifier corresponding to the highest-ranked rule may be stored in a high-speed cache to improve time performance, and/or the rule identifiers corresponding to the lower-ranked rules may be discarded to reduce space/memory usage;

(d) In a poptrie, a lookup/search halts when a leaf node is first encountered, i.e., when an input first matches a key stored in the poptrie. For example, for the target application of fast IP routing table lookups, the key corresponds to the longest prefix in the routing table that matches the input, which may be a 32-bit IPv4 address or a 128-bit IPv6 address. Because of the search/lookup halting when a leaf node is first encountered, the logic complexity and memory requirements for a poptrie's internal node may be significantly reduced. For a ruletree, however, reaching a first leaf node is not what causes a lookup/search to halt. Instead, searching continues until the entire input has been searched for all matching prefixes. Accordingly, a ruletree's internal nodes and leaf nodes require more memory and more complex logic and data structures, as described in (4)(c) above.

FIGS. 3A-3D, together with the below description of those figures, provides flowcharts/algorithms and a description of an example implementation of a ruletree in the context of cybersecurity policy enforcement applications. The following description shows that a ruletree may meet the requirements of such applications, whereas a poptrie cannot meet such requirements.

Figure 3A:
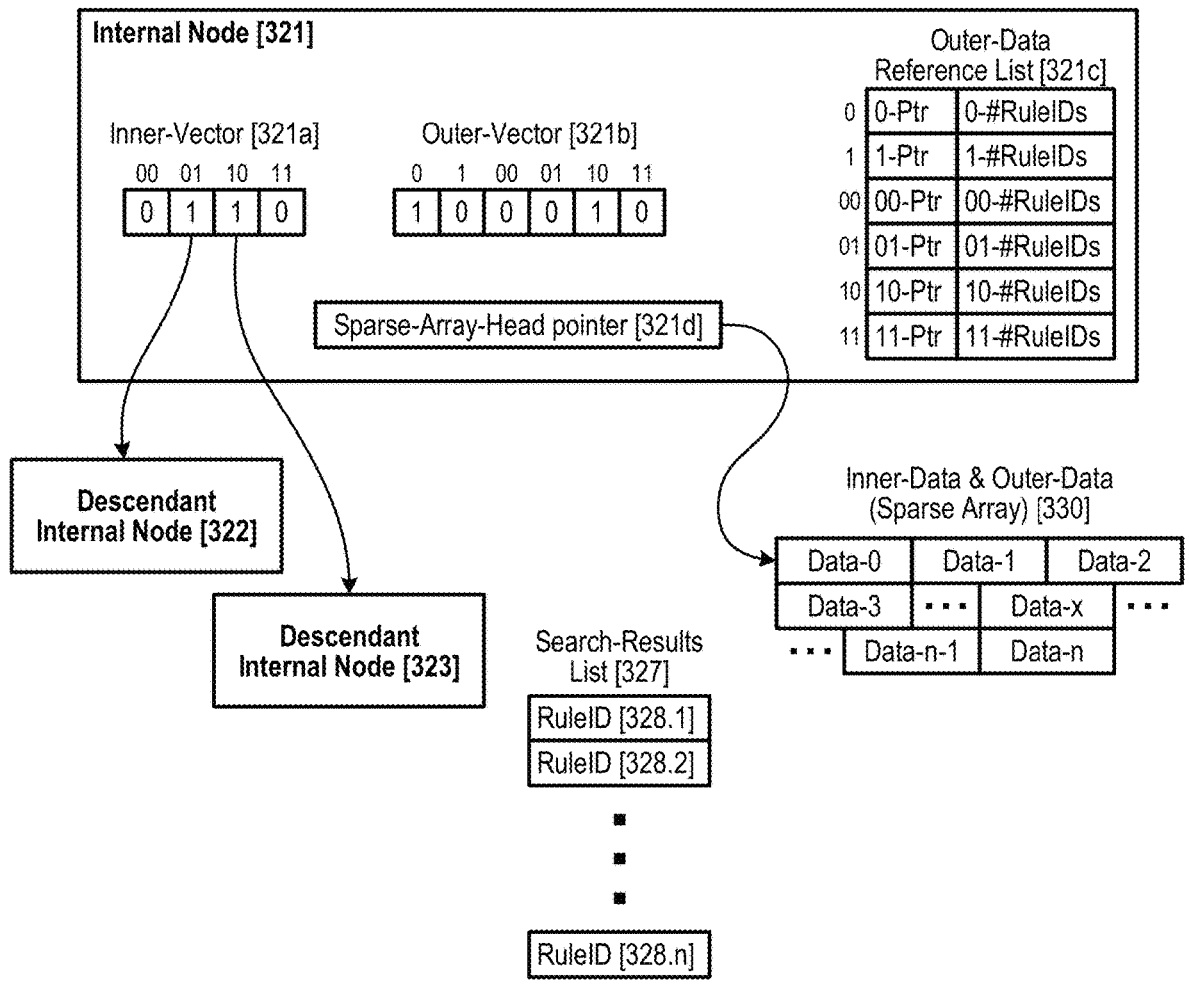
FIG. 3A shows an example ruletree and related data structures.

FIG. 3A shows an example ruletree 320 and related data structures, including an example ruletree internal node 321 and associated (external) data structures 327 (labeled "Search Results List") and 330 (labeled "Inner-Data & Outer-Data"). Each internal node in a ruletree processes a k-bit portion, or chunk, of a bit string, where k is the stride and also the stride length. In the exemplary internal node

321, stride length k=2. Note that k=2 is used here to simplify the example, but in practice, stride length k should be selected to provide the best performance, which may be measured as a combination of time complexity and space/memory complexity in the context of the expected data elements stored in the ruletree and the associated applications.

For k=2, there may be six (6) possible values of a chunk being processed by an internal node: "0", "1", "00", "01", "10", "11". In general, and for reasons explained below, there may be $2^{k+1}-2$ possible chunk values for a k-bit chunk. The bit strings being processed by the ruletree may be keys, or indexes, that map to values (e.g., rule IDs), or the bit strings may be search objects. For the exemplary applications, the keys and search objects may be IPv4 and IPv6 addresses, either prefixes or full IP addresses, and the values may be rule identifiers/rule IDs associated with a cybersecurity policy.

The internal node 321 may comprise an Outer-Vector 321*b*, which may be a bit array of length $2^{k+1}-2$ and that may be indexed by each possible value of a current chunk being processed by the internal node 321, as shown by smaller numbers over boxes of the Outer-Vector 321*b*. A "0" value in that bit array at a location/index corresponding to a chunk value may indicate that there are no values, for example, no rule IDs, to which the corresponding key or subkey maps; whereas a "1" value in the bit array at a location/index corresponding to a chunk value may indicate that there are values, for example, one or more rule IDs, to which the corresponding key or subkey maps. The mapped values, e.g., rule IDs, may be called "Outer-Data" nodes, as the associated data may be stored in memory (e.g., in a sparse array, as described below for the Inner-Data & Outer-Data 330) that is external to, or outer to, the Internal Node 321 structure. In poptrie terminology, a poptrie "leaf node" may somewhat correspond to a ruletree Outer-Data node; however, different terminology is used for a ruletree because for a poptrie and for tree data structures in general, a "leaf node" is typically associated with a data value representing the final/terminal internal node of a path through a poptrie that originates from the root node of the poptrie; whereas a ruletree may have one or more data values associated with any node on a path through the ruletree. A poptrie does not support associating a data value with any node on a path other than the final/terminal node, whereas a ruletree supports associating multiple data values with any node on a path through the ruletree. Accordingly, a poptrie search will return at most one data value, whereas a ruletree search may return multiple values/rule IDs, which may be stored in the "Search-Results list" data structure 327, described further below. Outer-Data nodes, for example comprising rule IDs, may be efficiently stored in an (external/outer) data structure such as a well-known sparse array or sparse matrix data structure, exemplified in FIG. 3A by the "Inner-Data & Outer-Data" sparse array data structure 330.

The Outer-Data node(s) associated with a "1" element in the Outer-Vector bit array 321*b* may be referenced into the Inner-Data & Outer-Data sparse array 330 via the "Outer-Data Reference List" data structure 321*c*, which includes pointers into the sparse array as well as indications of how many Outer-Data nodes (e.g., rule IDs), are associated with the corresponding key or subkey (e.g., a prefix of the key). For example, the Outer-Vector index location "0" is set to 1, indicating the existence of one or more Outer-Data nodes, or rule IDs, associated with the corresponding key or subkey. The Outer-Data node(s) may be referenced by the corresponding "0-Ptr" pointer that points to the location in the Inner-Data & Outer-Data sparse array 330 where the Outer-Date node(s) are located. The "0-#RuleIDs" value indicates the number/quantity of Outer-Data nodes, or rule IDs, associated with the corresponding key or subkey. When an Outer-Vector 321*b* bit array element is set to "0", for example at index/location "01", then the corresponding 01-Ptr value is null and the 01-#RuleIDs value is zero.

For convenience, FIG. 3A also shows that the internal node 321 also comprises a Sparse-Array-Head pointer 321*d*. However, ruletree internal nodes need not contain both a pointer such as the pointer 321*d* and pointers in an outer data reference list such as the Outer-Data Reference List 321*c*. Multiple pointers, such as those shown in the Outer-Data Reference List 321*c*, may be used if rule IDs are stored in discontinuous memory blocks. Multiple pointers may not be needed, however, if the rule IDs associated with an internal node are in a single memory block such that memory locations of specific rule IDs can be determined based on offsets from a memory location indicated by a single pointer. Indeed, internal nodes of a ruletree may omit reference lists such as the Reference List 321*c*, and information shown in the Reference List 321*c* may be inferred and/or calculated from other information in an internal node. For example, if a sparse array is used to store Reference List information, a single pointer such as the Sparse-Array-Head pointer 321*d* may reference the beginning, or head, of the sparse array in memory (e.g., local main memory), and may be included in a ruletree internal node. The values of pointers to, and quantities of Outer-Data nodes in, the Inner-Data & Outer-Data sparse array 330 may be determined/computed dynamically as needed. For example, an Outer-Data pointer value such as 0-Ptr may be computed efficiently as an offset from the Sparse-Array-Head pointer 321*d* by, for example, counting the "1" entries in an Inner-Vector 321*a* bit array and the Outer-Vector 321*b* bit array that precede the "1" value/element in the Outer-Vector 321*b* bit array that is currently being processed. Note that a ruletree search differs from an analogous poptrie search in that if a poptrie search encounters a data value/leaf node, for example when a first matching prefix is found, then the search halts; whereas if a ruletree search encounters a data value, which may be indicated by a "1" element/value in the Outer-Vector 321*b* bit array, the search may not halt. The existence of a "1" element anywhere in an Outer-Vector bit array of a ruletree internal node does not indicate in any way whether or not the search halts.

The Inner-Vector 321*a* is a bit array of length $2^k$ that may be indexed by each possible k-bit value of the next chunk to be processed by a descendant internal node. For k=2, the four (4) possible values of a next chunk to be processed by a descendant internal node may be "00", "01", "10", "11". If the next chunk is of length less than k, e.g., for k=2 if the next chunk is "0" or "1" (which may indicate the end/last bit of the key or search object), then the next chunk may be mapped to the k-bit index that has trailing zeroes, for example if the next chunk is "0", then it may be mapped to the index "00", and if the next chunk is "1", then it may be mapped to the index "10". For a given index/next chunk value, if the corresponding Inner-Vector bit array element/value is "1", then there is a descendant internal node for processing the next chunk. In FIG. 3A, the exemplary internal node shows an Inner-Vector 321*a* bit array with locations/indexes for "01" and "10" set to "1", which indicates that there are respective descendant internal nodes 322 and 323 for processing the next chunks "01" and "10" and "1". The descendant internal nodes 322 and 323 (and/or other internal nodes of the ruletree 321) may be similar to, and operate in the same way, as the internal node 321. The locations/indexes for "00" and "11" are set to "0", which indicates that there are no descendant internal nodes for processing the next chunks "00" and "11". As explained in more detail in connection with steps 357 and 358 of FIG. 3C, this indicates that a search may halt if the search object's next chunk is "0", "00", or "11".

An internal node's Inner-Vector 321a and Outer-Vector 321b comprise Inner-Data nodes that may also be stored in the Inner-Data & Outer-Data sparse array 330. Each internal node's Inner-Data nodes and Outer-Data nodes may be stored in the same sparse array. Similar to the Outer-Data, the location of Inner-Data nodes in the sparse array may be computed as an offset from the single pointer referencing the head of the sparse array by, for example, counting the "1" entries in the Inner-Vector bit-array that precede the "1" value in the Inner-Vector bit-array that is currently being processed. In the example of FIG. 3A, Inner-Data nodes and/or Outer-Data nodes stored in the Inner-Data & Outer-Data sparse array 330 are shown as data node Data-0 through Data-n.

As noted above, the Search-Results list 327 may be used to store data values/rule IDs that are encountered during a search through a ruletree (shown in the example of FIG. 3A as RuleIDs 328). When the search halts, the Search-Results list 327 may be returned to the process that issued the associated query. If there is a (total) ordering associated with the data values/rule IDs, for example the rule IDs may correspond to the non-negative integers 0, 1, 2, 3, . . . , then the Search-Results list 327 may be maintained in sorted order. As described elsewhere, the rules associated with the rule IDs in a Search-Results list may be applied to the packets in the order corresponding to the ordering of the rule IDs. For example, the highest-ranked rule to be applied first may be the rule associated with the rule ID in the Search-Results list 327 corresponding to the lowest-valued non-negative integer, which may be the rule ID at the head of the Search-Results list 327. By maintaining the Search-Results list 327 in sorted order, the application that invoked the search may opt to apply in order, for example: (1) only the first/highest ranked rule corresponding to the rule ID at the head of the (sorted) Search-Results list 327; (2) the first N rules, or the N highest-ranked rules, in the (sorted) Search-Results list 327; or (3) all of the rules in the (sorted) Search-Results list 327.

Based on the above description of the ruletree 320 and related data structures shown in FIG. 3A, the purpose of having $2_{k+1}-2$ possible chunk values for a k-bit chunk is more readily explainable. For at least some types of search objects (e.g., IPv4 or IPv6 addresses), there may be one or more rule IDs mapped to by a particular combination of values for all bits in the chunk, and one or more different rule IDs mapped to by a single bit of the chunk (or to a combination of values of less than all bits of the chunk if k >2). As yet another reason for having $2^{k+1}-2$ possible chunk values for a k-bit chunk, there may be circumstances in which key may have a length that is not evenly divisible by k. For example, for a 7-bit key and k=2, the final chunk being processed will be a single bit that is the LSB of the 7-bit key.

The application of the above to k-bit chunks where k >2 is readily apparent. For each sub-portion of the chunk that includes the MSB(s) of the chunk, there may be different rule ID(s) mapped to by combinations of bit values for that sub-portion. Rule ID(s) mapped to by a bit value or combination of bit values for a first sub-portion of the chunk (e.g., "11" for k=4) may be different from rule ID(s) mapped to by a combination of bit values for a second sub-portion of the chunk that includes the first sub-portion (e.g., "110"), and may also be different from rule ID(s) mapped to by a combination of bit values for the entire chunk (e.g., "1101").

Figure 3B:
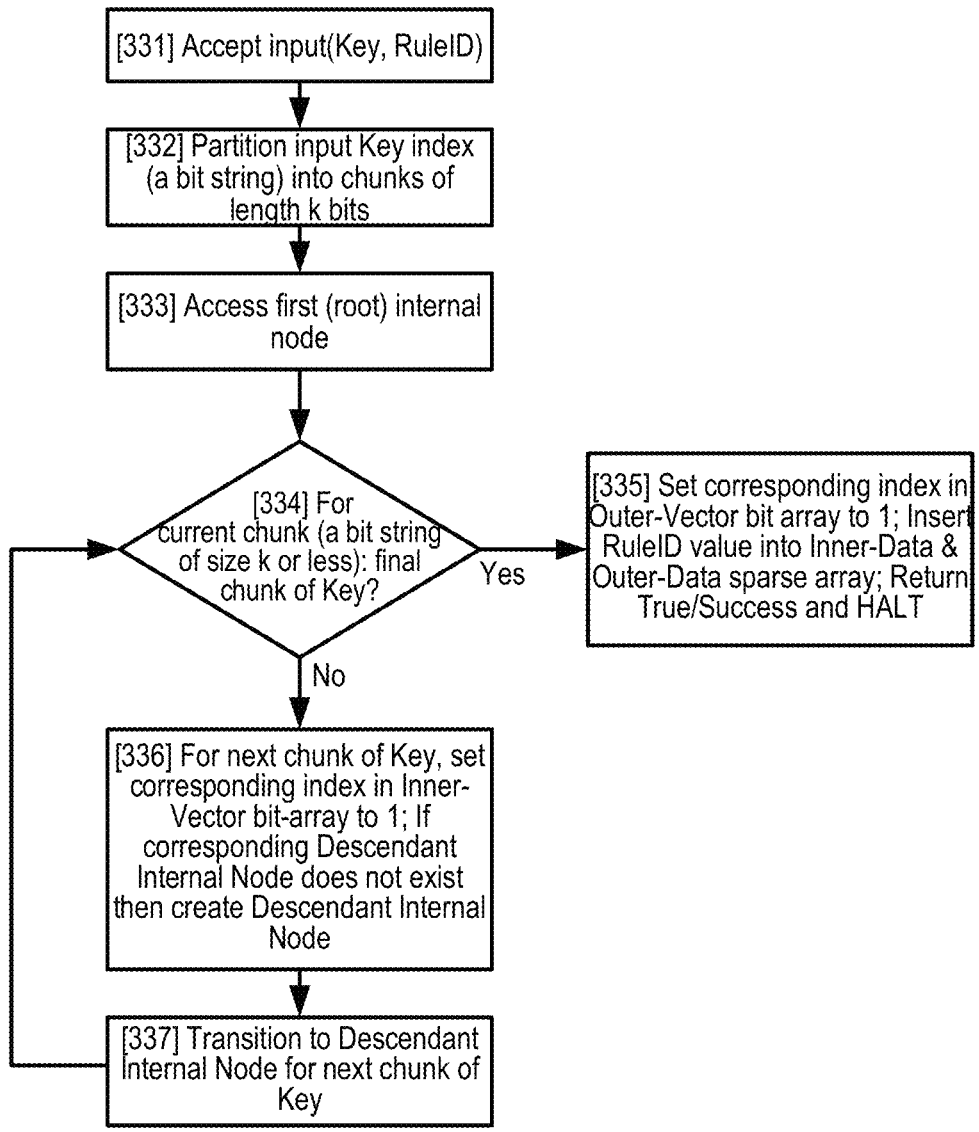
FIG. 3B is a flow chart showing an example method for ruletree key insertion.

FIG. 3B is a flow chart showing an example method for ruletree key insertion. The exemplary ruletree may be comprised of internal nodes and other data structures as exemplified in FIG. 3A. A ruletree instance may be created and initialized with a single root internal node (not shown in FIG. 3B) configured with a stride k, for example k=2 as in FIG. 3A, in which both the Inner-Vector and Outer-Vector bit arrays may be initialized to all zeroes, e.g., all "0" elements/bits, and which may be stored as Inner-Nodes in the root internal node's Inner-Data & Outer-Data sparse array. The method of FIG. 3B may, for example, be performed by a TIG 102. Although other computing devices may also or alternatively perform the method of FIG. 3B (e.g., one or more SPMSSs 107), for convenience that method is described in context of performance by a TIG 102. One or more steps of the example method of FIG. 3B may be rearranged (e.g., performed in a different order), combined, omitted, and/or otherwise modified, and/or other steps added.

At step 331, a "Key" value may be accepted as an input. The Key value may, for example, be a bit string representing an IP address prefix (which may be a full IP address). A "RuleID" value, for example a rule ID, which may be for example a non-negative integer corresponding to a packet filtering rule (comprised by a policy) with matching criteria comprising the Key value/IP address prefix. The Key value (the IP address prefix) may be an index that maps to the RuleID value.

At step 332, the Key bit string/IP address prefix may be partitioned into substrings of length k, for example, when stride k=2 then the bit string is partitioned into 2-bit substrings, or 2-bit chunks. The chunks may be processed in the order of most-significant bits to least-significant bits of the associated IP address prefix.

At step 333, the root internal node, which may be identified as the current internal node, may be accessed to process the first chunk, which may be identified as the current chunk.

At step 334, the TIG 102 may determine if the current chunk, which may be a bit string of length k or less, is the final chunk of the Key, for example, the chunk comprising the k-least significant bits of the IP address prefix (which may be a full IP address, i.e., a /32 IPv4 address prefix or a /128 IPv6 prefix).

If the current chunk is the final chunk, the TIG 102 at Step 335 may set or reset to "1" the Outer-Vector bit array element at the index/location corresponding to the current/final chunk, for example, referencing FIG. 3A, if the final chunk is the bit-string "10", then the Outer-Vector bit array 321b element at the location corresponding to "10" may be set to "1". In step 335, the TIG 102 may also insert the data value/rule ID into the Inner-Data & Outer-Data sparse array 330 data structure associated with the current internal node (which, in concept, may update the internal node's Outer-Data Reference list), and may return/signal successful insertion and halt the insertion process.

If the current chunk is not the final chunk, the TIG 102 may at step 336 access the next chunk of the Key and set or reset to "1" the Inner Vector bit array element at the index/location corresponding to the next chunk. As part of step 336, the TIG 102 may, if a corresponding descendant internal node does not exist, create and initialize a descendant internal node.

At step 337, the TIG 102 may transition to/access the descendant internal node corresponding to the next chunk, may identify the next chunk as the current chunk, may identify the descendant internal node as the current internal node, and may repeat portions of the method beginning at step 334.

The method of FIG. 3B may be performed separately in connection with different keys that may map to different rule IDs, but which may correspond to overlapping portions of a search object. For example, the method of FIG. 3B may be performed in connection with a first key (e.g., "11010010") that corresponds to the 8 MSBs of an IP address and that is mapped to one or more first rule ID(s). The method of FIG. 3B may be repeated in connection with a second key (e.g., "110100101101") that corresponds to the 12 MSBs of an IP address and that is mapped to one or more second rule ID(s). When the resulting ruletree is later searched (e.g., as described below in connection with FIG. 3C) based on a search object "110100101101 . . . " (with " . . . " here indicating portions of an IP address omitted for simplicity), both the one or more first rule ID(s) and the one or more second rule ID(s) may be added to the search results list.

Figure 3C:
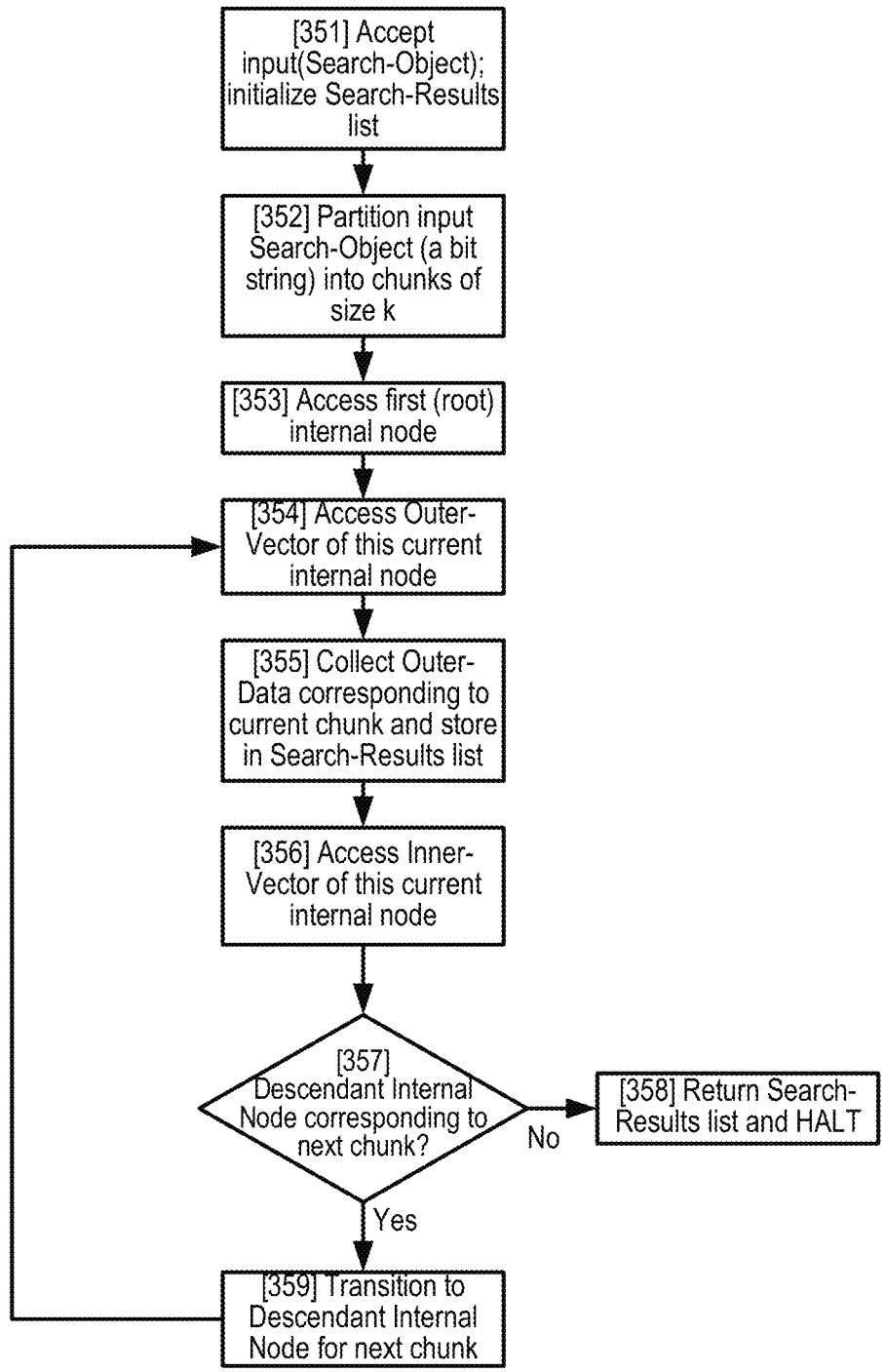
FIG. 3C is a flowchart showing an example method for searching a ruletree such as the example ruletree of FIG. 3A.

FIG. 3C is a flowchart showing an example method for searching a ruletree such as the example ruletree 320. For an input IP address, the process may search the ruletree for all matching prefixes of the input IP address and may return all of the rule ID values associated with each matching prefix. The method of FIG. 3C may, for example, be performed by a TIG 102. One or more steps of the example method of FIG. 3C may be rearranged (e.g., performed in a different order), combined, omitted, and/or otherwise modified, and/or other steps added.

At step 351, the method may accept as input a Search-Object value, which may be, for example, a bit string representing a full IP address, which may be an IP address comprising an (in-transit) packet being filtered against a cybersecurity policy comprising packet filtering rules. A Search-Results list may be initialized as an empty list.

At step 352, the Search-Object value/bit string/IP address may be partitioned into substrings of length k, for example, when stride k=2 then the bit string is partitioned into 2-bit substrings, or 2-bit chunks. The chunks may be processed in the order of most-significant bits to least-significant bits of the associated IP address.

At step 353, the root internal node, which may be identified as the current internal node, may be accessed to process the first chunk, which may be identified as the current chunk.

At step 354, the Outer-Vector bit array of the current internal node may be accessed. For each location/index of the bit array corresponding to the current chunk, if the corresponding element in the bit array is "1", then there may be one or more rule ID values associated with the Search-Object value/IP address. For example, referring to the Internal Node 321 of FIG. 3A, if the current chunk is the bit string "10", the "1" element in the Outer-Vector 321b bit array at the location/index "10" may indicate that there are one or more associated rule ID values (which may be stored as Outer-Nodes in the Inner-Data & Outer-Data sparse array 330). Note in FIG. 3A that the first bit of the current chunk is a "1", and the "0" element in the Outer-Vector bit array at the location/index "1" may indicate that there are no associated rule ID values.

At step 355, all Outer-Data, or rule ID values, associated with the current chunk may be collected from the Inner-Data & Outer-Data sparse array (e.g., the Inner-Data & Outer-Data sparse array 330) and inserted into the Search-Results list (e.g., the Search-Results list 327), which may be maintained in sorted order.

At step 356, the Inner-Vector bit array of the current internal node (e.g., the Inner-Vector bit array 321a) may be accessed.

At step 357, for the next chunk (if any) of the Search-Object value/bit string/IP address, if the Inner Vector bit array element at the location/index corresponding to the next chunk is "1", there may be a Descendant Internal Node for the next chunk. If the Inner Vector bit array element at the location/index corresponding to the next chunk is "0", there may not be a Descendant Internal Node for the next chunk.

If there is a Descendant Internal Node for the next chunk, at step 359 the TIG 102 may transition to/access the descendant internal node corresponding to the next chunk, may identify the next chunk as the current chunk, may identify the descendant internal node as the current internal node, and may repeat portions of the method beginning at step 354.

If there is not a Descendant Internal Node for the next chunk, the TIG 102 at step 358 may return the Search-Results list and may halt the search of the ruletree.

As can be appreciated from the above, each of the chunks of a search object may correspond to a combination of bit values that results in no, one, or multiple rule IDs being added to the search results list. As but one possible example, a search object may comprise chunks $k_1 k_2 k_3 k_4 \ldots k_n$. Chunk $k_1$ may comprise a combination of bit values for which a corresponding inner-vector array element of a root internal node indicates a corresponding descendant internal node (at a second level of the ruletree), but for which there is no outer-vector array element that indicates there are one or more corresponding rule IDs. Chunk $k_2$ may comprise a combination of bit values for which a corresponding inner-vector array element of the second level descendant internal node indicates a corresponding descendant internal node (at a third level of the ruletree), and for which there are one or more outer-vector array elements that indicate there are one or more corresponding rule IDs. Chunk $k_3$ may comprise a combination of bit values for which a corresponding inner-vector array element of the third level descendant internal node indicates a corresponding descendant internal node (at a fourth level of the ruletree), but for which there is no outer-vector array element that indicates there are one or more corresponding rule IDs. Chunk $k_4$ may comprise a combination of bit values for which a corresponding inner-vector array element of the fourth level descendant internal node indicates that there is a corresponding descendant internal node (at a fifth level of the ruletree), and for which there are one or more outer-vector array elements that indicate there are one or more corresponding rule IDs. Any of the additional chunks $k_5$ through $k_n$ may similarly comprise combinations of bit values for which there may or may not be outer-vector array elements indicating the presence of one or more corresponding rule IDs. Moreover, any of the chunks $k_5$ through $k_n$ may comprise a combination of bit values for which an inner-vector indicates that there is no corresponding descendant internal node at the next lower level.

Figure 3D:
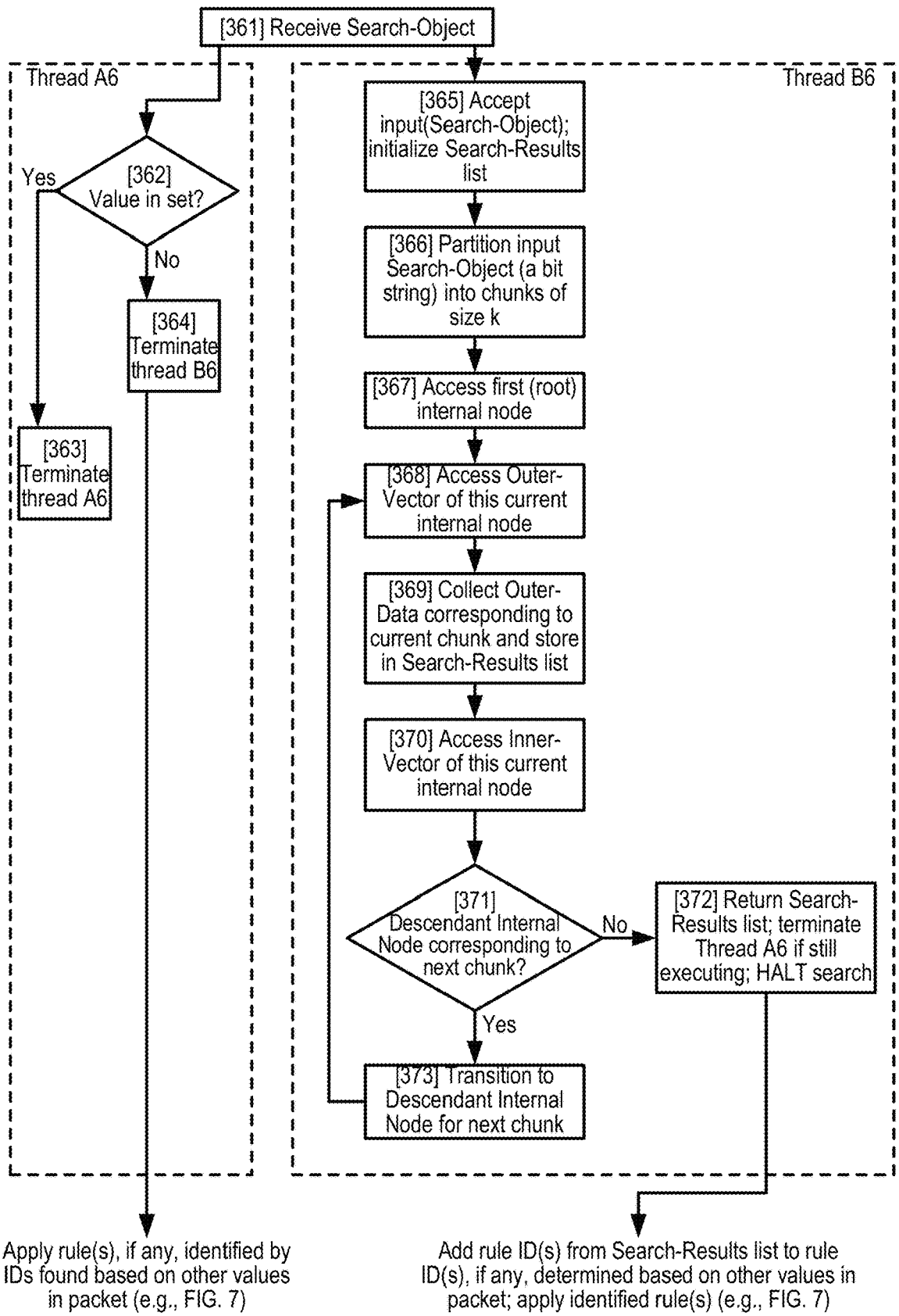
FIG. 3D is a flowchart showing another example method for searching a ruletree such as the example ruletree of FIG. 3A.

FIG. 3D shows how the method of FIG. 3C may, similar to the methods described in connection with previous figures, be performed concurrently with a membership test of a set data structure. One or more steps of the example method of FIG. 3D, which may, for example, be performed by a TIG 102, may be rearranged (e.g., performed in a different order), combined, omitted, and/or otherwise modified, and/or other steps added. In the method of step 3D, step 362 (which may be the same as step 216 of FIG. 2B) is performed in a first processing thread A6, and steps 365-373 are performed in a concurrent second processing thread B6. In the method of FIG. 3D, based on receipt of a search object in step 361, membership testing is initiated in thread A6 and a search of the ruletree is initiated in thread B6. If the TIG 102 determines membership in step 362, the thread A6 may be terminated in step 363. If the TIG 102 determines no membership in step 362, thread B6 may be terminated in step 364, and rules, if any, determined using other values from the in-transit packet may be applied. Steps 365-373 may be the same as steps 351-359 for FIG. 3C, except that step 372 may further comprise terminating execution of the thread A6, if necessary. In a variation of the method of FIG. 3D, the method may be performed in a single thread similar to the method of FIG. 2A, with step 362 performed before step 365, with a "yes" membership determination being a prerequisite to performance of the remaining method steps, and with steps 363 and 364 omitted. In yet another variation of the method of FIG. 3D, membership testing may be omitted (similar to the method of FIG. 2C).

The best index data structure for a given threat indicator type may vary depending on requirements and performance. For example, a ruletree with certain parameter values, for example a stride length of 4, may be a better choice for IPv4 and IPv6 threat indicators than a flat hash map. Furthermore, when both IPv4 and IPv6 threat indicators are in use (for example, in the policy), then separate instances of ruletrees may be used to improve performance, for example, one ruletree instance for mapping IPv4 threat indicators to corresponding rules, and another separate ruletree instance for mapping IPv6 threat indicators to corresponding rules in a policy. Note, however, that separate instances of ruletrees for IPv4 and IPv6 may be required, regardless of any factors such as performance, because a ruletree may interpret an IPv4 indicator as a subkey of an IPv6 indicator, which is an error. Also, an IPv6 prefix indicator that is 32 bits or shorter may be interpreted by a ruletree as a subkey of an IPv4 indicator, which is also an error. On the other hand, for example, hash maps may be a better choice for domain name threat indicators and URI threat indicators. And yet even furthermore, performance may be improved if a single instance of a hash map is used for mapping base/registrable domain name indicators, FQDN indicators, and URLs to corresponding rules in a policy.

In addition to supporting time- and space-efficient policy searching, the index data structures, as well as the set data structures, may also support other requirements and/or properties associated with efficient TIG-based cybersecurity policy enforcement for protecting networks.

These requirements and/or properties may comprise time-efficient key/threat indicator searching. For example, an index data structure may be selected (at least in part) so that the expected time to search for a key/threat indicator in an index data structure may be less than the current average in-transit packet transmission rate such that in-transit packet buffers do not overflow.

These requirements and/or properties may also or alternatively comprise time- and/or space-efficient key/threat indicator insertion. For example, an index data structure may be selected (at least in part) based on the expected time to insert a key (for example, a threat indicator) and its associated mapped values (for example, one or more rule identifiers) into an index data structure, and/or the expected additional space/memory required to incorporate a key and values into an index data structure.

These requirements and/or properties may also or alternatively comprise time- and/or space-efficient key/threat indicator deletion. For example, an index data structure may be selected (at least in part) based on the expected time to delete a key (for example, a threat indicator) and its associated mapped values (for example, one or more rule identifiers) from an index data structure, and/or the expected reduction in space resulting from the deletion. Note that in some scenarios, a delete operation may not be required, in which case an associated index data structure may be different than for scenarios where a delete operation is required.

These requirements and/or properties may also or alternatively comprise time- and/or space-efficient index data structure population for an entire policy. For example, an index data structure may be selected (at least in part) based on the time to populate an index data structure with all of the keys/threat indicators and associated mapped values for an entire policy. Note that in some scenarios, for example, the policy being enforced by a TIG may be exchanged, swapped, or otherwise updated with different information on a regular basis or cycle, for example, in response to changes in CTI, which may affect the choice of index data structure.

The requirements and/or properties associated with efficient TIG-based cybersecurity policy enforcement for protecting networks may comprise dynamic (runtime) key/threat indicator insertions and deletions. For example, in some scenarios, an index data structure may be selected (at least in part) because it may be required to update the policy search data structures during runtime, e.g., when a TIG is actively performing policy enforcement on in-transit packets. For example, instead of swapping the currently enforced policy with a new/updated policy, a TIG may dynamically update the currently enforced policy during runtime/execution by, for example, inserting new CTI-derived packet filtering rules into the currently enforced policy, which requires that the associated threat indicators and rule IDs be inserted into the associated set and index data structures at runtime/during execution; and/or a currently enforced policy may be updated by deleting CTI-derived packet filtering rules, and the associated threat indicators and rule IDs may be deleted from the associated set and index data structures at runtime/during execution. Ruletrees, for example, may be implemented to support dynamic/runtime insertions and deletions, and thus may support these scenarios.

The requirements and/or properties associated with efficient TIG-based cybersecurity policy enforcement for protecting networks may comprise information security for keys/threat indicators. For example, in some scenarios, an index data structure may be selected (at least in part) because it may be required to secure the keys/threat indicators in a set or index data structure such that the keys/threat indicators are not stored in their plaintext or native bit-string representations (e.g., 32-bit IPv4 addresses) or are not stored using reversible functions, so that, for example, the keys/threat indicators may be kept secret from a (malicious) observer. As described above, the keys/threat indicators of flat hash maps that store fingerprints and of fingerprint ruletrees may be secured because the hash functions used to compute the fingerprints may be irreversible functions and therefore may not practically be inverted into their original representations. Ruletrees storing, for example, IP addresses or reversible compressions may not be secured in this way, and if not, a (malicious) observer may read the keys/threat indicators in their original representations. Similarly, for probabilistic set data structures such as Bloom filters and Cuckoo filters, which may use (irreversible) hash functions, the threat indicators contained in the set may not be determined by a (malicious) observer.

Generally, with respect to the above requirements and properties for the set and index data structures, there may be tradeoffs to be made between properties and requirements of the different index data structures and set data structures with respect to TIG performance in policy enforcement. For example, time requirements may be traded off with space requirements, e.g., more space/memory may be used to reduce policy search times. One example described above and below is the use of set data structures for performing existence/membership tests before or concurrently with performing policy searches. The set data structures are not required and increase space/memory requirements, but the time performance of TIG policy enforcement may be improved.

As described above, an index data structure for searching a CTI-derived policy may be comprised of keys, which correspond to threat indicators comprised by or otherwise associated with one or more packet-filtering rules of a CTI-derived policy, that map to one or more rule identifiers for the one or more rules associated with a key/threat indicator. For example, a domain name threat indicator "www.badactors.com" that comprises the matching criteria of the $10^{th}$ rule in the ordered list of rules (e.g., a policy) with rule identifier "rule-10" may be represented in an index data structure as a key "www.badactors.com" that maps to a value "rule-10". Then, for example, when a TIG 102 is filtering an in-transit packet that contains the domain name "www.badactors.com", the TIG 102 will search the index data structure for the key/threat indicator "www.badactors.com", e.g., the TIG 102 tests if the key/threat indicator exists in the index data structure (which is True). Thus, in effect, a search for a key/threat indicator in an index data structure is equivalent to an existence/membership test for an element/threat indicator in the set of all keys/threat indicators contained in the index data structure. And thus, index data structures that correspond to a CTI-derived policy may obviate the need for any set data structures for testing membership of threat indicators that comprise the matching criteria of the packet-filtering rules comprising the CTI-derived policy.

Nevertheless, in some cases, overall TIG packet filtering performance may be improved by using set data structures in addition to index data structures. An existence/membership test of a set data structure may be (on average) significantly faster than the corresponding key search of an index data structure. As noted above, in practice typically only a small fraction of real-world in-transit packets filtered by a TIG 102 will match any CTI-derived packet-filtering rule of a TIG-enforced cybersecurity policy. Thus, performing an existence/membership test for a potential threat indicator in a set data structure before (or concurrently with) performing a (slower) key search for the potential threat indicator in an index data structure may eliminate many unnecessary key searches (or halt or abandon concurrent key searches before completion). This may improve overall packet filtering performance of a TIG 102 by reducing the average/expected time to filter each packet. Therefore, if the TIG's main memory budget or allocation for storing all of the index data structures for the policy is not exceeded, then set data structures may be added to main memory until the budget/allocation is met. For example, the $2^{32}$-bit array set data structure for indicating IPv4 addresses in the policy supports very fast existence/membership tests and requires 512 MB (i.e., $2^{29}$ bytes) of memory. If there is more than 512 MB remaining in the main memory budget, then this set data structure may be added and overall packet filtering and policy enforcement performance may improve.

Figure 4:
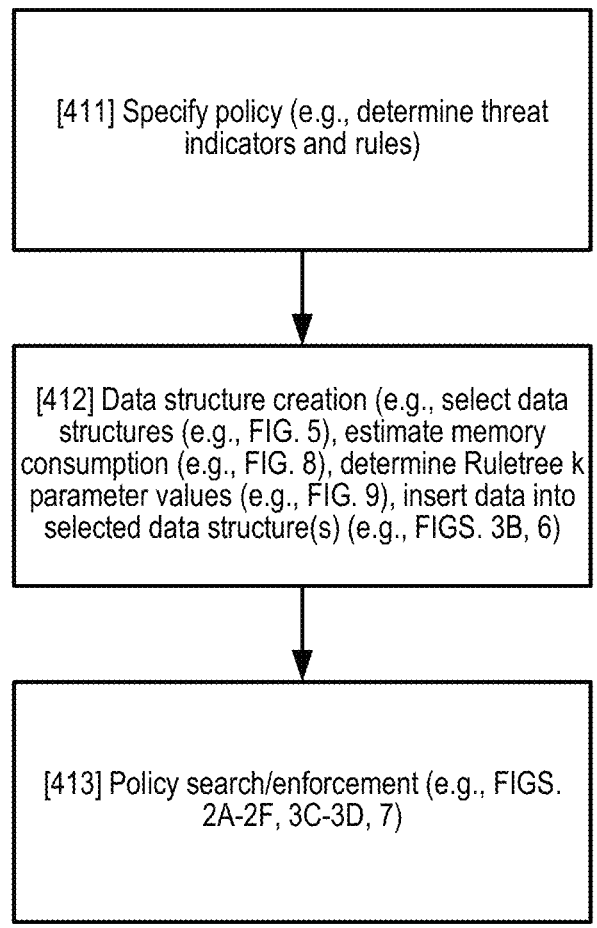
FIG. 4 is a block diagram showing an example method for efficient policy enforcement that may comprise selecting and using one or more of the data structures and associated methods of use described herein.

The above index data structures and set data structures may be used, for example, by a TIG 102 to efficiently enforce a CTI-derived policy on in-transit packet traffic traversing a boundary between a protected network and an unprotected network (e.g., the TIG 102 may be an interface between the protected network and the unprotected network). FIG. 4 is a block diagram showing an example method for efficient policy enforcement that may comprise selecting and using one or more of the data structures and associated methods of use described herein. The method of FIG. 4 may comprise three steps. In step 411 (policy specification), an (ordered) list of packet filtering rules and the threat indicators associated with each rule may be determined. In step 412 (data structure creation), instances of index data structures that map threat indicators (keys) to rule identifiers (values) may be created and populated. Step 412 may comprise creating instances of set data structures that may reduce policy search latency. In step 413 (policy search and enforcement), one or more TIGs 102 may process in-transit packets by (a) identifying potential threat indicators in the packet, (b) searching for the potential threat indicators in the data structures created and populated in step 412, and (c) applying any matching rules to the packet, e.g., block, log, and capture the packet.

The policy specification of step 411, which may be performed by one or more SPMSs 107, by one or more TIGs 102, and/or by one or more other computing devices, may consider and/or account for a large number of threats and potential threats. In a typical scenario, for example, and at the time of the present disclosure, a policy may be derived from many millions (e.g., hundreds of millions) of threat indicators that may be delivered by thousands of CTI feeds that may be supplied by tens or hundreds of CTIPs 106. Typically, each CTI feed may comprise one or more (e.g., many) threat indicators of a single type, with the type being, for example, one of IPv4, IPv6, domain name, or URL. Each CTI feed may be mapped to or associated with a single packet filtering rule comprising, for example: matching criteria that may be the threat indicators comprised by the CTI feed; a dispositive action for the rule, which may be block/deny/drop a matching packet or allow/pass/forward a matching packet; other packet filtering actions such as log/flow log, capture/flow capture, redirect, spoof-response, etc.; a policy processing directive for the rule, which may be "quick" (e.g., halt the policy search) or "continue" (e.g., continue the policy search for other matching rules); and metadata, for example, the CTI provider and CTI feed name, indicator-type, associated threat/attack type, confidence level, risk score, etc. The rules may comprise and/or be arranged in an ordered list (the policy), where the rules may primarily be ordered by indicator fidelity (where for example URL has higher fidelity than domain name, which has higher fidelity than IP address (IPv4 or IPv6)), and sub-ordered by dispositive action (for example, one of "block" or "allow", with "block" having precedence over "allow"). Thus, for example, in the ordered list, a "block" URLs rule may precede an "allow" URLs rule, an "allow" URLs rule may precede a "block" domain names rule, a "block" domain names rule may precede an "allow" domain names rule, an "allow" domain names rule may precede a "block" IP addresses rule, and a "block" IP addresses rule may precede an "allow" IP addresses rule. Each rule in the ordered list may be associated with a rule identifier that may correspond to a rule's ordering or rank in the ordered list, such that the relative ranking of two different rules in the ordered list may be determined by their associated rule identifiers (rule ID).

In step 412, which may be performed by one or more SPMSs 107, by one or more TIGs 102, and/or by one or more other computing devices, instances of data structures may be selected according to desired requirements and properties (such as those described above), and then populated with the threat indicators and rule IDs of the policy specified in step 411. For example, the selected index data structures may be (a) one instance of a ruletree with stride length k=4 for full IPv4 (/32) threat indicators, (b) one instance of a ruletree with stride length k=4 for all other (non-/32) IPv4 CIDR indicators, and (c) one instance of a flat hash map for domain name and URL indicators. (In this example, there are no IPv6 threat indicators). Also, an instance of a set data structure comprising a bit array of size 2^32 bits may be selected for reducing policy search times for IPv4 addresses that may be in the policy. In this example, no set data structures (e.g., Bloom filters) are used to reduce policy search times for the domain names and URLs that may be in the policy. As another example, suppose a first selection of data structures exceeds memory requirements. Instead of or in addition to modifying the data structures to reduce memory usage, step 411 may be repeated and the policy may be modified in order to reduce memory usage, for example by removing one or more low-confidence CTI feeds.

Figure 5:
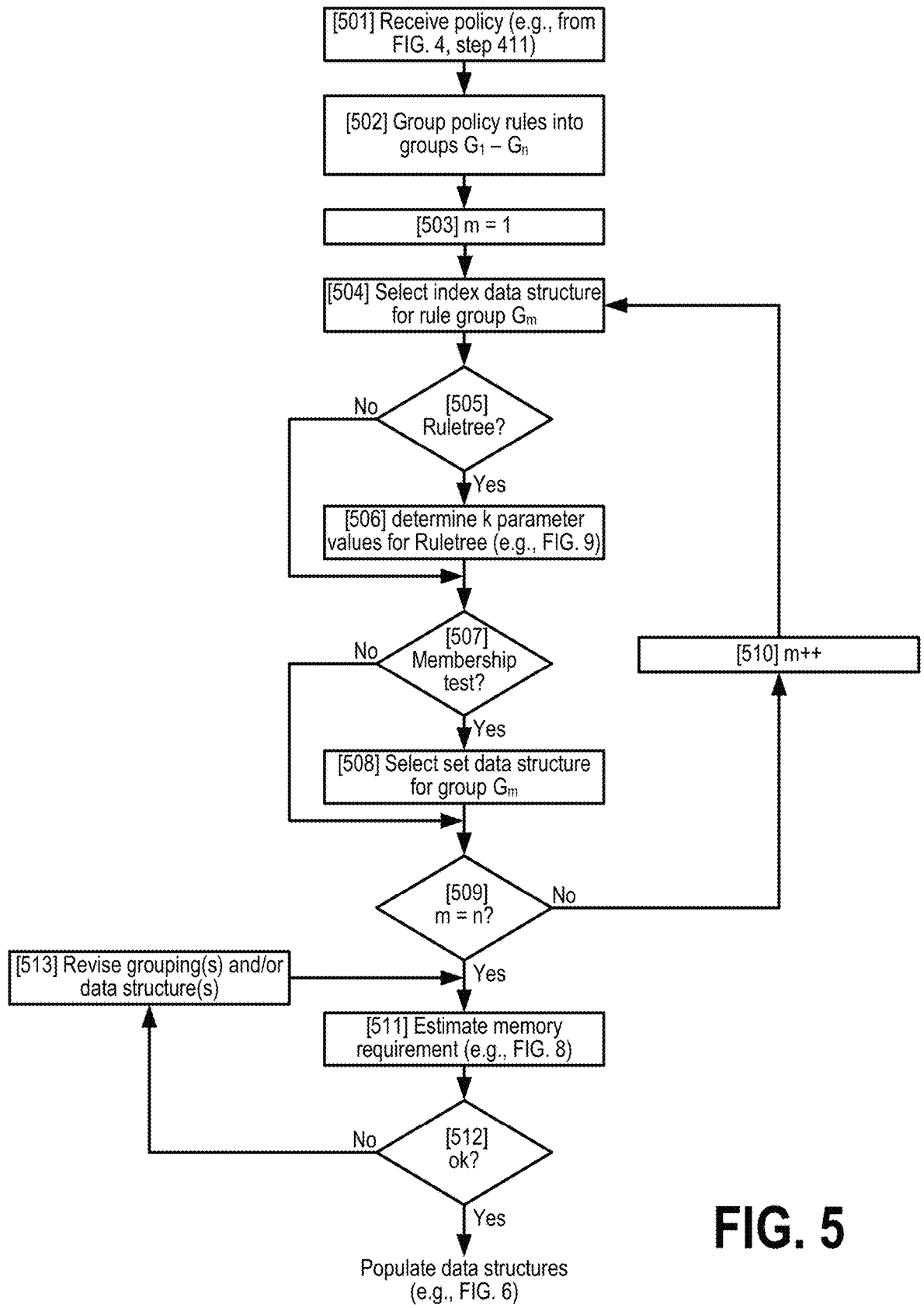
FIG. 5 is a block diagram showing an example method for selecting data structures for a network protection policy.

FIG. 5 is a block diagram showing an example method for selecting data structures for a network protection policy. The method of FIG. 5 may be performed as part of step 412 (FIG. 4). For convenience, FIG. 5 is described based on an example in which the method is performed by an SPMS 107. However, the method of FIG. 5 may be performed by one or more SPMSs 107, by one or more TIGs 102, and/or by one or more other computing devices. One or more steps of the example method of FIG. 5 may be rearranged (e.g., performed in a different order), combined, omitted, and/or otherwise modified, and/or other steps added.

In step 501, the SPMS 107 receives the policy specified in step 411. In step 502, the SPMS 107 may parse the policy and may group rules of the policy into n rule groups $G_1$-$G_n$. Rules may be grouped based on the types of threat indicators associated with the rules. For example, rules for which the matching criteria comprise IPv4 addresses may be assigned to a rule group, rules for which the matching criteria comprise IPv6 addresses may be assigned to another rule group, rules for which the matching criteria comprise domain names may be assigned to yet another rule group, rules for which the matching criteria comprise URLs may be assigned to another rule group, etc. The grouping(s) may be much more granular and may comprise multiple groups based on different variations of a particular type of threat indicator. For example, one group may comprise rules for which the matching criteria comprise IP addresses associated with one geographic region and another group may comprise rules for which the matching criteria comprise IP addresses associated with another geographic region. As another example, one group may comprise rules for which the matching criteria comprise host portions of URLs and another group may comprise rules for which the matching criteria comprise host and path portions of URLs.

Also or alternatively, rules may be grouped based on rules having matching criteria with threat indicators that share one or more common characteristics. For example, all rules having domain name threat indicator matching criteria in which the TLD is ".com" and all rules having URL domain name threat indicator matching criteria in which a hostname portion of a URL TLD is also ".com" may be grouped (e.g., so that a single flat hash map index data structure may be used for all of those rules). Rules may similarly be grouped based on other TLDs (e.g., for each of the 10 most popular TLDs), and a separate flat hash map index data structure used for each of those groups. As a further example, one group may comprise rules for which the matching criteria comprise URLs having IP address (instead of domain name) host portions and another group may comprise rules for which the matching criteria comprise URLs having domain name host portions. As yet another example, one group may comprise rules for which the matching criteria comprise full (/32) IPv4 addresses and another group may comprise rules for which the matching criteria comprise partial (non-/32) IPv4 addresses (e.g., prefixes).

In step 503, the SPMS 107 initializes a counter m to 1. In step 504, the SPMS 107 selects an index data structure for the rule group Gm. The selectable index data structures may comprise any of those described herein (e.g., flat hash maps, ruletrees) and/or other types of data structures. The selection of step 504 may be based on the type of threat indicator(s) associated with the rules of rules group $G_m$, based on the properties/characteristics of the selectable types of data structures, and based on any predetermined considerations associated with the policy (e.g., to prioritize increasing search speed over reducing memory usage, or vice versa, to allow runtime updating, to secure information in the data structure). Step 504 may be performed in various ways. For example, a default selection may be made for the rule group Gm based on the type of threat indicator associated with that group, and a user may be prompted to accept that default selection or to make an alternate selection. As another example, each of various data structures may be weighted based on one or more of the considerations associated with a policy, and the data structure with the largest weight may be selected by default.

In step 505, the SPMS 107 may determine whether the index data structure selected in step 504 is a ruletree. If yes, stride k parameter values may be determined in step 506. Step 506 may comprise the method of FIG. 9, described below. If the index data structure selected in step 504 is not a ruletree, step 506 may be omitted. In step 507, the SPMS 107 may determine whether to use a set data structure for membership testing of the index data structure selected for rule group $G_m$ in step 504. The determination of step 507 may also be performed in various ways. For example, if memory resources are likely to be unavailable, membership testing (and the associated set data structure(s) that would require memory resources) may be omitted. As another example, a default selection (e.g., yes or no) may be made for all rule groups, and a user may be prompted to override the default selection. As a further example, a default selection may be made based on an estimate of the time to perform a search of the selected index data structure and based on an estimate of the time to perform a membership test of a set data structure, and the default determination of step 507 may be "no" unless the estimated time for a membership test is less than (or less than by a predetermined factor) the estimated time to search the index data structure. The estimated times may be determined, for example, based on the size of the rule group $G_m$ (e.g., based on the number of rules and/or based on the number of levels of the index data structure). If the SPMS 107 determines in step 507 to use a set data structure for membership testing in connection with the selected index data structure for the rule group Gm, the SPMS 107 selects a set data structure type in step 508. The selection of step 508 may be based on user input, based on a default selection, and/or based on other considerations (e.g., memory requirements). The data structure selected in step 508 may comprise a Bloom filter or other probabilistic data structure. Also or alternatively, the data structure selected in step 508 may comprise a flat hash map data structure, and/or ruletree data structure, that has been modified for use as a membership test/set data structure. Such modifications, and use of such a modified flat hash map data structure or rule tree data structure for membership testing, are described in connection with FIGS. 18-24. If the determination in step 507 is to not use a set data structure for membership, step 508 may be omitted.

In step 509, the SPMS 107 may determine if m=n, and if m is not equal to n, the m counter may be incremented by 1 in step 510. After step 510, the SPMS 107 may repeat portions of the method beginning at step 504. If m=n in step 509, a memory requirement for the policy, based on the selected index data structures and on the selected set data structures (if included), may be estimated. Step 511 may comprise the method of FIG. 8, which is described below. In step 512, the SPMS 107 may determine if the memory requirement estimated in step 511 is acceptable (e.g., if the requirement is within an acceptable memory budget corresponding to a TIG that will enforce the policy). If no, the SPMS 107 may in step 513 revise one or more data structure selections, revise one or more rule groupings (e.g., combine separate groups corresponding to the same threat indicator type into a single group), and/or determine not to use set data structures for membership testing in connection with one or more groups. Step 513 may, for example comprise outputting indications of the groups and their associated threat indicator types, the selected index data structures and memory requirements for each of those selected data structures, set data structures (if selected) and memory requirements of those set data structures, estimated memory requirements of other types of index data structures or set data structures if alternately used, and/or estimated search times associated with the selected index data structures and/or for alternate index data structures. Step 513 may further comprise receiving, based on those output indications, one or more selections for alternate groupings, one or more selections for alternate index data structures, and/or one or more determinations to not use membership testing. After step 513, the SPMS 107 may repeat portions of the method beginning at step 511. If the SPMS 107 determines in step 512 that the memory requirement estimated in step 511 is acceptable, data structures may be populated.

Figure 6:
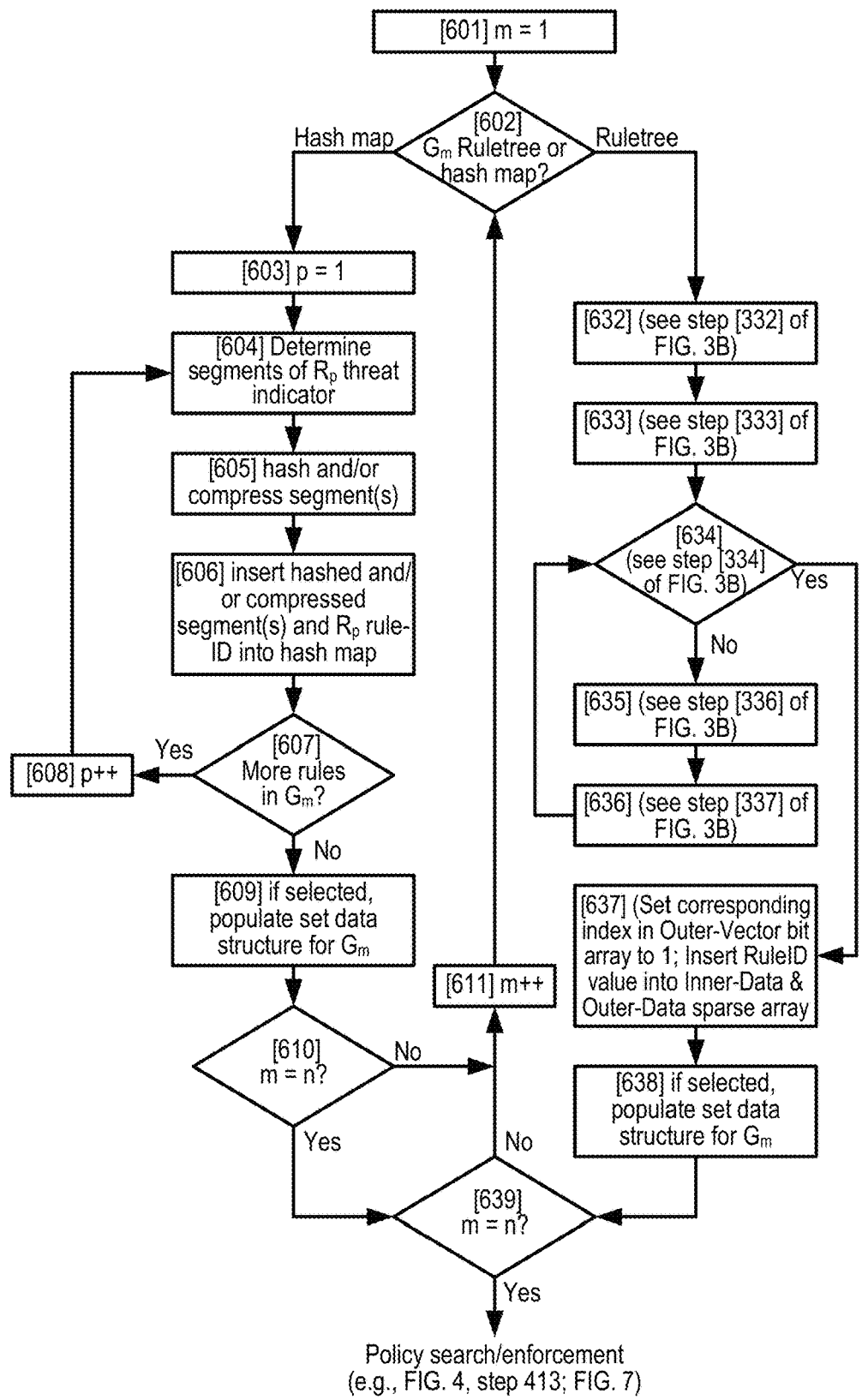
FIG. 6 is a block diagram showing an example method for populating data structures for a network protection policy.

FIG. 6 is a block diagram showing an example method for populating data structures for a network protection policy. The method of FIG. 6 may be performed as part of step 412 (FIG. 4). For convenience, FIG. 6 is described based on an example in which the method is performed by an SPMS 107. However, the method of FIG. 6 may be performed by one or more SPMSs 107, by one or more TIGs 102, and/or by one or more other computing devices. One or more steps of the example method of FIG. 6 may be rearranged (e.g., performed in a different order), combined, omitted, and/or otherwise modified, and/or other steps added.

In step 601, the SPMS 107 may initialize a counter m to 1. In step 602, the SPMS 107 may determine if the index data structure selected for the rule group Gm is a flat hash map or a ruletree. If that selected index data structure is a flat hash map, the SPMS 107 may in step 603 initialize a counter p to 1. In step 604, the SPMS 107 may determine, for the threat indicator of the matching criteria for rule $R_p$ of rule group $G_m$, segments of that threat indicator. The segments may be, for example, labels L of a domain name D, path segments S of a path P of a URL, etc. In step 605, the SPMS 107 may hash and/or compress the segments. Whether the segments are hashed or compressed may be determined, for example, based on whether the index data structure relies on hashing (e.g., as in the examples of FIGS. 2A, 2B, and 2D), data compression (e.g., as in the examples of FIGS. 2C and 2E), or a combination of hashing and data compression (e.g., as in the example of FIG. 2F). In step 606, the SPMS 107 may insert the hashed and/or compressed segments, together with a rule ID for the rule $R_p$, into the flat hash map index data structure. In step 607, the SPMS 107 may determine if there are more rules in rule group $G_m$ (e.g., whether p=x, where x is the number of rules in the rule group $G_m$). If there are more rules in the rule group Gm, the SPMS 107 may increment the p counter by 1 in step 608 and may repeat portions of the method beginning at step 604. If there are not more rules in the rule group Gm, the SPMS 107 may, if use of a set data structure for membership testing of the rule group Gm index data structure was selected (e.g., in the method of FIG. 5), populate that set data structure in step 609. If use of a set data structure was not selected for the rule group Gm index data structure, the SPMS 107 may skip step 609. In step 610, the SPMS 107 may determine if m=n. If yes, the SPMS 107 may increment the m counter by one in step 611 and repeat portions of the method beginning at step 602. If no, the populated data structures of the policy may be used for policy searching and enforcement.

If the SPMS 107 determines in step 602 that the selected index data structure for the rule group $G_m$ is a ruletree, the SPMS 107 may perform steps 632-638. Steps 632-634 may be the same as or similar to steps 332-334 of the method of FIG. 3B, and steps 635 and 636 may be the same as or similar to steps 336 and 337 of the method of FIG. 3B. Step 637 may be the same as or similar to step 335 of FIG. 3B, except that at the conclusion of step 637, step 638 is performed. In step 638, and if use of a set data structure for membership testing of the rule group Gm index data structure was selected, that set data structure may be populated. If use of a set data structure was not selected for the rule group Gm index data structure, the SPMS 107 may skip step 638. In step 639, the SPMS 107 may determine if m=n. If no, the SPMS 107 may increment the m counter by one in step 611 and repeat portions of the method beginning at step 602. If yes, the populated data structures of the policy may be used for policy searching and enforcement.

As part of step 413 (FIG. 4), a TIG 102 (or each of multiple TIGs 102) may load or configure the data structures that were populated in step 412 (e.g., using the method of FIG. 6) into its main memory so that the packet processing and policy enforcement logic of the TIG 102 may efficiently access them. The TIG 102 may then process in-transit packets by searching those data structures, based on values extracted from fields of those in-transit packet, and enforce policy rules found as a result of that searching.

Figure 7:
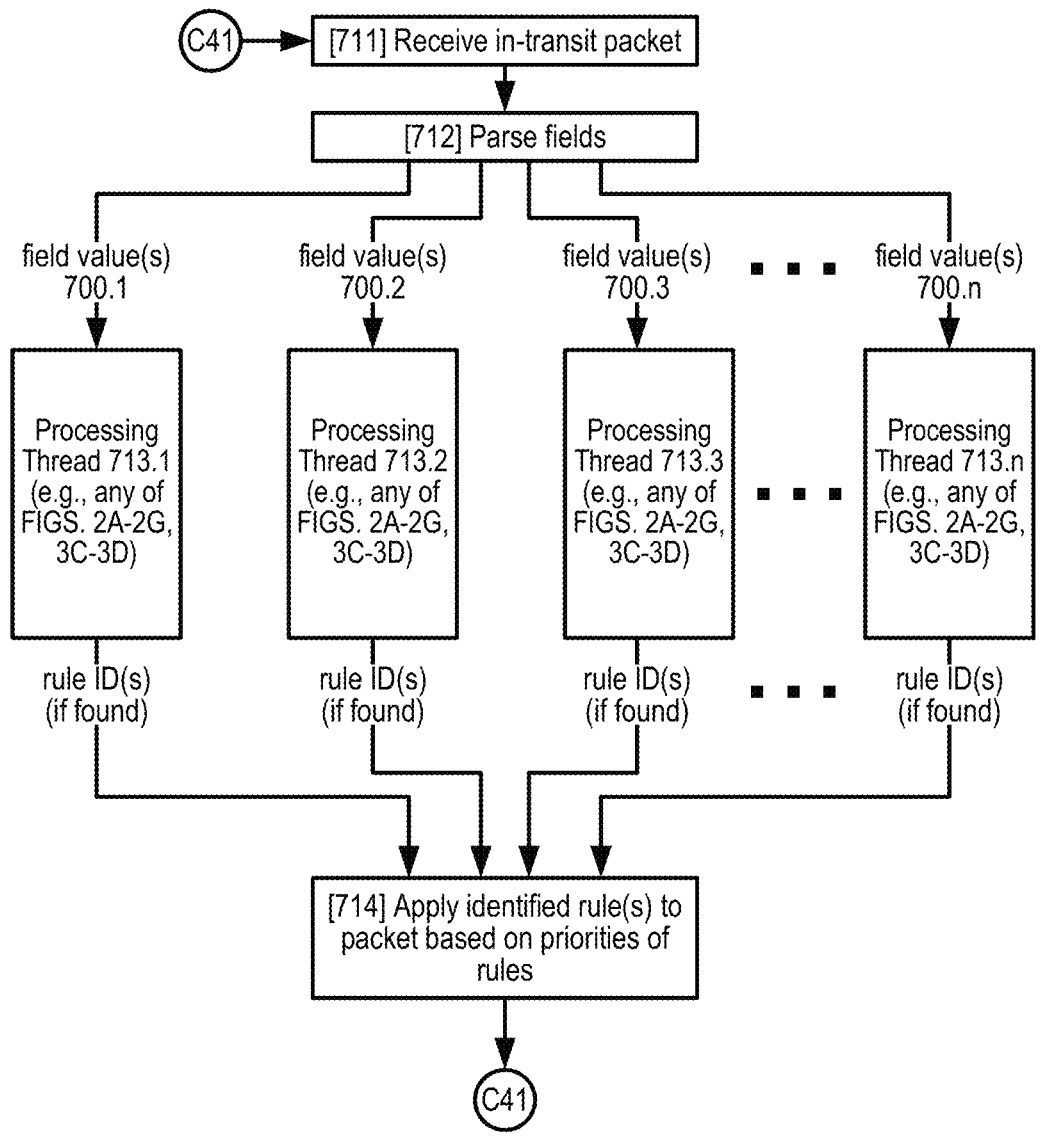
FIG. 7 is a block diagram showing an example of policy searching and enforcement.

FIG. 7 is a block diagram showing an example method of policy searching and enforcement using one or more data structures such as those described herein. One or more steps of the example method of FIG. 7 may be rearranged (e.g., performed in a different order), combined, omitted, and/or otherwise modified, and/or other steps added. In step 711, the TIG 102 may receive an in-transit packet. In step 712, the TIG 102 may extract, from each of multiple fields of the packet, one or more field values. The extracted field values may then be forwarded to corresponding processing threads, of a plurality of processing threads executing concurrently, to use as search objects for searching an index data structure that was generated and populated for the policy (or for a portion of the policy). For example, field values 700.1 from a first type of packet field may be forwarded to a thread 713.1, field values 700.2 from a second type of packet field may be forwarded to a thread 713.2, field values 700.3 from a third type of packet field may be forwarded to a thread 713.3, etc., with field values 700.$n$ from an $n^{th}$ type of packet field forwarded to a thread 713.$n$. Each of the threads 713 may comprise any of the index data structure searching methods described herein (e.g., a method according to any of FIGS. 2A-2F, 3C, or 3D), any or all of the threads 713 may comprise a separate processing thread for testing set membership (e.g., as in the methods of FIGS. 2B-2F and 3D), any or all of the threads 713 may comprise set membership testing in the same processing thread with index data structure searching, and/or any or all of the threads 713 may omit set membership testing.

Also or alternatively, a single field value from a packet may be forwarded to each of multiple concurrent processing threads (e.g., a field value 700.4 may be forwarded to first processing thread 713.4(1), to a concurrent second processing thread 713.4(2), to a third concurrent processing thread 713.4(3), etc.). This may occur, for example, if a first processing thread comprises a first index data structure created for a first group of rules sharing a first characteristic, if a concurrent second processing thread comprises a second index data structure created for a second group of rules sharing a second characteristic, and if a field value from a packet could potentially match a key in either of the first or second index data structures.

As but one example of a scenario in which a packet field value may be forwarded to multiple processing threads, a first index data structure (of a first processing thread) may be a flat hash map index data structure that comprises keys, corresponding to domain names and/or URLs in which a top level domain is ".com", mapped to rule IDs of a first group of policy rules. A second index data structure (of a second processing thread) may be a flat hash map index data structure that comprises keys, corresponding to domain names and/or URLs in which a top level domain is ".net", mapped to rule IDs of a second group of policy rules. A third index data structure (of a third processing thread) may be a flat hash map index data structure that comprises keys, corresponding to domain names and/or URLs in which a top level domain or effective top level domain is anything other than ".com" or ".net", mapped to rule IDs of a third group of policy rules. A field value from a packet may be a domain or URL that is forwarded to each of the first, second, and third processing threads for concurrent searching of the first, second, and third index data structures.

As but another example of a scenario in which a packet field value may be forwarded to multiple processing threads, a fourth index data structure (of a fourth processing thread) may be a ruletree index data structure that maps keys, corresponding to full (/32) IPv4 addresses, to rule IDs of a fourth group of policy rules. A fifth index data structure (of a fifth processing thread) may be a ruletree index data structure that maps keys, corresponding to partial (e.g., non-/32) IPv4 addresses, to rule IDs of a fifth group of policy rules. A field value from a packet may be a full IPv4 address that is forwarded to each of the fourth and fifth processing threads for concurrent searching of the fourth and fifth index data structures.

For a given packet, one, some, all, or none of the processing threads 713 may output one or more rule IDs determined based on an index data structure search. In step 714, the TIG 102 may sort the rules corresponding to those rule IDs based on priorities of those rules, and may apply some or all of those rules based on their priorities. Applying a rule may comprise performing one or more actions specified by the rule (e.g., blocking/dropping/denying the packet, allowing/forwarding/passing the packet, logging the packet, capturing the packet (e.g., storing a copy of the packet), re-directing or re-routing the packet, modifying or transforming the packet in some way to protect the network, generating and/or sending a response to the packet, etc.) As indicated by connector C41, the TIG 102 may repeat the method of FIG. 102 for a next in-transit packet.

The data structures described above may be used to solve the following problem in the policy enforcement application of this disclosure: Given large volumes of CTI, for example, tens or hundreds of millions of indicators, then creating a TIG-enforceable policy from the indicators, which comprises populating the data structures with the indicators and rule IDs, may require a relatively long time, for example, several minutes, which may be problematic when, for example, the time to populate the data structures approaches the policy update cycle times (e.g., every 15 minutes). Furthermore, it may be the case that the size of, or main memory consumed by, the populated data structures may exceed a TIG 102 main memory budget allocated to policy enforcement. When this happens, one or more remediating actions may be necessary to reduce the size, for example: selecting more space-efficient data structures; reducing the volume of threat indicators; eliminating one or more set data structures for testing indicator membership in the policy; etc. Subsequently, the data structure selection/configuration process and/or the data structure population process may need to be repeated to check if the memory budget is not exceeded.

It would be useful if the main memory requirements for a given set of threat indicators, a policy to be enforced (e.g., an ordered list of CTI-derived packet-filtering rules), and a given selection of data structures could be accurately estimated before populating the data structures with the threat indicators and rule IDs. For all of the data structures described herein, accurate estimates of memory/space requirements may be efficiently computed, as follows: For the bit-array set data structure for IPv4 address indicators, the memory requirements may be $2^{32}$ bits (e.g., "4Gb"), or $2^{29}$ bytes (e.g., "512 MB"). For the bit-array set data structure for IPv6 address indicators, a value Z for the Z-most significant bits of IPv6 address indicators may be selected and used to populate the bit array, for example Z=32, and then the memory requirements may be $2^Z$ bits. For the probabilistic set data structures, e.g., Bloom filters, Cuckoo filters, and the like, well-known formulas for the memory requirements of a set of elements and for a given false positive rate may be used to compute accurate estimates by treating threat indicators as the elements when using such formulas. For the index data structures, in general there is a constant factor X, which may be determined experimentally, that may be used to compute accurate estimates of the memory requirements for storing N indicators of a particular type (for example, IPv4, IPv6, domain names, URLs, etc.) in a particular type of index data structure (for example, a ruletree or a flat hash map). That is, for a particular implementation of index data structure type (for example, a flat hash map), a number N of indicators of a particular type (for example, URLs), and an (experimentally determined) factor X for flat hash maps and URLs, then the memory requirements M may be efficiently computed as M=NX bytes. Thus, for a set of indicators, a policy to be enforced, and a selection of data structures, accurate estimates of the main memory requirements for a TIG performing the policy enforcement may be readily and quickly/efficiently computed before populating the data structures with the threat indicators and rule IDs. Then, it can be immediately determined if the main memory requirements exceed the budget or are less than the budget. If the main memory requirements exceed the budget, then remedial actions may be taken, such as selecting a more memory/space-efficient set of data structures (for example, de-select the bit-array for IPv4 indicators), modifying the policy (for example, eliminating one or more low-confidence, high-volume CTI feeds), increasing the TIG's main memory budget for policy enforcement, etc.

Figure 8:
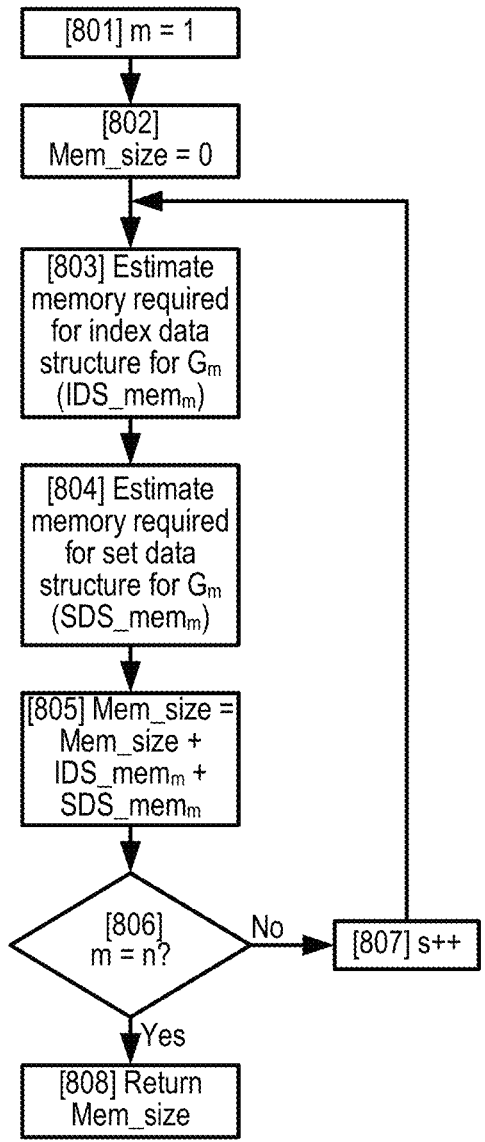
FIG. 8 is a flow chart showing an example method for calculating memory requirements for a collection of data structures (e.g., index data structures and set data structures) selected for a network protection policy.

FIG. 8 is a flow chart showing an example method for calculating memory requirements for a collection of data structures (e.g., index data structures and set data structures) selected for a network protection policy. As indicated above, the example method of FIG. 8 may, for example, be performed as part of the method of FIG. 5. For convenience, FIG. 8 is described based on an example in which the method is performed by an SPMS 107. However, the method of FIG. 8 may be performed by one or more SPMSs 107, by one or more TIGs 102, and/or by one or more other computing devices. One or more steps of the example method of FIG. 8 may be rearranged (e.g., performed in a different order), combined, omitted, and/or otherwise modified, and/or other steps added.

In step 801, the SPMS 107 may set a counter m to 1. In step 802, the SPMS 107 may initialize a value of a variable Mem_size to 0. In step 803, the SPMS 107 may, using one of the methods described above, determine a value IDS_$mem_m$ that represents an estimated amount of memory required for the selected index data structure for the rule group $G_m$. In step 804, the SPMS 107 may, using one of the methods described above, determine a value SDS_$mem_m$ that represents an estimated amount of memory required for a set data structure for the rule group $G_m$. If a set data structure is not to be used for the rule group Gm, the SPMS 107 may set the value of SDS_$mem_m$ to 0. In step 805, the SPMS 107 may set the value of Mem_size to Mem_size+IDS_$mem_m$+SDS_$mem_m$. In step 806, the SPMS may determine if m=n. If no, the SPMS may increment m by 1 in step 807 and repeat portions of the method beginning at step 803. If yes, the value of Mem_size may be returned (e.g., as part of the method of FIG. 5).

Figure 9:
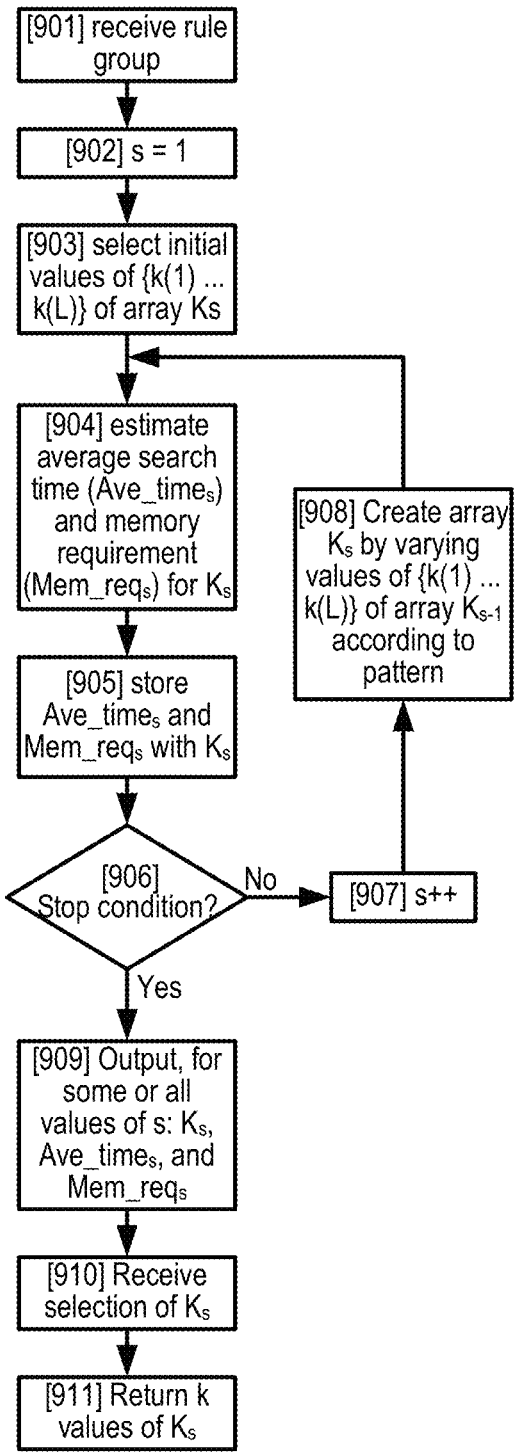
FIG. 9 is a block diagram showing an example method for determining k parameter values for a rule tree.

FIG. 9 is a block diagram showing an example method for determining stride k parameter values for a rule tree (e.g., chunk size values for internal nodes at each level of a ruletree). For convenience, FIG. 9 is described based on an example in which the method is performed by an SPMS 107. However, the method of FIG. 9 may be performed by one or more SPMSs 107, by one or more TIGs 102, and/or by one or more other computing devices. One or more steps of the example method of FIG. 9 may be rearranged (e.g., performed in a different order), combined, omitted, and/or otherwise modified, and/or other steps added. Although the previous examples involved ruletrees in which the k value may be the same for all levels of the ruletree, this need not be the case. For example, k may have a different value for nodes at different levels of a ruletree, and internal ruletree nodes may be further modified to include one or more data structures to indicate applicable k values.

In step 901, the SPMS 107 may receive (e.g., as an output of step 502 of the method of FIG. 5) a rule group. In step 903, the SPMS 107 may initialize a counter s to 1. In step 903, the SPMS 107 may select initial values for elements k(1) through k(L) of an array $K_s$, where L is the number of levels of the ruletree below the root node, where k(1) is a k value for the root node, k(2) is a k value for internal nodes at the second level of the ruletree, etc., with k(L) being a k value for the lowest level of the rule tree. The SPMS 107 may, for example, select the initial k element values based on predetermined default values (e.g., by setting all k element values to 4).

In step 904, the SPMS 107 may estimate the memory requirements (Mem-$req_s$) and average search time (Ave-$time_s$) for the ruletree having k values of the array $K_s$. In step 905, the SPMS 107 may store, with the array $K_s$, values for the estimated memory requirements and estimated average search time determined in step 904.

In step 906, the SPMS may determine if a stop condition has been reached. The stop condition may comprise completion of the steps 904 and 905 for all possible combinations of k values, a completion of all possible combinations of k values between predetermined bounds (e.g., all possible combinations if initial k element values are only varied by ±1, ±2, or ±some other constant), a completion of a predetermined number of iterations of steps 904 and 905, and/or some other stop condition. If the stop condition has not been reached, the SPMS 107 may increment the s counter by 1 in step 907. In step 908, the SPMS 107 may create an array $K_s$ by initially populating array $K_s$ with values of the array $K_{s-1}$ and by subsequently varying values of the k elements according to a predetermined pattern. After step 908, the SPMS 107 may repeat portions of the method beginning at step 904.

If the SPMS 107 determines in step 906 that the stop condition has been reached, the SPMS 909 may output a table or other display that shows, for each value of s (or for some values of s), the array $K_s$ and the values of Mem-$req_s$ and Ave-$time_s$. Also or alternatively, the SPMS 107 may highlight (or may limit output to) an array $K_s$ and corresponding values of Mem-$req_s$ and Ave-$time_s$ for which estimated memory requirements, among all values of s, are lowest, and an array $K_s$ and corresponding values of Mem-$req_s$ and Ave-$time_s$ for which estimated average search time, among all values of s, are lowest. In step 910, the SPMS 107 may receive an input selecting an array $K_s$. In step 911, the SPMS may return (e.g., as part of the method of FIG. 5) the k parameter values of the selected array $K_s$.

Figure 10:
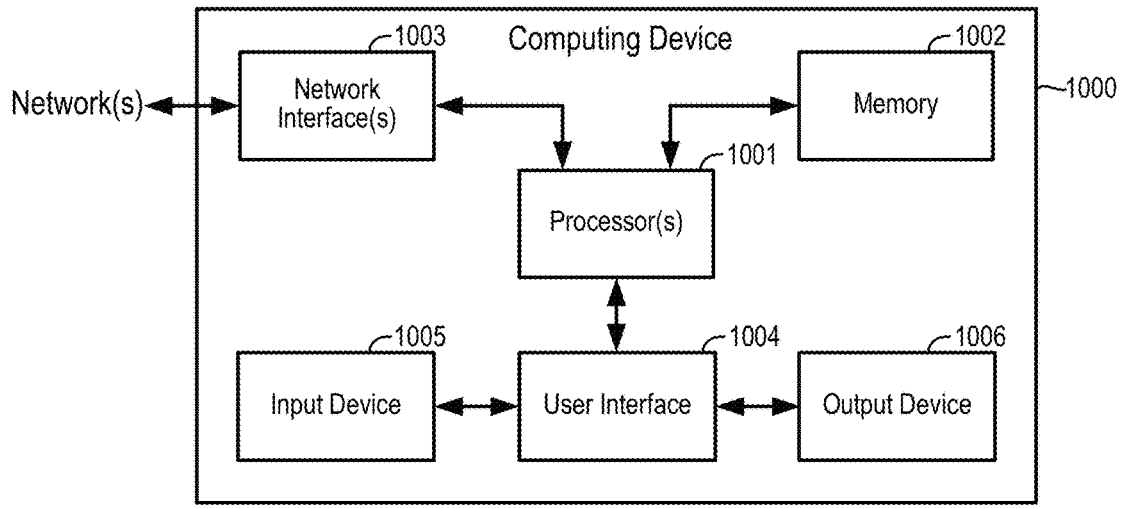
FIG. 10 is a block diagram showing an example computing device.

FIG. 10 is a block diagram of an example computing device 1000. Any of the devices described herein or illustrated in any of the figures, such as any of TIGs 102 or any of the SPMSs 107, may be partially or fully implemented using one or more computing devices such as the computing device 1000. The computing device 1000 may, for example, comprise a general-purpose computing device with general-purpose hardware that is configured to perform one or more of the methods described herein (or portions thereof) using specific software and/or firmware, or it may, for example, comprise a specific-purpose computing device with purpose-specific hardware (and/or purpose-specific software and/or purpose-specific firmware) customized for specific functionality. Any of the hardware elements of the computing device 1000, and/or the computing device 1000 itself, may be emulated in a virtual version of the computing device 1000. The computing device 1000 may include one or more processors 1001 that may execute computer-readable instructions of a computer program to perform any of the functions or other operations described herein. The instructions, along with other data, may be stored in memory 1002, which may include, for example, memory such as read-only memory (ROM) and/or random access memory (RAM), a hard drive, a magnetic or optical disk, a Universal Serial Bus (USB) drive, and/or any other type of computer-readable media. The data may be organized in any way desired, such as being organized so as to be accessible via database software stored as instructions in the memory 1002 and executed by the one or more processors 1001. The computing device 1000 may also include a user interface 1004 for interfacing with one or more input devices 1005 such as a keyboard, mouse, voice input, etc., and for interfacing with one or more output devices 1006 such as a display, speaker, printer, etc. The computing device 1000 may also include a network interface 1003 for interfacing with one or more external devices that may be part of a network external to the computing device 1000. Although FIG. 10 shows an example hardware configuration, one or more of the elements of the computing device 1000 may be implemented as software or a combination of hardware and software. Modifications may be made to add, remove, combine, divide, etc. components of the computing device 1000. Additionally, the elements shown in FIG. 10 may be implemented using basic computing devices and components that have been configured to perform operations such as are described herein. The processor(s) 1001 and/or the memory 1002 may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic.

Figure 11:
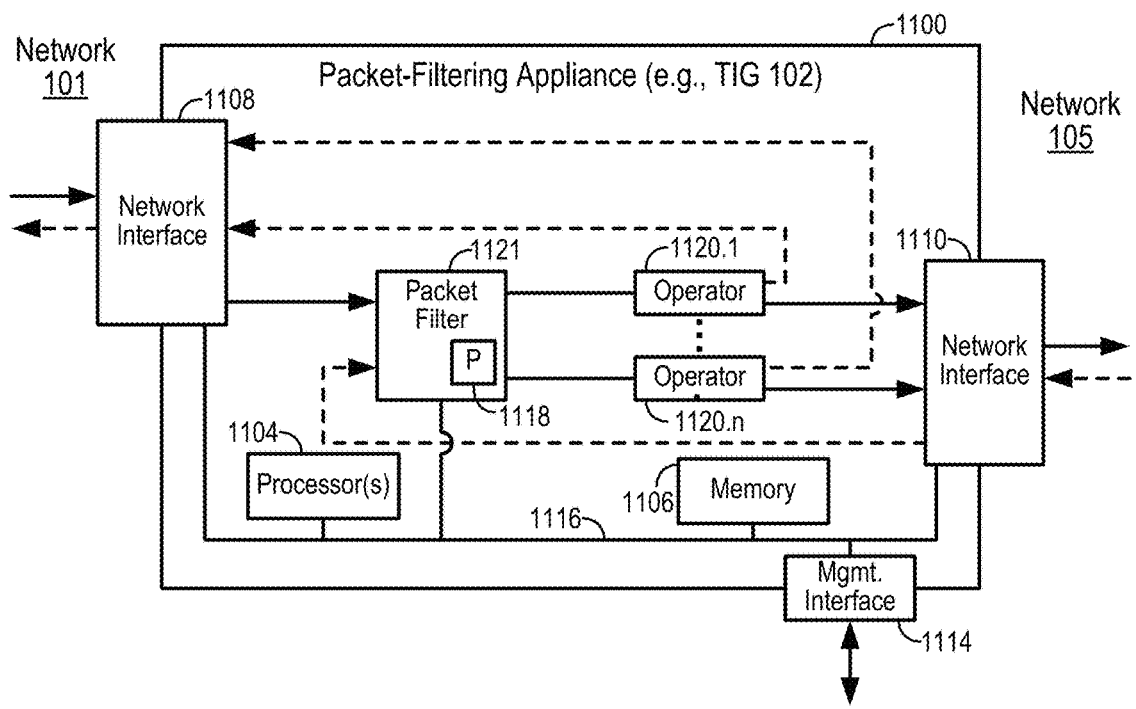
FIG. 11 is a block diagram showing an example packet-filtering appliance.

FIG. 11 is a block diagram showing an example packet-filtering appliance 1100 (e.g., a TIG 102), which may be located at a boundary between a first network (e.g., a network 101) and a second network (e.g., the network 105). The packet filtering appliance 1100 may comprise one or more processors 1104 (which may be the same as the processor(s) 1001), memory 1106 (which may be the same as the memory 1002), network interface(s) 1108 and/or 1110 (which may be the same as the network interface 1003), packet filter 1112, and management interface 1114 (which may be performed by the processor(s) 1001, the user interface 1004, the input device 1005, and/or the output device 1006). The processor(s) 1104, the memory 1106, the network interfaces 1108 and/or 1110, the packet filter 1112, and/or the management interface 1114 may be interconnected via a data bus 1116 (which may comprise the arrows interconnecting any of the various elements in FIGS. 10 and 11). The network interface 1108 may connect packet filtering appliance 1100 to the first network. Similarly, the network interface 1110 may connect the packet-filtering appliance 1100 to the second network. The memory 1106 may include one or more program modules that, when executed by the processor(s) 1104, may configure the packet-filtering appliance 1100 to perform one or more of various operations described herein. The memory 1106 may also be used to store rules, databases, logs, and/or any other information used by and generated by the packet-filtering appliance 1100.

The packet-filtering appliance 1100 may be configured to receive a policy, comprising one or more of the index data structures and/or set data structures described herein, from one or more of the SPMSs 107. For example, the packet-filtering appliance 1100 may receive a policy 1118 from an SPMS 107 server via the management interface 1114 (e.g., via out-of-band signaling) or the network interface 1108 (e.g., via in-band signaling). The packet-filtering appliance 1100 may comprise one or more packet filters or packet discriminators to performing packet filtering operations (e.g., to implement one or more processing threads for index data structure searching and or membership testing), and/or logic for implementing one or more packet filters or packet discriminators. For example, the packet-filtering appliance 1100 may comprise packet filter 1112 (which may be implemented by the processor 1104 and/or one or more other processors), which may be configured to examine information associated with packets received by packet-filtering appliance 1100 (e.g., from network 101) and forward such packets to one or more of operators 1120.1 through 1120.*n* (which may be implemented as hardware and/or as software executed by processor(s) 1104 and/or by one or more other processors) based on the examined information. For example, the packet filter 1112 may (e.g., using one or more of the methods described herein for searching set and/or index data structures) examine information associated with packets received by packet-filtering appliance 1100 (e.g., packets received from network 101 via network interface 1108) and forward those packets to one or more of operators 1120 based on the examined information. These operators, for example, may implement the disposition and directives associated with the packet filtering rule that match a packet.

The configuration of the packet filter 1112 may be based on the rules included in the policy 1118. For example, the policy 1118 may include one or more rules specifying that packets having specified information should be forwarded to one of the operators 1120, that packets having other specified information should be forwarded to another of the operators 1120, that packets having still other specified information should be forwarded to yet another of the operators 1120, etc. Each of the operators 1120 may be configured to perform one or more functions, on packets received from the packet filter 1112, corresponding to application of a rule of the policy 1118. For example, one or more of the operators 1120 may be configured to forward packets received from the packet filter 1112 to the network 105, one or more of the operators 1120 may be configured to forward packets received from the packet filter 1112 to the network 105 and log the packet, one or more of the operators 1120 may be configured to forward packets received from the packet filter 1112 to the network 105 and capture a copy of the packet, one or more of the operators 1120 may be configured to block packets received from the packet filter 1112 from proceeding to the network 105, one or more of the operators 1120 may be configured to block packets received from the packet filter 1112 from proceeding to the network 105 and to also generate and send a different packet, etc.

As indicated by the broken-line arrows in FIG. 11, the packet filtering appliance 1100 may also perform actions, similar to those described above in connection with packets received from the network 101 via the interface 1108, on packets received from the network 105 via the interface 1110. For example, the packet filtering appliance 1100 may receive packets from the network 105 via the interface 1110, may filter those packets in the packet filter 1112 based on the policy 1118, may forward those packets to one or more of the operators 1120, and may forward at least some of those packets from one or more of the operators 1120 to the network 101.

Packet-filtering appliance 1100 may obtain threat-context information from a variety of sources (or generate threat context information based on information retrieved from a variety of sources), some of which may be local (sources internal to the packet-filtering appliance 1100) and others of which may be remote (sources external to the packet-filtering appliance 100). For example, the processor(s) 1104 may comprise a clock that maintains current time of day and that may be used to determine in-transit packet observation time. Referring to other examples of threat-context information described above: appliance location, appliance ID, administrator and associated security policy preferences, network type, active threat type, multi-packet multi-flow threat/attack analysis results, CTI provider(s) and associated information, threat indicator type and fidelity, threat indicator age, flow origination, flow direction, flow state, connection state, global threat context, domain name, URI, URL, domain name popularity, domain name registration status, data transfer protocol methods, protocol risk, contextual CTI noise, and the like may each be determined by the processor(s) 1104 for an in-transit packet and in response to receiving the in-transit packet, based on processing of information stored in the memory 1106, based on computations by the processor(s) 1104, based on information received via the network interface 1108 from network 101, based on information receive via network interface 1110 via network 105, and/or based on information received via management interface 1114.

The functions and steps described herein may be embodied in computer-usable data or computer-executable instructions, such as in one or more program modules, executed by one or more computers or other devices (e.g., the computing device 1000, the packet-filtering appliance 1100) to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium (e.g., the memory 1001, the memory 1106) such as a magnetic disk, optical disk, removable storage media, solid-state memory, random-access memory (RAM), ready-only memory (ROM), flash memory, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Ruletrees and flat hash maps, similar to those described herein, may also be used as set data structures/membership test data structures. Such ruletrees and flat hash maps, may, for example, be used in conjunction with (and/or instead of) Bloom filters and/or other set data structures/membership test data structures in systems, methods, apparatuses, and computer-executable instructions (stored on computer-readable media) described in U.S. Patent Application Pub. No. 2024/0007437 (titled "Cyber Protections of Remote Networks via Selective Policy Enforcement at a Central Network" and incorporated by reference herein) and/or described in U.S. Pat. No. 11,902,250 (titled "Methods and Systems for Prevention of Attacks Associated with the Domain Name System" and incorporated by reference herein). Ruletrees may be configured as set data structures (e.g., for membership testing of IP addresses) by only inserting keys, and by not mapping those keys to rule IDs or other data values. Flat hash maps may be configured as set data structures (e.g., for membership testing of domain names and/or URLs) by only inserting keys, and by not mapping those keys to rule IDs or other data values. In both cases, there is no need to store rule IDs (or other data mapped to the keys) if the data structure is only being used for set membership testing. Similar to Bloom filters, ruletrees and/or flat hash maps are good data structures to use for set membership testing because ruletrees and/or flat hash maps facilitate efficient membership testing and allow substantial compression (and reduction of memory requirement) compared to raw data (e.g., threat indicators in the original form). Moreover, the amount of compression memory usage for flat hash maps can be straightforwardly adjusted by changing hash size. Ruletrees and/or flat hash maps may be used interchangeably with Bloom filters. In some cases, ruletrees and/or flat hash maps may be more efficient and/or perform better than Bloom filters. For example, ruletrees may store IPv6 indicators more efficiently than Bloom filters.

Figure 12:
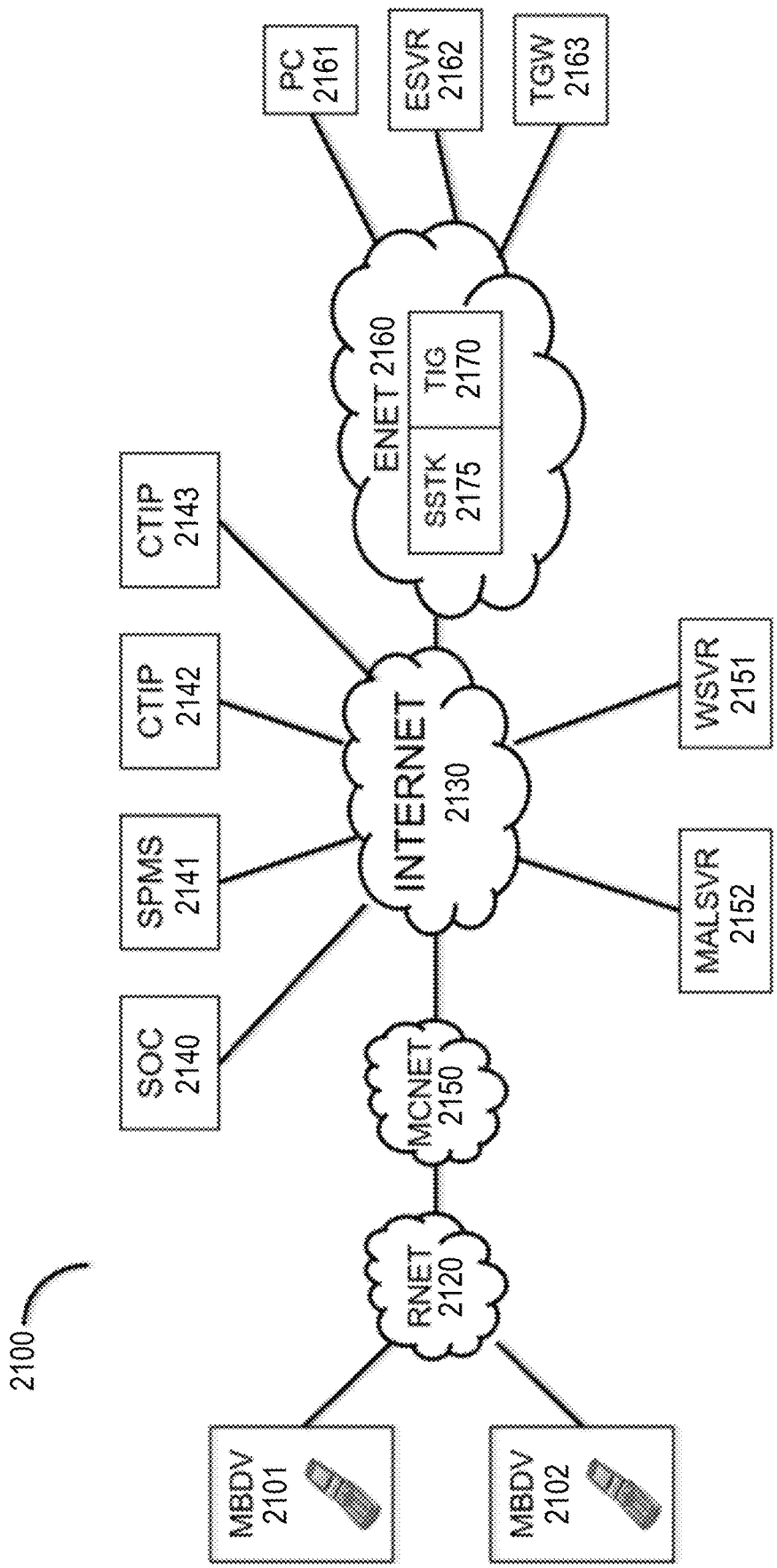
FIG. 12 shows an example network environment in which ruletrees and/or flat hash maps may be used as membership testing set data structures in connection with, for example, efficient cyber protection of mobile devices and associated enterprise networks.

FIG. 12 shows an example network environment 2100 in which ruletrees and/or flat hash maps may be used as set membership testing data structures in connection with, for example, efficient cyber protection of mobile devices and associated enterprise networks. Elements shown in FIG. 12 may also perform operations described in connection with elements shown in FIG. 1, and elements shown in FIG. 1 may also perform operations described in connection with FIG. 12. The mobile devices MBDV 2101 and MBDV 2102 are personally owned/operated by users that may be affiliated with the enterprise that operates the private enterprise network ENET 2160. The mobile devices MBDV 2101 and MBDV 2102 both subscribe to the mobile provider that operates the radio access network RNET 2120 and the mobile core network MCNET 2150. When the mobile devices MBDV 2101 and MBDV 2102 make cellular phone calls the signaling and communications are routed through the mobile core network MCNET 2150 and may be routed through the mobile core networks of other mobile providers (not shown in FIG. 12). 2G and later-generation mobile devices and mobile networks support access to the Internet and associated TCP/IP networks. The mobile devices MBDV 2101 and MBDV 2102 may access publicly addressed Internet servers such as web server WSVR 2151 and malware server MALSVR 2152 via the Internet 2130. The mobile device MBDV 2101 may download and may install a mobile device security application MBL-CYBER-APP that implements the functions of the packet testing, packet filtering, and packet tunneling described herein. The mobile device security application MBL-CYBER-APP may configure, tunnel client(s), manage and/or use a TUNNEL-M/T data structure (described below), and perform other functions as described elsewhere in this disclosure specification. The mobile device MBDV 2102 has not downloaded the mobile device security application MBL-CYBER-APP and therefore is not protected by the methods and systems of this disclosure.

A mobile device and/or a remote network tunnel gateway may utilize a data structure, that represents rules in a security policy by characterizing threat indicators, to determine if an Internet traffic packet will match a rule in the policy. To represent an entire policy, the system may collect some or all of the indicators—IP addresses, domain names, URIs, certificate IDs, etc.—that characterize each rule in the policy and insert each such indicator into, for example, one or more set data structures for membership testing. Those one or more set data structures may comprise one or more ruletrees and/or one of more flat hash maps. Optionally, the one or more set data structures may also comprise one or more probabilistic data structures (e.g., one or more Bloom filters). A set data structure may be tested to determine if an element (e.g. an IP address, domain name, URI, certificate ID, etc.) is a member of the set data structure (e.g., if the element is a member of/in the set of indicators used to generate the set data structure). Set data structures may be generated by a policy management server, may be distributed to each mobile device and/or remote network tunnel gateway, and may be stored on each mobile device and/or remote network that may be protected by the policy. When the mobile device and/or the remote network originates or receives an Internet traffic packet, computer logic and/or an application on the mobile device and/or the remote network tunnel gateway may extract any elements contained in the packet that may correspond to threat indicators in the set data structure, such as an IP address, domain name, URI, certificate ID, etc., and may test the set data structure(s) to determine if any such element is a member of the set of threat indicators of the set data structure(s). If the test indicates that any packet element is a member of the set of threat indicators, then the packet, or a copy of the packet, may be tunneled to the tunnel gateway (e.g., a central network tunnel gateway), which may be located in the enterprise private network (e.g., a central network). Upon exiting the tunnel gateway, the packet may be sent to a TIG, which may filter the packet through the policy to determine which packet filtering rule(s) matches the packet. When the matching rule(s) is(are) determined by a policy test by the TIG, the action(s) or PTF(s) associated with the rule(s) may be applied to the packet to protect the network. If the action(s) or PTF(s) cause the packet to be forwarded towards the Internet, the packet may be passed through an associated security stack.

A policy creation and distribution management server (e.g., associated with a policy creation and management system) may receive CTI from multiple CTIPs and may create a CTI-derived policy based on the received CTI. The CTI-derived policy may include a plurality of rules. The management server may create a data structure, for membership testing (M/T) and comprising one or more ruletrees and/or one or more flat hash maps, based on a set of elements that represent the plurality of rules. Such a data structure, hereinafter called TUNNEL-M/T, may contain one or more flat hash map data structures that contain values (e.g., hashes and/or compressions) based on indicators extracted from rules in the policy, and/or may contain one or more ruletree data structures that contain values of, or based on, indicators extracted from rules in the policy. The system may download the policy to a TIG, and may transmit the data structure TUNNEL-M/T to each mobile device associated with the enterprise network and/or to each remote network tunnel gateway associated with a corresponding remote network, and to other network elements, including the TIG. Alternatively, the TIG may create the data structure TUNNEL-M/T after receiving the CTI-derived policy from the policy creation and distribution management server and then may transmit the data structure TUNNEL-M/T to each mobile device and/or remote network tunnel gateway.

A mobile device may send a packet to (or receive the packet from) an Internet host. The packet's values, such as IP addresses, domain names, and URIs, may be tested for membership in the data structure TUNNEL-M/T.

Flat hash map data structures of TUNNEL-M/T may be used for such membership testing. Those flat hash map data structures may, for example, only comprise keys such as those described herein (e.g., keys based on incremental hashing, incremental compression, or a combination of incremental hashing and compression), and may lack rule IDs or other data mapped to those keys. Those flat hash maps may be searched, using methods similar to those described herein, by incrementally hashing (and/or incrementally compressing) portions of a domain name (or portions of a URL, or portions of another value from a packet) and comparing those incrementally hashed (and/or compressed) portions to keys in the flat hash map. But instead of returning a rule ID if a match to a key is found, the output is a determination of whether the domain name (or URL or other packet value) will match to threat criteria of a policy rule. A domain name (or URL or other packet value) will match to a policy rule threat criteria (e.g., membership=True) if an incrementally hashed (and/or compressed) domain name (or URL or other packet value) matches a key in the flat hash map. A domain name (or URL or other packet value) will not match to a policy rule threat criteria (e.g., membership=False) if an incrementally hashed (and/or compressed) domain name (or URL or other packet value) does not match any key in the flat hash map.

Ruletree data structures may also or alternatively be used for such membership testing. Those ruletree data structures may, for example, only comprise keys such as those described herein (e.g., portions of an IP address or other value from, or based on a value from, a packet), and may lack rule IDs or other data mapped to those keys. Such a ruletree may be searched, using methods similar to those described herein, by proceeding through levels of internal nodes using successive portions of an IP address (or other value from, or based on a value from, a packet). But instead of returning a rule ID if a match to one or more keys is found, the output is a determination of whether the IP address (or other value from, or based on a value from, a packet) will match to threat criteria of a policy rule. An IP address (or other value from, or based on a value from, a packet) will match to a policy rule threat criteria (e.g., membership=True) if progressing through the ruletree reaches an internal node in which a possible value of an IP address portion corresponding to that internal node maps to an outer vector array element storing a "1", but will not match to a policy rule threat criteria (e.g., membership=False) if progressing through the ruletree does not reach an internal node in which a possible value of an IP address portion corresponding to that internal node maps to an outer vector array element storing a "1".

If a membership test returns True, the system may tunnel the packet to the enterprise network. The packets may be filtered through the TIG and security stack. Each of the subsequent packets in the communication flow may be tunneled to the enterprise network, and may be filtered through the TIG and security stack. If a membership test returns False, the system may forward the packet directly towards the Internet host or otherwise process the packet normally, and without tunneling the packet to the enterprise network.

Returning to FIG. 12, the private enterprise network ENET 2160 may provide Internet access to internal hosts such as PC 2161. Private enterprise network ENET 2160 may be configured such that traffic between these internal hosts and Internet hosts must pass through threat intelligence gateway TIG 2170, which may be enforcing a CTI-derived policy. Traffic may also pass through security stack SSTK 2175, which may include at least one of a conventional network firewall and other enterprise network security devices such as a web proxy, SSL proxy, IDS, IPS, and the like. The threat intelligence gateway TIG 2170 and security stack SSTK 2175 may be located at or near the Internet access point for private enterprise network ENET 2160. When applying policy to packets, threat intelligence gateway TIG 2170 may produce logs of the packets that match rules in the policy, which may be sent via the Internet to a security operations center SOC 2140 for attack analysis by cyberanalysts using, for example, SIEM applications and packet analyzer applications.

An enterprise system server ESVR 2162 may be a private web application server hosted by the enterprise for use by the enterprise's users, which may include the users that own/operate the mobile devices MBDV 2101 and MBDV 2102. The mobile devices MBDV 2101 and MBDV 2102 access the enterprise system server ESVR 2162 using an application provided by the enterprise that includes an HTTPS client for accessing the enterprise system server ESVR 2162 on port 443 (the port for HTTPS). When an application connects to the enterprise system server ESVR 2162, the web application presents a login form. Users may then enter their enterprise credentials to securely access the web application. Network security administrators have opened port 443 of the network firewall in security stack SSTK 2175 so that unsolicited inbound HTTPS connections, such as those originating from the applications on the mobile devices MBDV 2101 and MBDV 2102, can initiate sessions with the enterprise system server ESVR 2162.

The host tunnel gateway TGW 2163 attached to private enterprise network ENET 2160 terminates and concentrates tunnels that may be established with mobile devices such as the mobile device MBDV 2101 that have installed the mobile device security application MBL-CYBER-APP. Similar to the enterprise system server ESVR 2162, network administrators have opened one or more ports of the network firewall in security stack SSTK 2175 so that unsolicited inbound tunnel traffic, such as that originating from the mobile device MBDV 2101 and other mobile endpoints that have installed the mobile device security application MBL-CYBER-APP, may access TGW 2163. For example, if the tunneling protocol is IPsec tunnel mode, then the administrators may have opened the IPsec well-known ports 500, 50, and 51. TGW 2163 may decapsulate and/or may decrypt received packets upon egress from the tunnel. The TGW 2163 may forward the decapsulated and/or decrypted packets into the private enterprise network ENET 2160. Since these packets will have public Internet addresses in the destination IP address field of their IP headers, the routers and/or switches in private enterprise network ENET 2160 may forward these packets towards the Internet access point, and therefore towards the threat intelligence gateway TIG 2170, which applies a CTI-derived policy to the packets.

The security policy creation and management server SPMS 2141 may collect CTI from one or more CTIPs including, for example, CTIP 2142 and 2143. The security policy creation and management server SPMS 2141 may also aggregate the CTI, may create at least one security policy based on the CTI, and may publish the security policies to subscribers, which may include a plurality of network devices such as host computers and a threat intelligence gateway TIG 2170. The security policy creation and management server SPMS 2141 may create a data structure TUNNEL-M/T for each security policy and may publish the data structure TUNNEL-M/T to each subscriber associated with each security policy, such as the mobile device security application MBL-CYBER-APP hosted by mobile device MBDV 2101. Alternatively, the threat intelligence gateway TIG 2170 may create a data structure TUNNEL-M/T for each associated mobile device, such as an associated instance of the mobile device security application MBL-CYBER-APP, that has been associated with threat intelligence gateway TIG 2170 for cyber protections, and may publish a current data structure TUNNEL-M/T to the associated mobile device, including each subscribing instance of the mobile device security application MBL-CYBER-APP.

Figure 13:
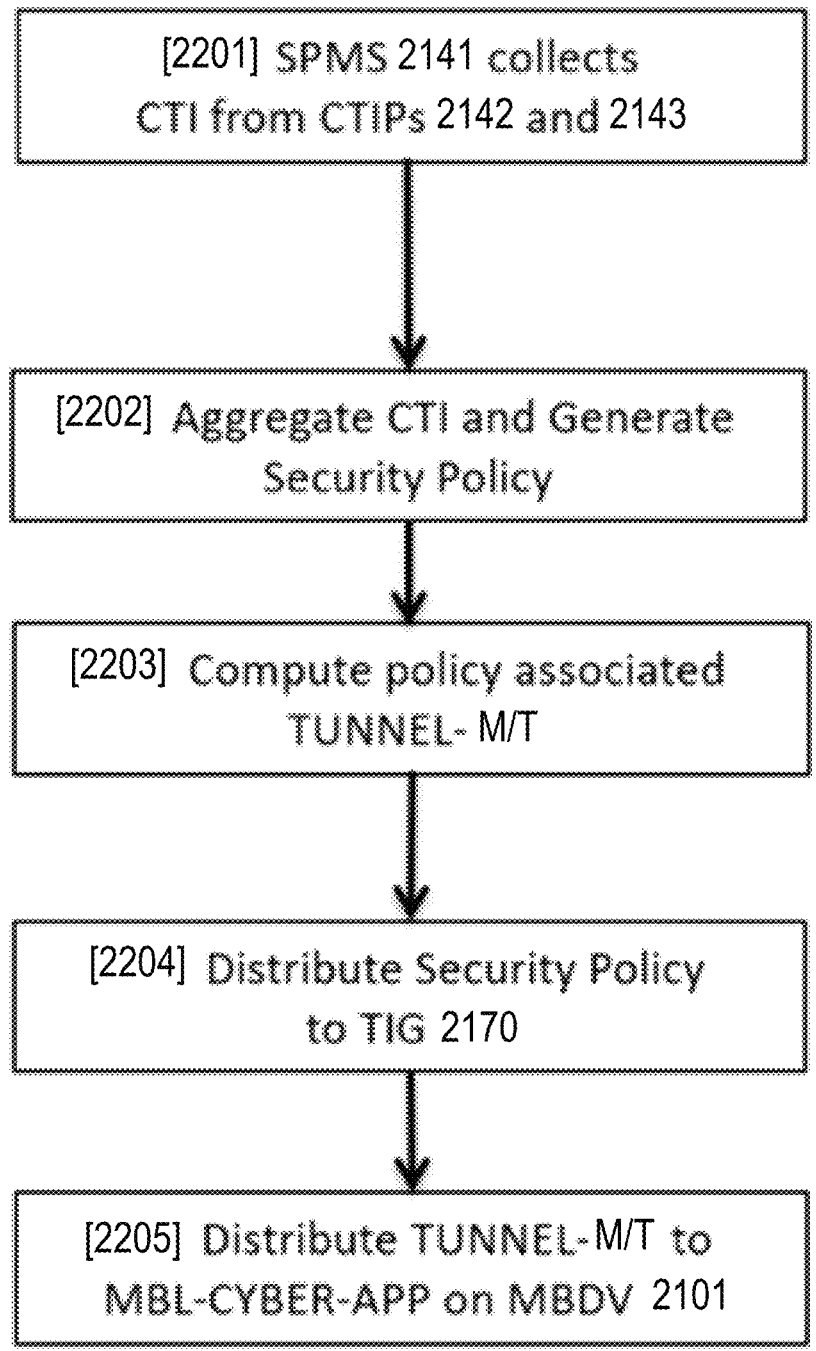
FIG. 13 is a flow chart showing an example method for configuring mobile devices and associated enterprise network elements.

FIG. 13 depicts a flowchart for an operational concept for a security policy creation and management server for configuring mobile devices and associated enterprise network elements, for a protection system for mobile devices and associated enterprise networks depicted in FIG. 12.

In step 2201, the security policy creation and management server SPMS 2141 may download the CTI published by threat intelligence providers, such as CTIP 2142 and CTIP 2143. In step 2202, the security policy creation and management server SPMS 2141 may aggregate the CTI indicators and may process the CTI to generate a security policy. The security policy creation and management server SPMS 2141 may create at least one packet filtering rule, with each rule including matching criteria corresponding to the threat indicators and corresponding actions/PTF to be applied to a packet when a match is determined. The corresponding actions/PTF may be determined based on multiple factors including requirements provided by the operators/administrators of threat intelligence gateway TIG 2170. The security policy creation and management server SPMS 2141 may collect each of the generated rules to generate a security policy, and may distribute the security policy to a plurality of security devices, including the threat intelligence gateway TIG 2170. In step 2203, the security policy creation and management server SPMS 2141 may generate a TUNNEL-M/T associated with a security policy by collecting all of the threat indicators, including IP addresses, domain names, URIs, certificate IDs, etc., that characterize each packet filtering rule in a security policy. The security policy creation and management server SPMS 2141 may insert keys comprising or based on the indicators into one or more ruletrees and/or one or more flat hash maps of the TUNNEL-M/T, which may be tested to determine if any rule in the security policy would match the packet elements being tested.

In step 2204, the SPMS may publish at least one of the security policy and the data structure TUNNEL-M/T to a plurality of network security devices. The security policy creation and management server SPMS 2141 may transmit at least one of the security policy and the data structure TUNNEL-M/T to a plurality of network subscribers, which may include the threat intelligence gateway TIG 2170 and a plurality of mobile devices associated with the enterprise network. The threat intelligence gateway TIG 2170 may download the security policy and may configure packet filtering logic with the security policy. In step 2205, the mobile device security application MBL-CYBER-APP on the mobile device MBDV 2101 may download data structure TUNNEL-M/T and may configure tunneling logic with data structure TUNNEL-M/T. If a mobile device MBDV 2102 has not installed the mobile device security application MBL-CYBER-APP, it does not download data structure TUNNEL-M/T, and is not protected by security policy. The policy and the data structure TUNNEL-M/T may also be updated, and updates to the security policy and data structure TUNNEL-M/T may be generated and distributed. Based on such updates, the mobile device security application MBL- CYBER-APP may tunnel a packet for filtering that would previously have been allowed to proceed to its intended destination without being tunneled to the enterprise network.

Figure 14:
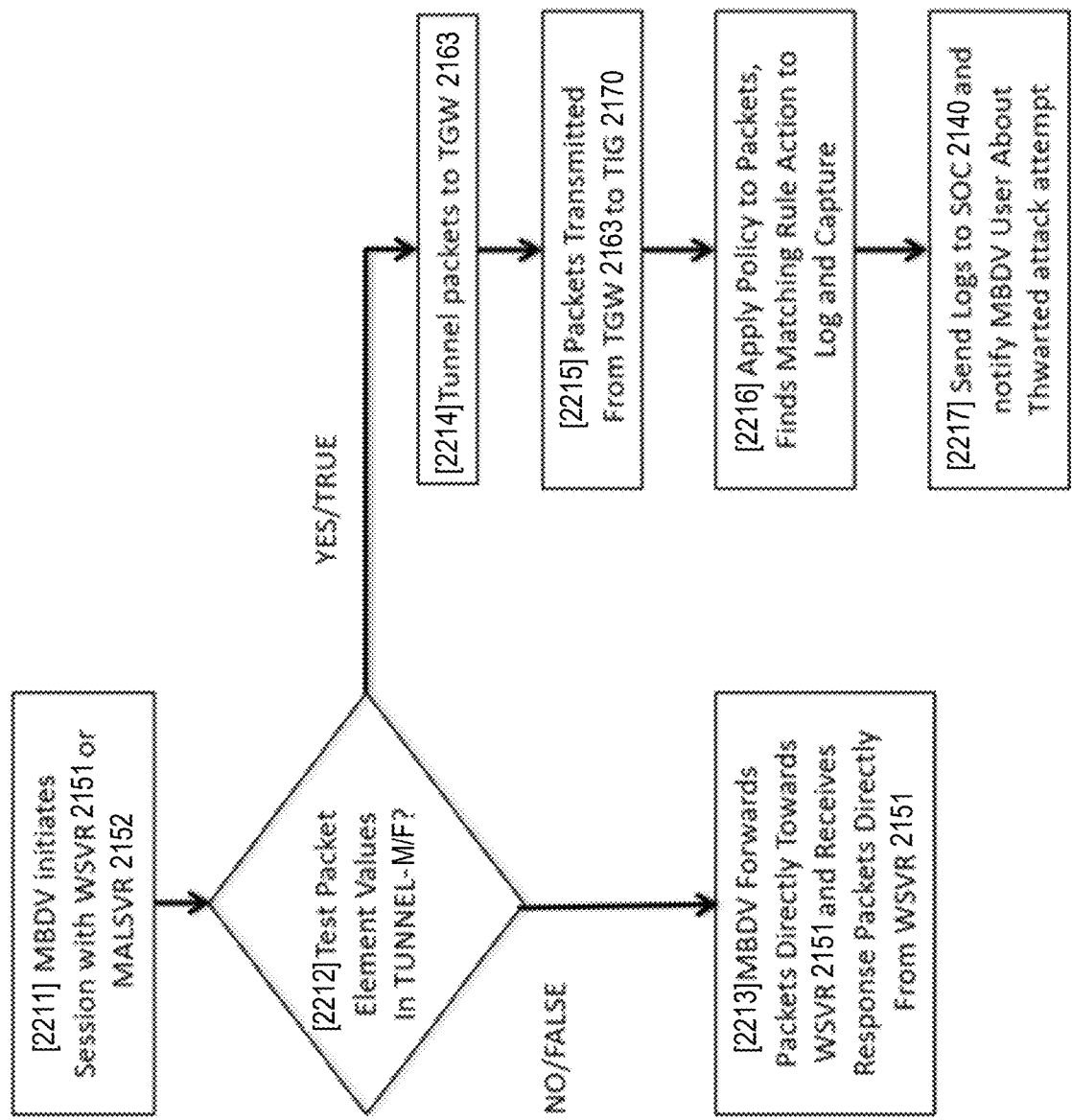
FIG. 14 is a flow chart showing an example method for packet filtering in mobile devices and associated enterprise networks.

FIG. 14 depicts a flowchart for an operational concept for packet filtering in mobile devices and associated enterprise networks, for a protection system for mobile devices and associated enterprise networks depicted in FIG. 12. The flowchart/operational concept assumes that all devices and hosts have already been configured for operation. In particular, the mobile device MBDV 2101 has already downloaded, installed and configured the mobile device security application MBL-CYBER-APP, and may have established a tunnel with TGW 2163. Conversely, the mobile device MBDV 2102 has not been configured with the mobile device security application MBL-CYBER-APP.

In step 2211, a user that may own and/or operate mobile device MBDV, which may be either MBDV 2101 or MBDV 2102, may check e-mail via an e-mail application and may click on an embedded URL that links to a resource on web server WSVR 2151. The mobile device MBDV 2101 or 2102 may resolve the host name, or fully qualified domain name (FQDN), of the URL's authority to the IP address, for example 12.34.56.78, of web server WSVR 2151 by querying the DNS (not shown in FIG. 14). The mobile device MBDV may attempt to initiate a TCP connection with web server WSVR 2151 on port 80 (HTTP) by creating a TCP SYN packet with destination port 80, and may encapsulate the TCP packet in an IP packet, which may be set with destination IP address field set to 12.34.56.78 and may be set with source IP address of the corresponding MBDV.

In step 2212, before the packet may be forwarded (into the radio access network RNET 2120), the mobile device security application MBL-CYBER-APP of MBDV 2101 may determine each packet element associated with threat indicators that are members of the data structure TUNNEL-M/T. For example, the mobile device security application MBL-CYBER-APP may extract an IP address (e.g. 12.34.56.78) from the destination IP address field, and may test if 12.34.56.78 is a member of data structure TUNNEL-M/T. The membership test returns FALSE based on a determination that there is no matching packet filtering rule in security policy on threat intelligence gateway TIG 2170. The mobile device security application MBL-CYBER-APP may determine that there is no threat risk associated with the tested packet data (e.g. IP address 12.34.56.78 for web server WSVR 2151). The mobile device security application MBL-CYBER-APP may determine that there is no need to tunnel the packet to be filtered. The mobile device security application MBL-CYBER-APP might not forward the packet to TGW 2163, to the threat intelligence gateway TIG 2170, and/or to the security stack SSTK 2175.

In step 2213, based on a determination that there is no need to tunnel the packet to be filtered, the mobile device MBDV 2101 may forward the packet directly towards web server WSVR 2151, via the radio access network RNET 2120. Similarly, but without executing any tunneling determination/decision logic, MBDV 2102 may forward the packet directly towards web server WSVR 2151, via the radio access network RNET 2120. The packet forwarding may initiate the TCP handshake and subsequently cause establishment of a TCP connection on port 80 of 12.34.56.78. The mobile device MBDV may issue an HTTP GET request method for the URL. Web server WSVR 2151 may respond with the requested resource, the web session may be terminated, and the TCP connection may be torn down. During such a communication session, for MBDV 2101, the relevant packet field values, such as IP address fields, domain name fields, URI fields, etc., of all inbound and outbound packets may be tested for membership in the data structure TUNNEL-M/T. When each packet in a communication flow is associated with a safe destination, mobile device security application MBL-CYBER-APP may determine that there is no need to tunnel the packet to be filtered as the tests of the data structure TUNNEL-M/T will always returns FALSE, so none of the packets composing the session are tunneled.

In step 2211, a user that may own and/or operate mobile device MBDV 2101 may read a spear phishing e-mail and may be tricked into clicking on an embedded URL that links to a resource on malware server MALSVR 2152, which may contain a web page that spoofs the login page for the enterprise web application on the enterprise system server ESVR 2162. The mobile device MBDV 2101 may resolve the host name, or fully qualified domain name (FQDN), of the URL's authority to the IP address, for example 87.65.43.21, of malware server MALSVR 2152 by querying the DNS (not shown in FIG. 14). The mobile device MBDV 2101 may attempt to initiate a TCP connection with malware server MALSVR 2152 on port 80 (HTTP) by creating a TCP SYN packet with destination port 80, and may encapsulate the TCP packet in an IP packet with the destination IP address field set to 87.65.43.21. In step 2212, before the packet is forwarded by the device MBDV 2101 to the radio access network RNET 2120, the mobile device security application MBL-CYBER-APP may extract the packet elements (e.g. IP address 87.65.43.21 from the destination IP address field), and may test to determine if any packet element is a member of the data structure TUNNEL-M/T.

The membership test may return a TRUE value or other indication that there is a matching packet filtering rule in the security policy associated with the data structure TUNNEL-M/T. The mobile device security application MBL-CYBER-APP may determine, based on the TRUE value or other indication that there is a matching packet filtering rule in the security policy associated with the data structure TUNNEL-M/T, that the packets need to be filtered by the associated enterprise threat intelligence gateway TIG 2170 and that there is some threat risk associated with a packet element (e.g. IP address 87.65.43.21 for malware server MALSVR 2152). In step 2214, the mobile device MBDV 2101, based on the TRUE value or other indication that there is a matching packet filtering rule in the security policy associated with the data structure TUNNEL-M/T, may transmit the packet in a network tunnel to TGW 2163. In step 2215, the packet may be received at the enterprise network side of the tunnel, may be forwarded through private enterprise network ENET 2160 towards the Internet access link, and may be received by the threat intelligence gateway TIG 2170 for packet filtering. In step 2216, the threat intelligence gateway TIG 2170 may apply security policy to the packet, and may determine a rule that matches a packet element (such as IP address 87.65.43.21). The network protective actions/PTFs associated with the determined rule may specify that the action(s) may be at least one of blocked/dropped, logged, and/or captured.

Alternatively, before transmitting any packet based on a determination of a match from a test of the data structure TUNNEL-M/T, the system may test a secondary data structure, to lower the amount of network traffic. For example, the system may test a block rule data structure, which may represent each rule of the policy that is associated with a block action or PTF. Based on the TRUE value or other indication that there is a matching packet filtering rule in the security policy associated with the block rule data structure, the mobile device security application MBL-CYBER-APP may perform a block rule action to prevent packets associated with a block rule from proceeding to their intended destination, without having to transmit such packets through the tunnel to a packet filtering device in the enterprise network. The block rule data structure may be a ruletree, a flat hash map, or a Bloom filter, and the block rule data structure may be a smaller data structure than the data structure TUNNEL-M/T associated with all of the rules of the policy being enforced.

In step 2217, the threat intelligence gateway TIG 2170 may send the log to a security operations center SOC 2140, or other network device. The log may be analyzed by the security operations center SOC 2140, such as by cyberanalysts using a SIEM application. Based on a determination of a threat risk associated with malware server MALSVR 2152 by the CTIP(s) that supplied the CTI for a threat indicator (e.g. IP address 87.65.43.21), the system may take a corrective instructional action. For example, a threat analysis device may report the incident to the user of the mobile device MBDV 2101, or may recommend that the user watch a cybersecurity training video that discusses spear phishing e-mail attacks and how to avoid them. Similarly, the mobile device security application MBL-CYBER-APP may generate a log of the threat event and may send the log to a security operations center SOC 2140, or other network security application(s) or device(s). The mobile device security application MBL-CYBER-APP may selectively generate logs of the threat event based on an indication that there is a matching packet filtering rule in the security policy associated with the block rule probabilistic data structure.

Figure 15:
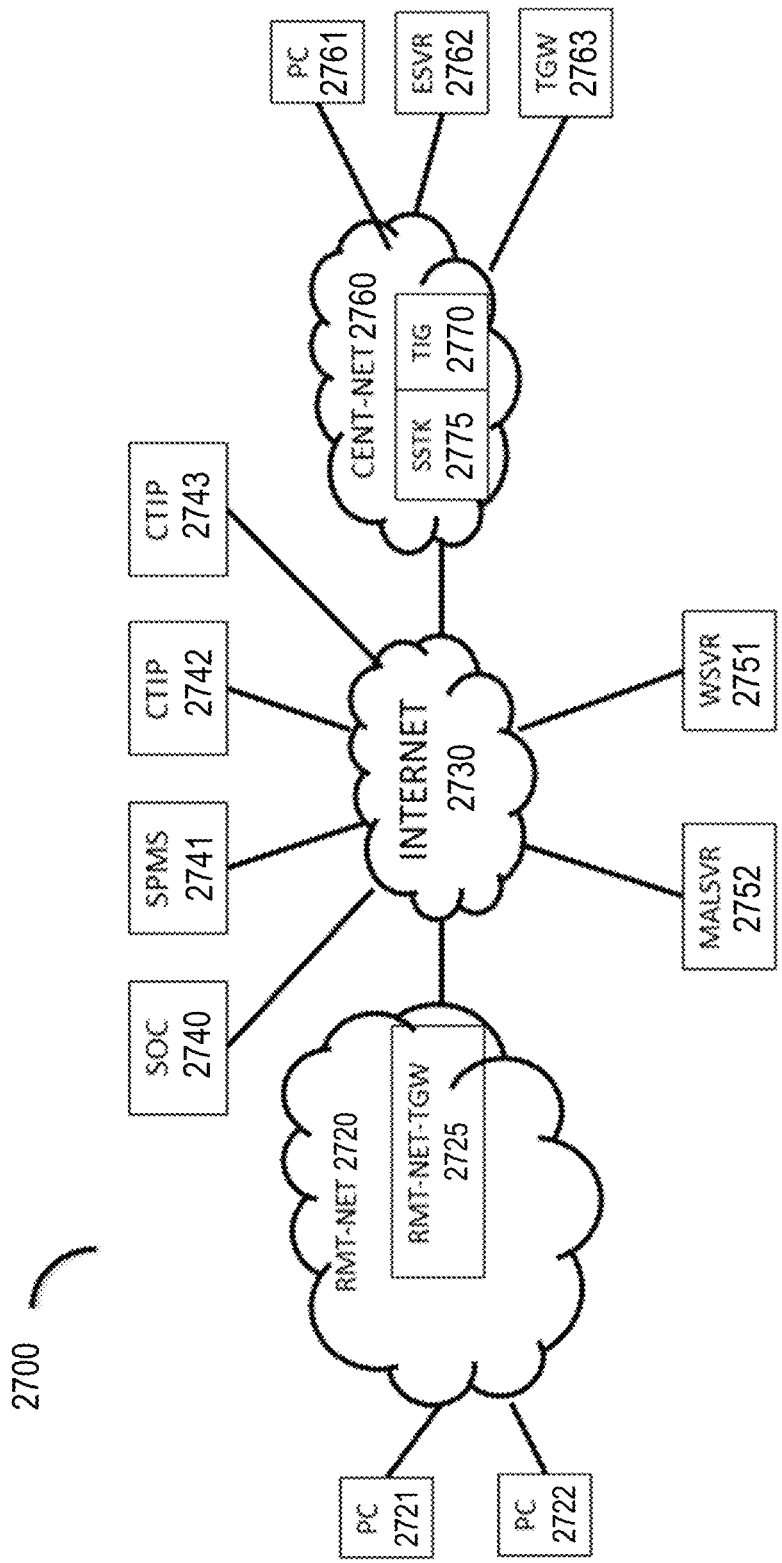
FIG. 15 shows another example network environment in which ruletrees and/or flat hash maps may be used as membership testing set data structures

FIG. 15 shows another example network environment 2100 in which ruletrees and/or flat hash maps may be used as set membership testing data structures to implement efficient cyber protection of remote network(s) and associated central network(s) that may compose an enterprise network. Elements shown in FIG. 15 may also perform operations described in connection with elements shown in FIG. 1 and/or in FIG. 12, and elements shown in FIGS. 1 and/or 12 may also perform operations described in connection with FIG. 15. In at least some arrangements, the remote network(s) and associated central network(s) may be in geographically different locations. Note that, although FIG. 15 depicts an enterprise network composed of a single remote network RMT-NET 2720 and a single associated central network CENT-NET 2760, the aspects described herein are readily extended to apply to multiple remote networks and one or more associated central networks. FIG. 15 does not limit or restrict the disclosed invention in any way to the case of a single remote network and a single central network.

The (one or more) remote network(s) RMT-NET 2720 may be associated with the central network CENT-NET 2760 operated by the enterprise. Hosts connected to the remote network RMT-NET 2720, such as PC 2721 and PC 2722 (e.g., desktop personal computers, mobile devices (connecting to, for example, local Wi-Fi access networks), etc.) may directly access publicly addressed Internet servers such as web server WSVR 2751 and malware server MALSVR 2752 via the Internet 2730. When directly accessing the Internet 2730, hosts connected to remote network RMT-NET 2720, such as PC 2721 and PC 2722, might not be protected by an enterprise security stack SSTK 2775 and threat intelligence gateway TIG 2770 associated with the central network CENT-NET 2760, and therefore might not be protected from Internet threats (e.g., threats associated with malware server MALSVR 2752). For protection, the enterprise may install an in-line remote network tunnel gateway RMT-NET-TGW 2725 at or near the network boundary/interface between remote network RMT-NET 2720 and the Internet 2730. The remote network tunnel gateway RMT-NET-TGW 2725 may implement the functions of packet inspection, packet testing, and packet tunneling described herein. The remote network tunnel gateway RMT-NET-TGW 2725 may be configured to tunnel selected packets, manage TUNNEL-M/T data structures, and perform other functions as described elsewhere in this disclosure specification. The remote network tunnel gateway RMT-NET-TGW 2725 may be integrated or otherwise co-resident with other network boundary devices, such as network firewalls, VPN tunnels, etc.

The central network CENT-NET 2760 may provide Internet access to internal hosts (e.g., desktop personal computers, mobile devices (connecting to, e.g., local Wi-Fi access networks), etc.), such as PC 2761. The central network CENT-NET 2760 may be configured such that traffic between these internal hosts and threat Internet hosts, such as malware server MALSVR 2752, must pass through the threat intelligence gateway TIG 2770. The threat intelligence gateway TIG 2770 may be enforcing a CTI-derived policy. Such traffic may also pass through security stack SSTK 2775, which may include at least one of a conventional network firewall and other enterprise network security devices such as a web proxy, SSL/TLS proxy, IDS, IPS, packet capture, and the like. The threat intelligence gateway TIG 2770 and the security stack SSTK 2775 may be located at or near an Internet access point for the central network CENT-NET 2760. When applying policy to packets, threat intelligence gateway TIG 2770 may produce logs of the packets that match rules in the policy, which may be sent via the Internet to a security operations center SOC 2740 for attack analysis by cyberanalysts using, for example, SIEM applications and packet analyzer applications.

An enterprise system server ESVR 2762 may be, for example, a private web application server hosted by the enterprise at the central network for use by the enterprise's users, which may include the enterprise users that own/operate the hosts PC 2721 and PC 2722 connected to the remote network RMT-NET 2720. The hosts PC 2721 and PC 2722 may access the enterprise system server ESVR 2762 using, for example, a web browser that includes an HTTPS client for accessing the enterprise system server ESVR 2762 on port 443 (the port for HTTPS). When a host connects (via a web browser) to the enterprise system server ESVR 2762, the web application may present a login form. Enterprise users may then enter their enterprise credentials to securely access the web application. Network security administrators may open a port (e.g., port 443) of the network firewall in security stack SSTK 2775 so that unsolicited inbound HTTPS connections, such as those originating from hosts PC 2721 and PC 2722, can initiate sessions with the enterprise system server ESVR 2762.

The central network tunnel gateway TGW 2763 attached to central network CENT-NET 2760 may terminate and concentrate tunnels that may be established with associated remote networks (e.g., RMT-NET 2720). The associated remote networks may have installed a corresponding tunnel gateway (e.g., RMT-NET-GTW 2725) for terminating tunnels connected to the tunnel gateway TGW 2763 (via Internet 2730). Similar to the enterprise system server ESVR 2762, network administrators may open one or more ports of the network firewall in security stack SSTK 2775 so that unsolicited inbound tunnel traffic (e.g., originating from RMT-NET-GTW 2725), may access TGW 2763. For example, if the tunneling protocol is IPsec tunnel mode, then the administrators may have opened the IPsec well-known ports 500, 50, and 51. The tunnel gateway TGW 2763 may decapsulate and/or may decrypt received packets upon egress from the tunnel. The tunnel gateway TGW 2163 may forward the decapsulated and/or decrypted packets into the (private enterprise) central network CENT-NET 2760. Since these packets will have public Internet addresses in the destination IP address field of their IP headers, the routers and/or switches in central network CENT-NET 2760 may forward these packets towards the Internet access point, and therefore towards the threat intelligence gateway TIG 2770, which applies a CTI-derived policy to the packets.

The security policy creation and management server SPMS 2741 may collect CTI from one or more CTIPs including, for example, CTIP 2742 and 2743. The security policy creation and management server SPMS 2741 may also create at least one security policy based on the CTI, and may publish the security policies to subscribers. The subscribers may include a plurality of network devices such as host computers and the threat intelligence gateway TIG 2770. The security policy creation and management server SPMS 2741 may create a data structure TUNNEL-M/T (such as described above) for each security policy and may publish the data structure TUNNEL-M/T to each subscriber associated with each security policy, such as the remote network tunnel gateway RMT-NET-TGW 2725. Alternatively, the threat intelligence gateway TIG 2770 may create a data structure TUNNEL-M/T for each associated remote network tunnel gateway, such as RMT-NET-TGW 2725, that has been associated with threat intelligence gateway TIG 2770 for cyber protections, and may publish a current data structure TUNNEL-M/T to each associated remote network tunnel gateway.

In one arrangement, the security policy creation and management server SPMS 2741 may be external to the central network CENT-NET 2760 and the remote network RMT-NET 2720, and may communicate with the central network CENT-NET 2760 and the remote network RMT-NET 2720 via the Internet 2730. In another arrangement, the security policy creation and management server SPMS 2741 may be attached to the central network CENT-NET 2760 or the remote network RMT-NET 2720.

One or more elements depicted in FIG. 15 may be the same as, similar to, substantially similar to, or may share one or more hardware, software, and/or firmware components with one or more elements depicted in FIG. 12. For example, the central network CENT-NET 2760, with the associated threat intelligence gateway TIG 2770 and security stack SSTK 2775, may be the same as, similar to, or substantially similar to the enterprise network ENET 2160, with the associated threat intelligence gateway 2170 and security stack SSTK 2175, of FIG. 12. As such, a threat intelligence gateway 2170 and the security stack 2175 may also enforce CTI-derived policies for tunneled traffic from remote network tunnel gateways (e.g., RMT-NET-TGW 2725), in addition to enforcing CTI-derived policies for tunneled traffic from mobile devices (e.g., MBDV 2101). Similarly, the internal host PC 2161, the enterprise system server 2162, the tunnel gateway 2163, the security operations center SOC 2140, the security policy creation and management server SPMS 2141, the CTI providers CTIP 2142 and 2143, the malware server MALSVR 2152, and the web server WSVR 2151 as described with respect to FIG. 12 may be the same as, similar to, or substantially similar to the internal host PC 2761, the enterprise system server 2762, the tunnel gateway 2763, the security operations center SOC 2740, the security policy creation and management server SPMS 2741, the CTI providers CTIP 2742 and 2743, the malware server MALSVR 2752, and the web server WSVR 2751. The mobile device 2101 (and/or the mobile device security application MBL-CYBER-APP) may be the same as, similar to, substantially similar to, or may share one or more hardware, software, and/or firmware components with remote network tunnel gateway RMT-NET-TGW 2725.

Figure 16:
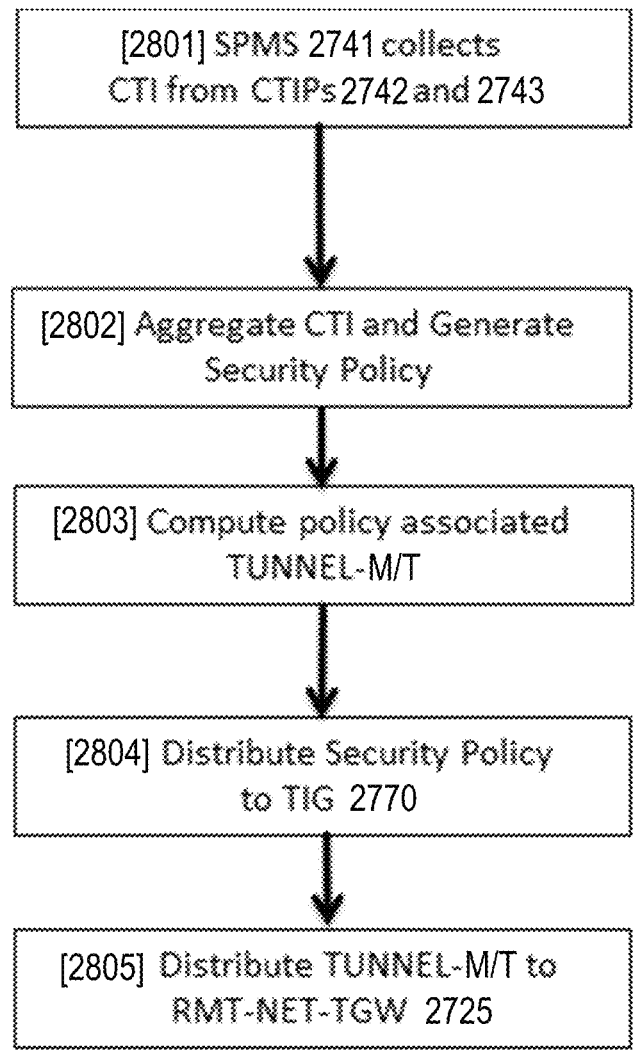
FIG. 16 is a flow chart showing an example method for configuring remote networks, associated tunnel gateways, and associated central network elements.

FIG. 16 depicts a flowchart for an operational concept for a security policy creation and management server for configuring remote networks, associated tunnel gateways, and associated central networks elements, for a protection system for an enterprise network composed of remote networks and central networks depicted in FIG. 15.

FIG. 16 depicts one process via which CTI might be collected and used to generate one or more ruletree data structures configured for set membership testing and/or one or more flat hash map data structures configured for set membership testing. Optionally, the CTI may also be used to generate one or more probabilistic data structures for set membership testing (e.g., a Bloom filter, a Cuckoo filter, a blocked Bloom filter, an xor filter, etc.). The data structure(s) generated for set membership testing may distributed (e.g., as a TUNNEL-M/T data structure) to remote devices (e.g., RMT-NET-TGW 2725). In this manner, the remote devices (e.g., RMT-NET-TGW 2725) may use the received data structure(s) to test packets and determine whether those packets should be transmitted to a central device/network for further analysis. For example, if one or more of a packet's attributes are present in/represented by the data structure(s), then the packet may be forwarded to a central device for further analysis. In contrast, if the one or more attributes are not present in/represented by the data structure(s), the packet may be forwarded on without further analysis.

In step 2801, the security policy creation and management server SPMS 2741 may receive (e.g., download) the CTI published by threat intelligence providers, such as CTIP 2742 and CTIP 2743. This step may be the same as or similar to step 2201 of FIG. 13.

In step 2802, the security policy creation and management server SPMS 2741 may aggregate the CTI indicators and may process the CTI to generate a security policy. The security policy creation and management server SPMS 2741 may create at least one packet filtering rule, with each rule including matching criteria corresponding to the threat indicators and corresponding actions/PTF to be applied to a packet when a match is determined. The corresponding actions/PTF may be determined based on multiple factors including requirements provided by the operators/administrators of threat intelligence gateway TIG 2770. The security policy creation and management server SPMS 2741 may collect each of the generated rules to generate a security policy, and may distribute the security policy to a plurality of security devices, including the threat intelligence gateway TIG 2770. This step may be the same as or similar to step 2202 of FIG. 13.

In step 2803, the security policy creation and management server SPMS 741 may generate a data structure TUNNEL-M/T (comprising one or more ruletree data structures configured for set membership testing and/or one or more flat hash map data structures configured for set membership testing and, optionally, one or more probabilistic data structures) associated with a security policy by collecting the threat indicators (e.g., by collecting one or more of the IP addresses, IP address ranges, domain names, URIs, certificate IDs, etc.). In this way, the TUNNEL-M/T may characterize each packet filtering rule in a security policy. The security policy creation and management server SPMS 2741 may insert the indicators (or values based on the indicators) into the data structure TUNNEL-M/T, which may be tested to determine if any rule in the security policy would match the packet elements being tested. In this manner, the TUNNEL-M/T might be used to efficiently test whether a particular packet should be tunneled to a central network (e.g., for further processing, such as further testing based on rules). This step may be the same as or similar to step 2203 of FIG. 13.

The security policy creation and management server SPMS 2741 may publish at least one of the security policy and the data structure TUNNEL-M/T to a plurality of network security devices. The security policy creation and management server SPMS 2741 may transmit at least one of the security policy and the data structure TUNNEL-M/T to the plurality of network security devices. The plurality of network security devices may include the threat intelligence gateway TIG 2770 and/or one or more remote network tunnel gateways (e.g., remote network tunnel gateway RMT-NET-TGW 2725). For example, as shown in step 2804, the security policy creation and management server SPMS 2741 may transmit the security policy to the threat intelligence gateway TIG 2770 associated with the central network CENT-NET 2760. The threat intelligence gateway TIG 2770 may download the security policy and may configure packet filtering logic with the security policy. This step may be the same as or similar to step 2204 of FIG. 13.

For example, as shown in step 2805, security policy creation and management server SPMS 2741 may transmit the data structure TUNNEL-M/T to the remote network tunnel gateway RMT-NET-TGW 2725. The remote network tunnel gateway RMT-NET-TGW 2725 may download data structure TUNNEL-M/T and may configure tunneling logic with data structure TUNNEL-M/T. Based on the security policy and the data structure TUNNEL-M/T, the remote network tunnel gateway RMT-NET-TGW 2725 may or might not tunnel a packet to the central network CENT-NET 2760 for filtering at the threat intelligence gateway TIG 2770 (e.g., as further described with reference to FIG. 17). This step may be the same as or similar to step 2205 of FIG. 13.

The security policy and the data structure TUNNEL-M/T may also be updated (e.g., by the security policy creation and management server SPMS 2741), and updates to the security policy and data structure TUNNEL-M/T may be generated and distributed (e.g., periodically, based on updates to the CTI provided by CTIPs). Updates to the security policy and data structure TUNNEL-M/T may modify operations of the network security devices (e.g., the threat intelligence gateway TIG 2770 and/or one or more remote network tunnel gateways). For example, based on such updates, the remote network tunnel gateway RMT-NET-TGW 2725 may tunnel a packet for filtering that would previously have been allowed to proceed (e.g., based on a previous version of the data structure TUNNEL-M/T) to its intended destination without being tunneled to the central network CENT-NET 2760.

Additionally and/or alternatively (but not shown in FIG. 16), after receiving the security policy from the security policy creation and management server SPMS 2741, the threat intelligence gateway TIG 2770 may generate a data structure TUNNEL-M/T (comprising one or more ruletree data structures configured for set membership testing and/or one or more flat hash map data structures configured for set membership testing and, optionally, one or more probabilistic data structures) associated with a security policy by collecting all of the threat indicators, including IP addresses, domain names, URIs, certificate IDs, etc., that characterize each packet filtering rule in the security policy. The threat intelligence gateway TIG 2770 may insert the indicators (or values based on the indicators) into the data structure TUNNEL-M/T, which may be tested to determine if any rule in the security policy would match the packet elements being tested. Then, the threat intelligence gateway TIG 2770 may transmit the TUNNEL-M/T to the remote network tunnel gateways (e.g., RMT-NET-TGW 2725) of associated remote networks (e.g., RMT-NET 2725).

Remote fixed networks in general (and remote network tunnel gateways in particular) might not have resource limitations (e.g., associated with power supply, memory, processing power, etc.) that may be associated with mobile devices. As such, a remote network tunnel gateway (e.g., RMT-NET-TGW 2725) may perform one or more operations as described above in relation to the security policy creation and management server SPMS 2741 (e.g., generation of a data structure TUNNEL M/T). For example, the security policy creation and management server SPMS 2741 may generate a security policy based on a plurality of CTI indicators and distribute the security policy to the remote network tunnel gateway RMT-NET-TGW 2725. The remote network tunnel gateway RMT-NET-TGW 2725 may generate the data structure TUNNEL-M/T associated with the security policy. Additionally, because a remote fixed network and associated remote network tunnel gateway may have more relaxed memory constraints compared to mobile devices, then for example the size of a given ruletree data structure configured for set membership testing, a given flat hash map data structures configured for set membership testing, and/or a given probabilistic data structure (e.g., a given Bloom filter) may be increased.

Figure 17:
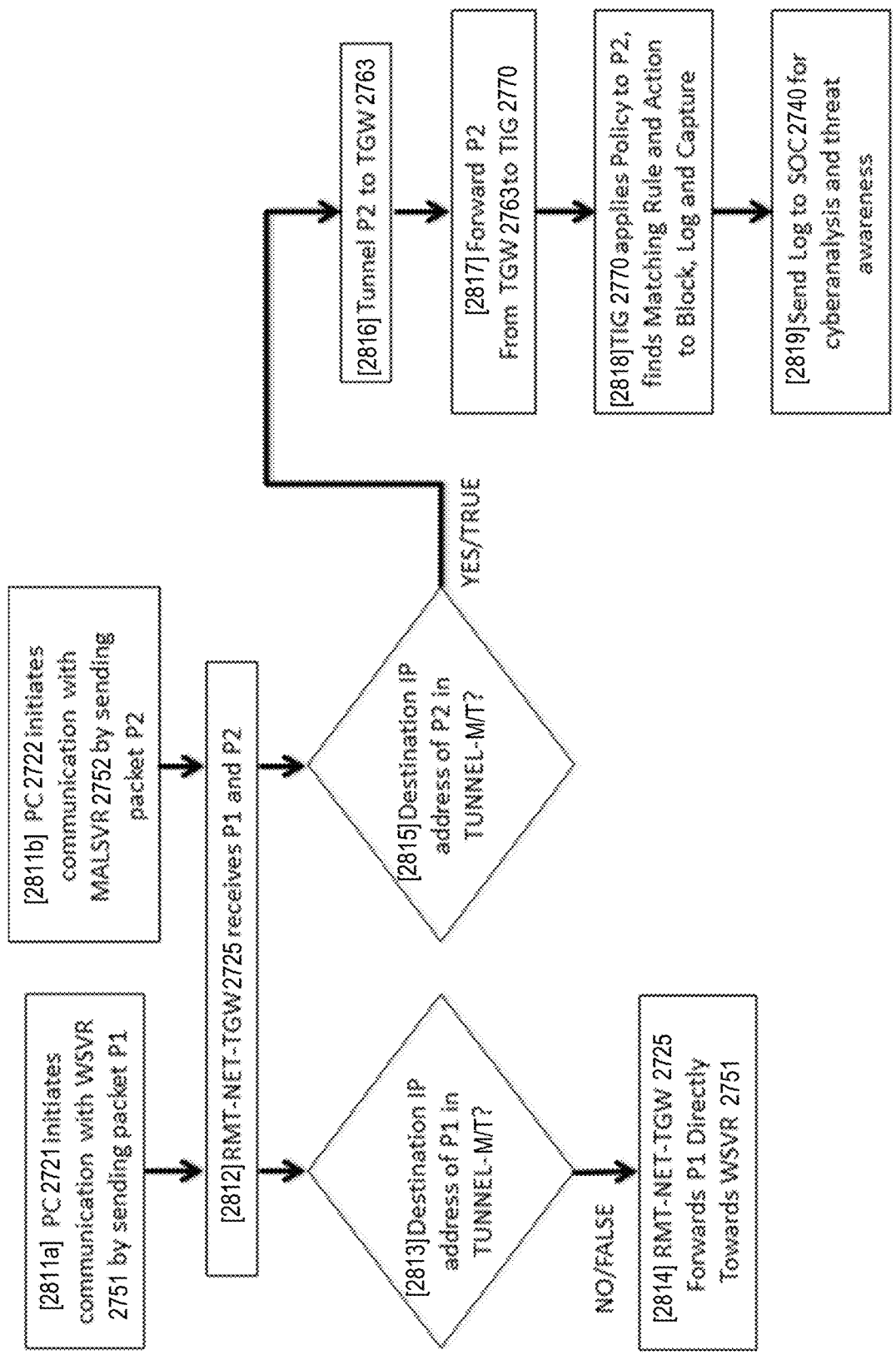
FIG. 17 is a flow chart showing an example method for packet filtering and efficient backhauling for network protection in remote networks.

FIG. 17 depicts a flowchart for an operational concept for packet filtering and efficient backhauling for network protection in remote networks, associated tunnel gateways, and associated central networks. For the case of a remote network (e.g., remote network RMT-NET 2720 of FIG. 15, with multiple connected hosts, for example PC 2721 and PC 2722), a single tunnel may be used to selectively tunnel, or backhaul, to the central network CENT-NET 2760, only the packet traffic that is known to be associated with a threat. Otherwise, packets may bypass the tunnel and instead may be forwarded directly to their destinations.

As an introduction, FIG. 17 depicts one process via which remote devices (e.g., RMT-NET-TGW 2725) may use a received TUNNEL-M/T data structure to test packets (e.g., packets associated with Internet communications) and determine whether those packets should be transmitted to a central device/network for further analysis. For example, if one or more of a packet's attributes are present in/represented by the data structure, then the packet may be forwarded to a central device for further analysis. In contrast, if the one or more attributes are not present in/represented by the data structure, the packet may be forwarded (e.g., to a web server) on without further analysis. As described with respect to FIG. 16, the TUNNEL-M/T data structure may be generated by the security policy creation and management server SPMS 2741.

The received TUNNEL-M/T data structure may correspond to a security policy comprising a plurality of packet filtering rules. Each packet filtering rule of the security policy may comprise one or more packet matching criteria and corresponding rule actions (e.g., network protective actions, or PTFs) to take on packets matching the packet matching criteria. At least a first packet filtering rule of the security policy may be automatically generated based on a CTI report provided by an independent CTI provider. At least a second packet filtering rule of the security policy may be automatically generated based on a second CTI report provided by a different independent CTI provider.

With reference to FIG. 15, one or more CTIPs (e.g., CTIP 2742 and/or CTIP 2743) may have identified malware server MALSVR 2752 as a threat but might not have identified web server WSVR 2751 as a threat. Accordingly, for example, the IP address (or any other threat indicator) of the malware server MALSVR 2752 may be included in CTI that is supplied to the security policy creation and management server SPMS 2741. A process similar to that shown and described with reference to FIG. 16 may result in (a) threat intelligence gateway TIG 2770 being configured with the security policy that includes a packet filtering rule, where the packet filtering rule may specify a packet matching criterion corresponding to the IP address (or any other threat indicator) of the malware server MALSVR 2752; and (b) the remote network tunnel gateway RMT-NET-TGW 2725 being configured with a data structure TUNNEL-M/T. The data structure TUNNEL M/T may be generated based on a set of packet matching criteria, which may include the IP address (or any other threat indicator) of the malware server MALSVR 2752 as an element in the set. The set of packet matching criteria might not include the IP address (or a threat indicator) of the web server WSVR 2751 as an element in the set.

In step 2811a, the host PC 2721 may initiate communications with the web server WSVR 2751. The communication may be initiated with the web server WSVR 2751 by the host PC 2721, for example, by sending a TCP SYN contained in a packet P1 with a destination IP address corresponding to the web server WSVR 2751. A user associated with the host PC 2721 may initiate communication with the web server WSVR 2751, for example, via a web browser or an application, associated with the web server WSVR 2751, as installed on the host PC 2721. This step may be the same as or similar to step 2211 of FIG. 14.

For example, a user operating the host PC 2721 may access a resource on web server WSVR 2751 using a URL. The host PC 2721 may resolve the host name, or FQDN, of the URL's authority to an IP address (e.g., 12.34.56.78) of the web server WSVR 2751 by querying the DNS (not shown in FIG. 15). The host PC 2721 may attempt to initiate a TCP connection with the web server WSVR 2751 on port 80 (HTTP) by creating a TCP SYN packet with destination port 80, and may encapsulate the TCP SYN packet in an IP packet. The IP packet may comprise a destination IP address field (e.g., set to 12.34.56.78) and a source IP address (e.g., of the host PC 2721).

In step 2811b, which need not happen at any particular time with respect to step 2811a, host PC 722 may initiate communications with the malware server MALSVR 2752. The communication may be initiated with the malware server MALSVR 2752 by the host PC 2722, for example, by sending a TCP SYN contained in a packet P2 with a destination IP address corresponding to the malware server MALSVR 2752. For example, a malicious application installed on the host PC 2722 may initiate clandestine communications with the malware server 2752 resulting in the sending of the TCP SYN. In another example, the host PC 2722 may initiate the communication with the malware server MALSVR 2752 based on a user clicking on a link in a malicious email (e.g., a spear phishing email) or any other form of electronic communication.

For example, a user operating the host PC 2722 may read a spear phishing e-mail and may be tricked into clicking on an embedded URL that links to a resource on malware server MALSVR 2752. The resource may contain a web page that spoofs the login page for an enterprise web application on the enterprise system server ESVR 2762. The host PC 2722 may resolve the host name, or an FQDN, of the URL's authority to an IP address (e.g., 87.65.43.21) of malware server MALSVR 2752 by querying the DNS (not shown in FIG. 15). The host PC 2722 may attempt to initiate a TCP connection with malware server MALSVR 2752 on port 80 (HTTP) by creating a TCP SYN packet with destination port 80, and may encapsulate the TCP packet in an IP packet. The IP packet may comprise a destination IP address field set to 87.65.43.21.

In step 2812, the remote network tunnel gateway RMT-NET-TGW 2725 may receive packets P1 and/or P2. The packets may originate in the remote network RMT-NET 2720. At steps 2813 and 2814, the remote network tunnel gateway RMT-NET-TGW 2725 may test whether one or more packet elements (e.g., packet matching criteria such as an IP address, domain names, URIs, certificate IDs, or any other packet elements), of the received packets P1 and/or P2, are elements in (e.g., members of/are represented in) the data structure TUNNEL M/T (e.g., as generated at step 2803 and distributed at step 2805). The data structure TUNNEL M/T may be associated with the security policy enforced by the threat intelligence gateway TIG 2770. These steps might be the same as or similar to step 2212 of FIG. 14.

In step 2813, the remote network tunnel gateway RMT-NET-TGW 2725 may determine, for each packet P1 and/or P2, respective packet matching criterion/packet element. The remote network tunnel gateway RMT-NET-TGW 2725 may test a ruletree data structure and/or a flat hash map data structure (e.g., the data structure TUNNEL-B/F) for the determined packet matching criterion. The data structure TUNNEL-M/T may represent each of the packet filtering rules of the security policy configured at the threat intelligence gateway TIG 2770 (e.g., as described with respect to FIG. 16). Based on a determination that a packet matching criterion/packet element of a packet (e.g., packet P1) is not represented in the data structure TUNNEL-M/T, the remote network tunnel gateway RMT-NET-TGW 2725 may forward the packet P1 towards its intended destination (e.g., the web server WSVR 2751). Based on a determination that a packet matching criterion/packet element of a packet (e.g., packet P2) is represented in the data structure TUNNEL-M/T, the remote network tunnel gateway RMT-NET-TGW 2725 may tunnel the packet P2 to the central network CENT-NET 2760. The central network CENT-NET 2760 may filter the packet based on the packet filtering rules of the security policy. For example, the threat intelligence gateway TIG 2770 at the central network CENT-NET 2760 may filter the packet based on the packet filtering rules of the security policy. Further details associated with packet tunneling and filtering are described below.

The remote network tunnel gateway RMT-NET-TGW 2725 may extract a packet element of the packet P1. For example, the remote network tunnel gateway RMT-NET-TGW 2725 may extract the destination IP address, which may be the IP address of the web server WSVR 2751, from the packet P1. The remote network tunnel gateway RMT-NET-TGW 2725 may test if the packet element (e.g., the destination IP address) is an element in, or a member of, the data structure TUNNEL-M/T. The membership test may return FALSE, for example, if the packet element is not an element in, or a member of, the data structure TUNNEL-M/T. The membership test returning FALSE may imply that the packet P1 does not correspond to any packet filtering rule in the policy enforced by the threat intelligence gateway TIG 2770. Accordingly, in step 9814, the remote network tunnel gateway RMT-NET-TGW 2725 may forward the packet P1 towards the web server WSVR 2751 via the Internet 2730 if the membership test returns FALSE.

For example, the remote network tunnel gateway RMT-NET-TGW 2725 may extract an IP address (e.g. 12.34.56.78) from the destination IP address field of packet P1, and may test if 12.34.56.78 is a member of the data structure TUNNEL-B/F. The membership test may return FALSE based on IP address 12.34.56.78 not being a member of the data structure TUNNEL-B/F. The remote network tunnel gateway RMT-NET-TGW 2725 may determine that there is no matching packet filtering rule, for the packet P1, in the security policy enforced by the threat intelligence gateway TIG 2770, for example, based on the membership test returning FALSE. The remote network tunnel gateway RMT-NET-TGW 2725 may determine that there is no threat risk associated with the tested packet data (e.g. IP address 12.34.56.78 for web server WSVR 2751), for example, based on the membership test returning FALSE. The remote network tunnel gateway RMT-NET-TGW 2725 may determine that there is no need to tunnel the packet P1 to be filtered (at the central network CENT-NET 2760), for example, based on the membership test returning FALSE. As a result, the remote network tunnel gateway RMT-NET-TGW 2725 might not forward the packet P1 to TGW 2763, to the threat intelligence gateway TIG 2770, and/or to the security stack SSTK 2775.

In step 2815, the remote network tunnel gateway RMT-NET-TGW 2725 may extract a packet element of the packet P2. For example, the remote network tunnel gateway RMT-NET-TGW 2725 may extract the destination IP address, which is the IP address of the malware server MALSVR 2752, from packet P2. The remote network tunnel gateway RMT-NET-TGW 2725 may test if the packet element (e.g., destination IP address) is an element in, or a member of, the data structure TUNNEL-M/T. The membership test may return TRUE, for example, if the packet element is an element in, or a member of, the data structure TUNNEL-M/T. The membership test returning TRUE may imply that the packet P2 corresponds to a packet filtering rule in the policy enforced by the threat intelligence gateway TIG 2770. Accordingly, in step 2816, the remote network tunnel gateway RMT-NET-TGW 2725 may tunnel the packet P2 to the tunnel gateway TGW 2763, which may terminate in central network CENT-NET 2760.

For example, the remote network tunnel gateway RMT-NET-TGW 2725 may extract an IP address (e.g. 87.65.43.21) from the destination IP address field of packet P2, and may test if 87.65.43.21 is a member of the data structure TUNNEL-M/T. The membership test may return a TRUE value based on the IP address 87.65.43.21 being a member of the data structure TUNNEL-M/T. The remote network tunnel gateway RMT-NET-TGW 2725 may determine that there may be at least one matching packet filtering rule, for the packet P2, in the security policy enforced by the threat intelligence gateway TIG 2770, for example, based on the membership test returning TRUE. The remote network tunnel gateway RMT-NET-TGW 2725 may determine that there is some threat risk associated with the tested packet data (e.g. IP address 87.65.43.21 for web server MALSVR 2752), for example, based on the membership test returning TRUE. The remote network tunnel gateway RMT-NET-TGW 2725 may determine that the packet P2 needs to be tunneled for further processing (e.g., filtering) at the central network CENT-NET 2760, for example, based on the membership test returning TRUE. As a result, the remote network tunnel gateway RMT-NET-TGW 2725 may forward the packet P2 to the TGW 2763, to the threat intelligence gateway TIG 2770, and/or to the security stack SSTK 2775.

While steps 2813 and 2815 describe the use of a destination IP address of a packet for performing a membership test, any other element (or a plurality of elements) of the packet that may correspond to elements inserted in TUNNEL-M/T may be used.

Additionally and/or alternatively, before transmitting any packet based on a determination of a match from a test of the data structure TUNNEL-M/T, the remote network tunnel gateway RMT-NET-TGW 2725 may test a secondary data structure, to lower the amount of network traffic. For example, the remote network tunnel gateway RMT-NET-TGW 2725 may test a block rule data structure, which may represent each rule of the security policy that is associated with a block action or PTF. Based on the TRUE value or other indication that there is a matching packet filtering rule in the security policy associated with the block rule data structure, the remote network tunnel gateway RMT-NET-TGW 2725 may perform a block rule action to prevent packets associated with a block rule from proceeding to their intended destination, without having to transmit such packets through the tunnel to the tunnel gateway TGW 2763. The block rule data structure may be a ruletree data structure configured for set membership testing, a flat hash map data structure configured for set membership testing, Bloom filter, and/or any other probabilistic data structure.

For example, with reference to the above example where a packet element of the packet P2 is determined to be an element in, or a member of, the data structure TUNNEL-M/T, the remote network tunnel gateway RMT-NET-TGW 2725 may extract a second packet element of the packet P2. For example, the second packet element may be a URI associated with the packet P2. The remote network tunnel gateway RMT-NET-TGW 2725 may extract the URI of the packet P2, and may test if the URI is a member of a block rule data structure BLOCK-M/T. The membership test may return a TRUE value based on the URI being a member of the data structure BLOCK-M/T. The remote network tunnel gateway RMT-NET-TGW 2725 may determine that there is at least one matching packet filtering rule for blocking a packet, for the packet P2, in the security policy enforced by the threat intelligence gateway TIG 2770, for example, based on the membership test returning TRUE. The remote network tunnel gateway RMT-NET-TGW 2725 may determine that there is high threat risk associated with the tested packet data of packet P2, for example, based on the membership test returning TRUE. The remote network tunnel gateway RMT-NET-TGW 2725 may block the packet P2 from exiting the remote network RMT-NET 2720 based on the membership test returning TRUE.

Performing membership tests on packets (e.g., testing if packet elements, associated with the packets, are members of the data structure TUNNEL-M/T) at the remote network tunnel gateway RMT-NET-TGW 2725 may reduce processing requirements at the hosts (e.g., PC 2721 and PC 2722). The hosts need not perform the membership tests thereby improving resource availability at the hosts. Further, higher available resources at the remote network tunnel gateway RMT-NET-TGW 2725 may enable faster packet processing.

In step 2817, the packet P2 may exit/egress from the tunnel and may be forwarded through the central network CENT-NET 2760 towards the malware server MALSVR 2752 (which corresponds to the destination IP address of P2). On the path towards the malware server MALSVR 2752, the packet P2 may be received by the threat intelligence gateway TIG 2770.

In step 2818, the threat intelligence gateway TIG 2770 may apply a security policy to the packet P2. Applying a security policy may comprise applying a packet filtering rule with matching criteria that correspond to the packet element (e.g., destination IP address) of packet P2 (e.g., the IP address of MALSVR 2752). The matching rule's disposition (e.g., network protective action, or PTF, or rule action) may be to block the packet, and the directives may be to log and capture the packet. Accordingly, packet P2 may be blocked, logged, and/or captured, thereby protecting PC 2722 and the enterprise network from any malware or malicious actions that may result from connecting to the malware server MALSVR 2752.

In step 2819, the log of packet P2 may be sent to the security operations center SOC 2740, where one or more cyberanalysis applications and threat awareness applications may process the log. This processing may result in, for example, remedial actions such as sweeping the PC 2722 for malware, or any other remedial actions and/or protective actions.

Set membership testing may also be used to prevent attacks associated with the Internet's Domain Name System (DNS). DNS requests may be used as an attack vector for some types of attacks which, if successful, may cause damage to and/or loss of network assets. For example, an attack may comprise DNS query request messages that contain domain names not registered (e.g., registered and/or recorded) in the DNS. Such requests, particularly in large quantities, may disrupt performance of a DNS server. Set membership testing may be used to check whether domain names contained in incoming requests are registered (e.g., registered and/or recorded) domain names. If a domain name contained in an incoming request is not a member of a set of registered (e.g., registered and/or recorded) domain names, appropriate action may be taken (e.g., dropping requests to prevent attack). Flat hash map data structures and ruletree data structures may be used for such set membership testing, as described above.

Figure 18:
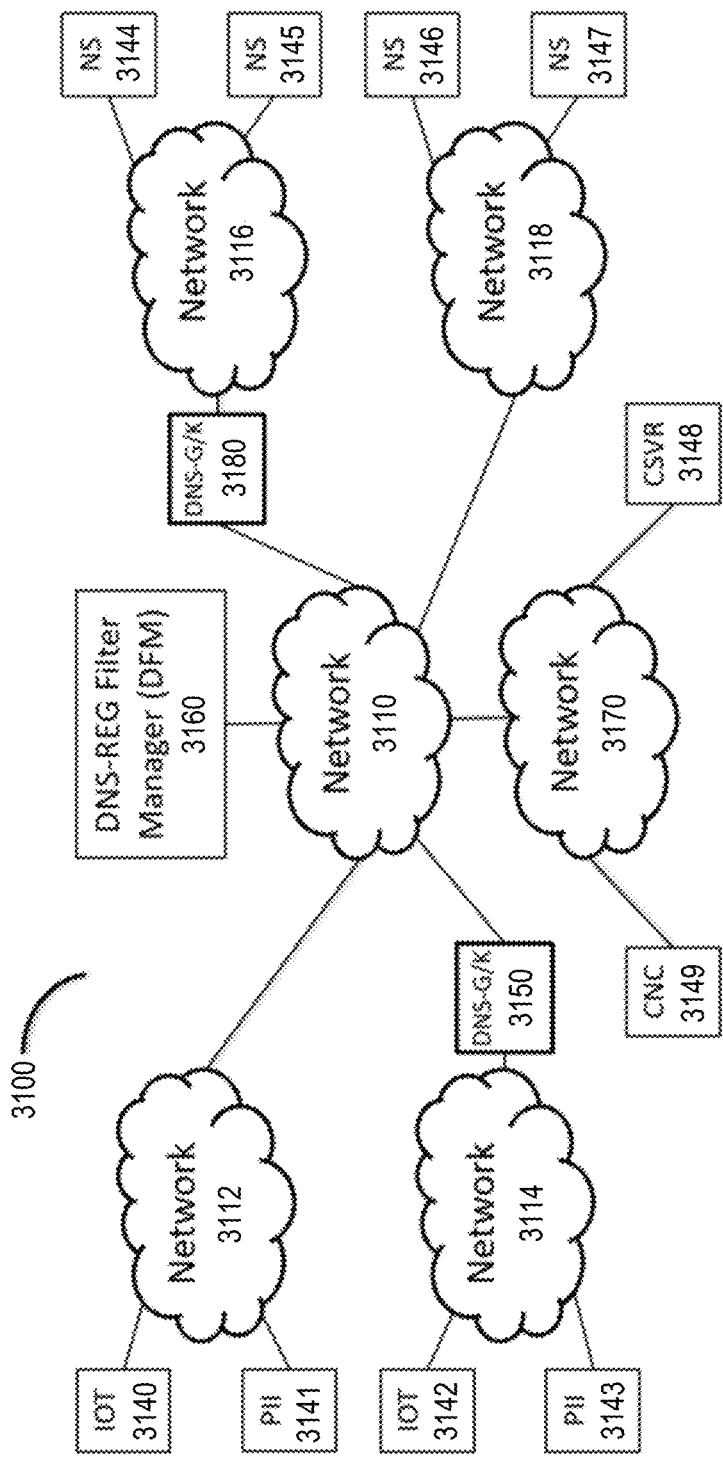
FIG. 18 shows another example network environment in which ruletrees and/or flat hash maps may be used as set membership testing data structures.

FIG. 18 shows another example network environment 3100 in which ruletrees and/or flat hash maps may be used as set membership testing data structures. Elements shown in FIG. 18 may also perform operations described in connection with elements shown in FIGS. 1, 12 and/or 15, and elements shown in FIGS. 1, 12 and/or 15 may also perform operations described in connection with FIG. 18. The network environment 3100 may include a DNS attack prevention system that acts to protect the domain name system (DNS) of an internetwork, such as the public Internet and private networks that may be interconnected by the public Internet, from attacks that may use bogus DNS requests as attack vectors. The network 3110 may be the public Internet, which may interconnect networks 3112, 3114, 3116, 3118, and 3120.

The network 3112 may be a private enterprise network with a plurality of hosts. The plurality of hosts may include at least one "Internet of Things" (IoT) device IoT 3140, such as a security camera or appliance that may be remotely managed and operated via the Internet, and a personally identifiable information (PII) host PII 3141. Host IoT 3140 and other IoT devices (not shown) attached to network 3112 may have been infected with malware that may generate attacks on the DNS by issuing many bogus DNS requests with domain names designed to attack specific authoritative name servers (such as host NS 3144 attached to network 3116, described below). Host PII 3141 is representative of a personal computer or server that manages sensitive information, such as personally identifiable information (PII), credit card information, and the like. Host PII 3141 may be infected by malware that collects credit card information and the infected host may use a DNS tunneling method to exfiltrate the information to collection server CSVR 3148 attached to network 3170 (described below). Both attacks may issue requests with domain names that may not be registered (e.g., registered and/or recorded) in the DNS.

Network 3114 and attached hosts IoT 3142 and PII 3143 may be similarly configured and similarly compromised as Network 3112 and hosts IoT 3140 and PII 3141. However, Network 3114 may be configured with a DNS gatekeeper, DNS-G/K 3150, located at or near a boundary between Network 3114 and the Internet 3110. Network 3114 may be configured such that the DNS-G/K 3150 filters all DNS requests crossing the boundary of Network 3114 and may control which DNS requests may access the DNS.

Network 3116 may be operated by a DNS infrastructure provider organization DIPO-X. Authoritative name servers NS 3144 and NS 3145 may be DNS authoritative name servers for the domains example-3144.com and example-3145.com, which DIPO-X may operate on behalf of associated registrar organizations. Both name servers NS 3144 and NS 3145 may be configured to provide their zone files, which may include lists of all the registered domain names those servers manage, to authorized requestors. Network 3116 may have a DNS gatekeeper DNS-G/K 3180 located at or near a boundary between Network 3116 and the Internet 3110. Network 3116 may be configured such that the DNS gatekeeper DNS-G/K 3180 filters all DNS requests crossing the boundary and may control which DNS requests may access the DNS name servers for example-3144.com (authoritative name server NS 3144) and example-3145.com (authoritative name server NS 3145).

Network 3118 may be operated by a DNS infrastructure provider organization (e.g., DIPO-Y). Host authoritative name servers NS 3146 and NS 3147 may be DNS authoritative name servers for the domains example-3146.com and example-3147.com, which DIPO-Y may operate on behalf of associated registrar companies. Both name servers NS 3146 and NS 3147 may be configured to provide their zone files, which may include lists of all the registered domain names those servers manage, to authorized requestors. Network 3118 need not have a DNS gatekeeper that controls which DNS requests may access the DNS name servers for example-3146.com (authoritative name server NS 3146) and example-3147.com (authoritative name server NS 3147).

Network 3170 may be operated by at least one malicious actor. Network 3170 may include a collection server host CSVR 3148 which may collect data exfiltrated by bogus DNS requests, and may include botnet command and control host system CNC 3149 that may execute a botnet command and control process that instructs infected devices to launch DDoS attacks on the DNS. A malicious data collection process executing on collection server CSVR 3148 may receive bogus DNS requests on port 53, the well-known port for DNS. The collection server CSVR 3148's public IP address may be, for the following examples, 21.43.65.87. A network firewall (not shown) associated with Network 3170 may be configured to allow inbound packets with destination IP address 21.43.65.87 of the collection server CSVR 3148 and destination port 53. Network 3170 may not have a DNS gatekeeper controlling access to the DNS.

The DNS Filter Manager (DFM) 3160, which may act as a system management server, may execute as a host attached to a private network (not shown) that interfaces the Internet 3110. The DFM 3160 may continually collect lists of registered (e.g., registered and/or recorded) domain names from all DNS authoritative name servers, such as DNS authoritative name servers NS 3144-3147, and/or from associated domain lists aggregators (not shown in FIG. 18), and from other sources of registered (e.g., registered and/or recorded) domain names. The DFM 3160 may encode and may store all of the registered (e.g., registered and/or recorded) domain names in at least one data structure DNS-REG. The at least one data structure DNS-REG may comprise one or more flat hash map configured for set membership testing (e.g., for testing for membership in a set of registered (e.g., registered and/or recorded) domain names) and/or one or more ruletree data structures configured for set membership testing. Optionally, the at least one data structure DNS-REG may also comprise a Bloom filter or other probabilistic set data structure for set membership testing. The DFM 3160 may distribute the DNS-REG data structure(s) to subscribing DNS gatekeepers (e.g., DNS-G/K 3150 and DNS-G/K 3180).

The DFM 3160 may also include functions for managing information supplied by or uploaded by the subscribing DNS gatekeepers (e.g., DNS-G/Ks 3150 and 3180). This information may include unregistered (e.g., unregistered and/or unrecorded) domain names detected by the subscribing DNS gatekeepers DNS-G/Ks 3150 and 3180 and associated metadata (e.g., attack type estimates, timestamps, rate estimations, origin hosts, DNS-G/K IDs, etc.), which may be used as threat intelligence for determining or detecting other attacks. The information may also include statistics on DNS requests and responses observed by the DNS-G/Ks 3150 and 3180 and element management information for the DNS-G/Ks 3150 and 3180. The DFM 3160 may also include functions for providing information collected from DNS-G/Ks 3150 and 3180 to subscribing applications (not shown in FIG. 18), such as threat intelligence providers, cyberanalysis applications, network element managers, DNS monitoring applications, DNS protection applications, Internet protection applications, etc.

The DNS-G/K 3150 and the DNS-G/K 3180 shown in FIG. 18 (and FIG. 19, discussed below) may, but need not, be all or portions of a network device, such as a TIG. In general, the DNS-G/K 150 and the DNS-G/K 180 may execute on any computing device, including but not limited to those computing devices discussed above or below.

Figure 19:
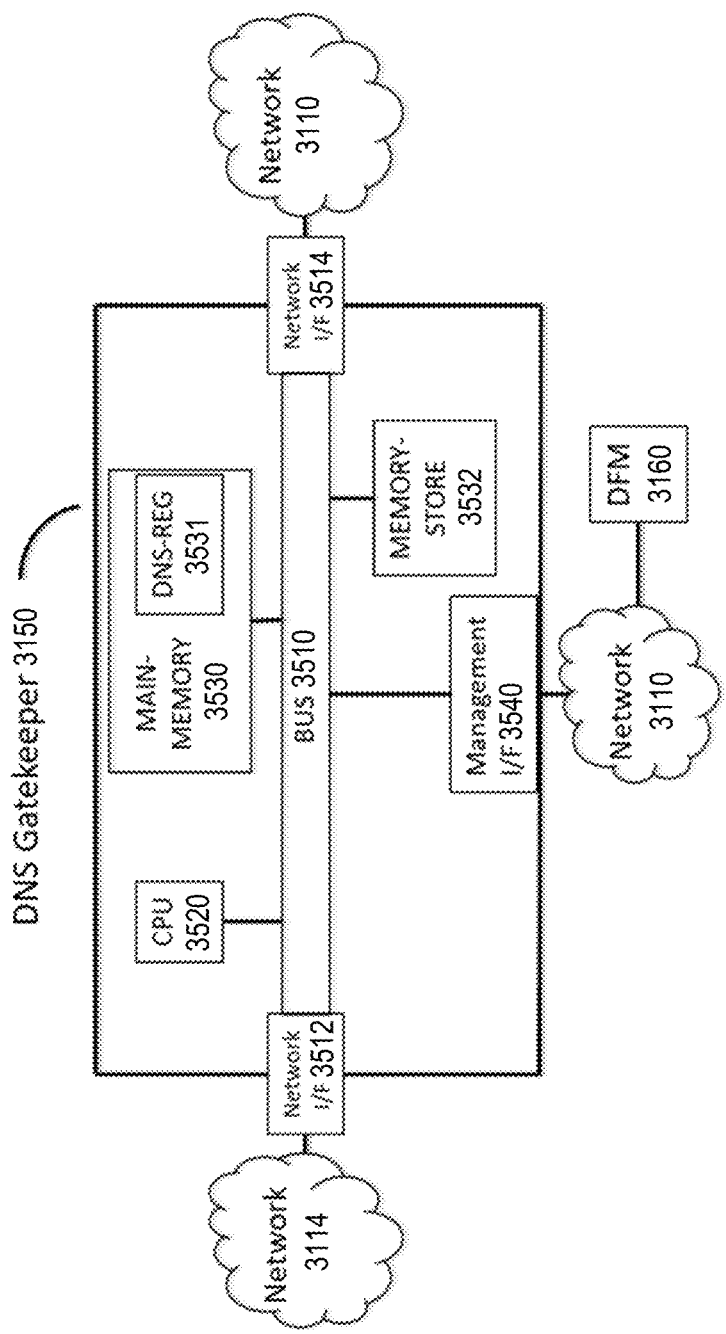
FIG. 19 is a block diagram showing an example DNS gatekeeper.

FIG. 19 shows a representative system components diagram for the DNS-G/K 3150 and/or the DNS-G/K 3180 that supports aspects of the present disclosure. DNS-G/K 3150 components may include a processor CPU 3520, which may execute logic for configuring and operating the DNS-G/K 3150, network interfaces 3512 and 3514 for interfacing Networks 3114 and 3110, respectively, a management interface MGMT I/F 3540 that connects to Network 3110, a main memory module MAIN-MEMORY 3530 that may contain a data structure DNS-REG 3531, and a memory store MEMORY-STORE 3532 for persistent storage. The components may be connected to a bus, BUS 3510, which may be used to transfer information between the components of the DNS-G/K 3150. The DNS-REG 3531 may be provided to the DNS-G/K 3150 by DFM 3160 via the management interface 3540 and Network 3110. The system components of the DNS-G/K 3150 may be any combination of (e.g., co-resident) processes or applications executing on the same host, processes executing on different hosts, processes executing on virtual infrastructure, such as a hypervisor, or other arrangement of components and software. Similarly, the bus, BUS 3510, may not solely be an integrated/embedded data bus of a printed circuit board (PCB), but may also be, for example, an L2/L3 switched network, L3 routed network, L2/L3 network links connecting logical components, and the like, in any combination. The data bus may be wired, wireless, physical, logical, virtual, software-defined, etc., in any combination. Network interfaces 3512 and 3514 may be L3 transparent. Network interfaces 3512 and 3514 may not have assigned IP addresses and may not participate in L3 routing processes. Similarly, network interfaces 3512 and 3514 may be L2 transparent. Network interfaces 3512 and 3514 may not have assigned MAC addresses and thus may not participate in ARP processes. The management interface MGMT I/F 3540 may have an assigned IP address for communicating with management devices, such as DFM 3160.

Figure 20:
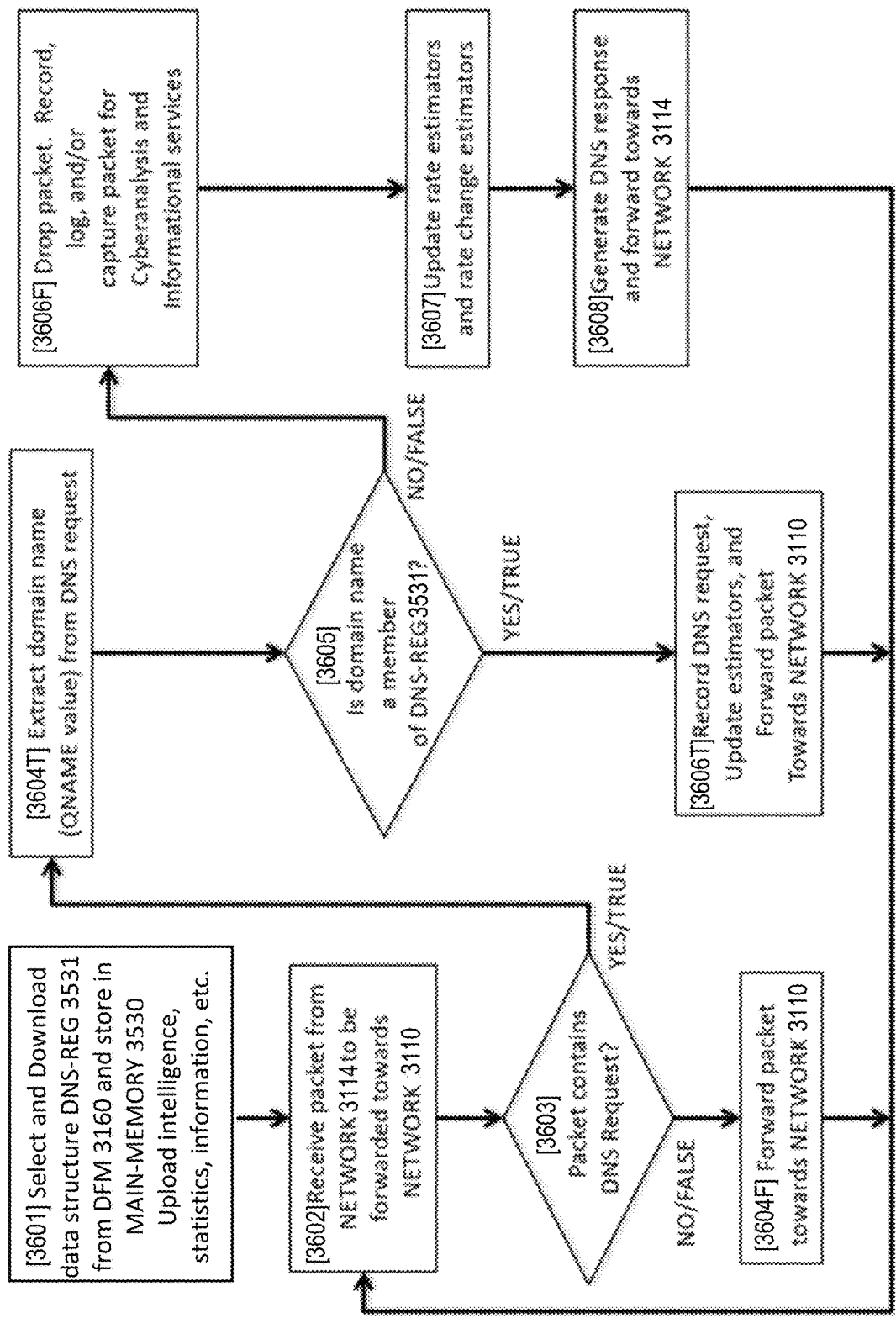
FIG. 20 is a flow chart showing an example method for operating a DNS gatekeeper.

FIG. 20 is a flowchart for a representative operational concept of the DNS-G/K 3150. In step 3601, the DNS-G/K 3150 may select a data structure (e.g., a flat hash map), DNS-REG 3531, offered by the DFM 3160, and may download and store the DNS-REG 3531 in its main memory MAIN-MEMORY 3530. The DNS-REG 3531 may contain keys for all domain names currently registered (e.g., registered and/or recorded) in the DNS, as available to or determined by the DFM 3160. The DFM 3160 may offer multiple versions of DNS-REG 3531 for use by DNS gatekeepers, which may be characterized by corresponding memory requirements. The versions of the DNS-REG 3531 may also be characterized by creation time, and the selection and download of the DNS-REG 3531 may be part of an update process of the DNS-G/K 3150. A version of the DNS-REG 3531 may be selected by the DNS-G/K 3150 based on corresponding memory requirements for storing the DNS-REG 3531. In step 3601, the DNS-G/K 3150 may also upload to DFM 3160 information collected in steps 3603, 3607, and 3608. The upload may be part of an update process. The upload may include data such as bad, bogus, or unregistered (e.g., unregistered and/or unrecorded) domain names detected by the DNS-G/K 3150 and associated metadata (e.g., timestamps, origin host identifiers, estimated attack type, rate estimations, etc.), which may be used, for example, as threat intelligence and in threat intelligence reports. The upload data may include statistics on DNS requests and responses observed by the DNS-G/K 3150, and domain names that DNS-G/K 3150 determined may be registered (e.g., registered and/or recorded) in the DNS but that may not be contained in the local instance the DNS-REG 3531 (e.g., due to synchronization lag). Such domain names may have been determined by the DNS-G/K 3150 in step 3612 of FIG. 21 (described below). Other information such as DNS-G/K 3150 element management information may also be uploaded.

In step 3602, the DNS-G/K 3150 may receive an in-transit packet from NETWORK 3114, which may be intended to be forwarded towards NETWORK 3110. The DNS-G/K 3150 may also process packets transmitted in the opposite direction, from NETWORK 3110 towards NETWORK 3114, but for illustrative purposes, only one direction is described. In step 3603, the DNS-G/K 3150 may determine if the packet contains a DNS query request. If the packet does not contain a DNS query request, then in step 3604F, the packet may be forwarded into NETWORK 3110, and the DNS-G/K 3150 cycles back to step 3602 to process additional packets. If the packet does contain a DNS query request, then in step 3604T, the domain name, which may be contained in a QNAME field, may be extracted.

In step 3605, the DNS-G/K 3150 may test if the domain name is a member of the set contained in the DNS-REG 3531. The DNS-REG 3531 may include keys for the set of all domain names currently registered (e.g., registered and/or recorded) in the DNS, based on the last update according to the DFM 3160. When the membership test returns TRUE, or when it is determined that the name is registered (e.g., registered and/or recorded) in the DNS, in step 3606T the packet and associated DNS requests and metadata may be recorded for analysis and statistics purposes and stored in MEMORY-STORE 3532. In addition, the ratio of the rate of bad, bogus, or unregistered (e.g., unregistered and/or unrecorded) domain names DNS requests to the rate of all DNS requests and/or the ratio of the rate of change in the rate of bad, bogus, or unregistered (e.g., unregistered and/or unrecorded) domain names DNS requests to the rate of all DNS requests may be updated by the DNS-G/K 3150, the packet may be forwarded into NETWORK 3110, and the DNS-G/K 3150 may cycle back to step 3602 to process additional packets.

When the membership test returns FALSE, and/or when it is determined that the name is not registered (e.g., not registered and/or not recorded) in the DNS and determined that the DNS request is associated with bad, bogus, or unregistered (e.g., unregistered and/or unrecorded) domain names, then in step 3606F, the packet may be dropped or blocked. The packet and associated information and metadata (e.g., a domain name, time, location, direction, origin, attack type estimate, rate estimates, etc.) may be recorded for statistics purposes, packet and associated information and metadata may be logged and/or captured, and the packet and associated information and metadata may be stored in MEMORY-STORE 3532. This data subsequently may be transmitted to or uploaded to the DFM 3160 as in step 3601 above. The packet and associated information and metadata may be made available for use in cyberanalysis applications, threat intelligence applications, and network protection applications such as applications for securing and protecting the global DNS and the global Internet (not shown in FIG. 20). For example, during a high-rate DDoS attack using bogus DNS requests as the attack vector, logging and/or capturing the packets associated with the attack may consume unacceptably large amounts of computing resources. As such, statistical information requiring fewer resources may be collected instead. The cyberanalysis application may identify infected hosts that may be the originators of the bogus DNS requests. The packet and associated information and metadata may be provided to a cyber threat intelligence database, which subsequently may be used by applications and systems that protect networks. For example, DNS infrastructure providers and Internet service providers may collectively use the data to drive global DNS and global Internet protection applications.

In step 3607, the rate of bad, bogus, or unregistered (e.g., unregistered and/or unrecorded) domain names DNS requests may be updated to incorporate the occurrence of the bad, bogus, or unregistered (e.g., unregistered and/or unrecorded) domain name DNS request. The DNS-G/K 3150 may determine or compute the rate of occurrence of bad, bogus, or unregistered (e.g., unregistered and/or unrecorded) domain name DNS requests, or a rate of occurrence of all DNS requests. The DNS-G/K 3150 may determine or compute the rate of change in the occurrence of bogus DNS requests, or a change of rate of occurrence of all DNS requests. The rate of DNS requests and/or the rate of change in the rate of DNS requests may be used in step 3608 to determine the type of attack associated with the bad, bogus, or unregistered (e.g., unregistered and/or unrecorded) domain name DNS request(s), and may be used to determine a DNS response, if any, that may be generated. In step 3608, the DNS-G/K 3150 may determine what type of DNS query response, if any, to generate in response to the bad, bogus, or unregistered (e.g., unregistered and/or unrecorded) domain name DNS query request, and may forward any generated DNS response towards Network 3114. When generating a DNS response, the DNS-G/K 3150 may spoof an actual DNS responder, and may send a spoofed response to the originator of the associated DNS request and any intermediate devices that may have observed the DNS request. The spoofed response may appear to the requesting device to be a response from an authenticated name server of the DNS.

The factors used to determine the DNS response may include: the current estimated rates of bad, bogus, or unregistered (e.g., unregistered and/or unrecorded) domain name requests and of legitimate DNS requests, rates of change of bad, bogus, or unregistered (e.g., unregistered and/or unrecorded) domain name requests and of legitimate DNS requests, the false positive rate P of the data structure (e.g., DNS-REG 1531), an estimated lag, if the domain name includes a country code in its suffix, an estimate of the type of attack for which the bad, bogus, or unregistered (e.g., unregistered and/or unrecorded) domain name DNS request is an attack vector, and/or the syntactical characteristics of the domain name (e.g., information entropy values, correlation with human language words, label lengths, alphanumeric characteristics, and the like). For example, based on the current values of the rate of bad, bogus, or unregistered (e.g., unregistered and/or unrecorded) domain name DNS requests and/or the rate of change in the rate of bad, bogus, or unregistered (e.g., unregistered and/or unrecorded) domain name DNS requests, the DNS-G/K 3150 may determine that a high-volume DDoS attack is occurring. Based on a determination that an attack is occurring, the DNS-G/K 3150 may determine not to generate any DNS response to send back to the source of the DNS request. Generating DNS responses (e.g., a response with response codes of NXDOMAIN) to bad, bogus, or unregistered (e.g., unregistered and/or unrecorded) domain name DNS requests during such a DDoS attack may exacerbate the attack by consuming processing resources or filling up DNS caches in intermediate DNS proxies with the NXDOMAIN responses to the bad, bogus, or unregistered (e.g., unregistered and/or unrecorded) domain name DNS requests, which causes legitimate DNS requests and associated responses to not be stored in the DNS caches, which causes more loading on the DNS.

In another example, a non-DDoS attack, such as a DNS tunneling attack or exfiltration may be occurring based on the current values of the rate of bad, bogus, or unregistered (e.g., unregistered and/or unrecorded) domain name DNS requests and the rate of change in the rate of bad, bogus, or unregistered (e.g., unregistered and/or unrecorded) domain name DNS requests. Such attacks should be prevented, but are less likely to over-consume processing resources or to fill up DNS caches. The DNS-G/K 3150 may determine that a non-DDoS attack, such as a DNS tunneling attack or exfiltration may be occurring. Based on a determination that such an attack is occurring, the DNS-G/K 3150 may generate a DNS response with response code NXDOMAIN and may transmit that response to the source of the DNS request. DNS caches in any intermediate DNS proxies may store the DNS-G/K 3150 generated NXDOMAIN response, and subsequent bad, bogus, or unregistered (e.g., unregistered and/or unrecorded) domain name DNS requests, including retries of previous bad, bogus, or unregistered (e.g., unregistered and/or unrecorded) domain name DNS requests, may be handled by the intermediate DNS proxies. Conversely, the DNS-G/K 3150 may decide not to generate a DNS response and transmit it back to the source of the DNS request in order to, for example, prevent the source from realizing that it may have been discovered or otherwise identified as a malicious actor.

In yet another example, the DNS-G/K 3150 may determine that the bad, bogus, or unregistered (e.g., unregistered and/or unrecorded) domain name DNS request may be the result of human error, or simulated human error generated by malware, while operating an application that generates DNS requests, such as a web browser. Based on such a determination, the DNS-G/K 3150 may generate a DNS response with response code NXDOMAIN. Based on the response code, the application may not time out while waiting for a response to the request and may not automatically re-issue the same bad, bogus, or unregistered (e.g., unregistered and/or unrecorded) domain name DNS request. For example, web browsers generating faulty DNS requests may repeat this retry cycle multiple times if a DNS response is not received for a DNS request, which may cause the browser to be temporarily unavailable to the human operator, until the browser gives up. The repetition of issuing the same bad DNS request may be viewed as a denial-of-service attack. The repetition of issuing the same bad DNS request may be prevented by the DNS-G/K 3150 generating and sending a DNS response with response code NXDOMAIN.

Figure 21:
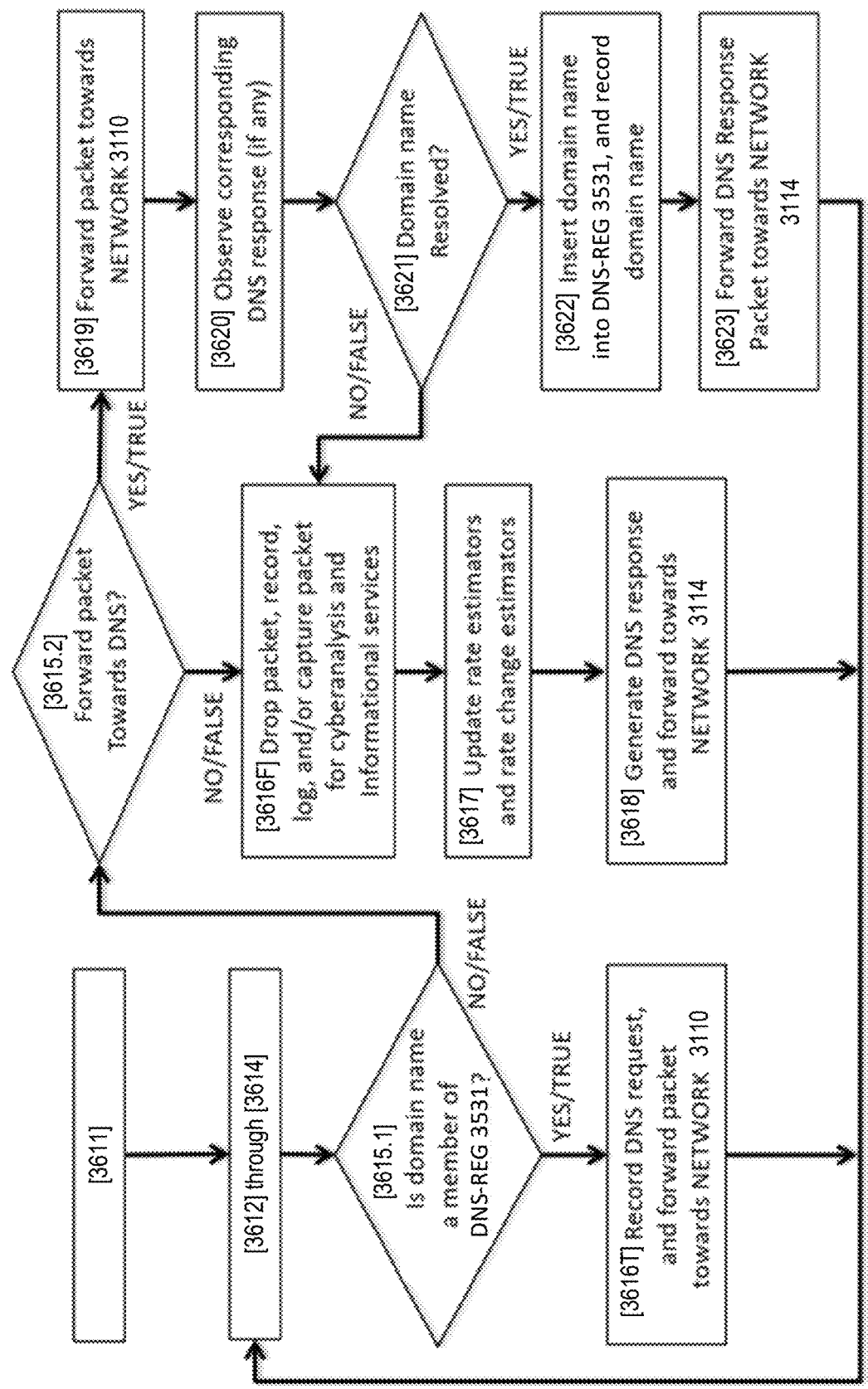
FIG. 21 is a flow chart showing another example method for operating a DNS gatekeeper.

FIG. 21 is a flowchart for operations of a DNS gatekeeper, such as the DNS-G/K 3150. Steps 3611 through 3614 in FIG. 21 are substantially the same as steps 3601 through 3604 in FIG. 20; therefore, a description of those steps is not repeated here or in the drawing. The other steps relate to the handling of DNS requests that may be forwarded, by the DNS-G/K 3150, towards the DNS even though the domain name membership test of step 3605 in FIG. 21 returned FALSE.

As discussed above, some requests may relate to domain names that are not in the DNS-REG 3531 due to lag, such as a country-code lag. For example, some gaps in the collection of all country code domains may occur in the domain names registered (e.g., registered and/or recorded) in a local DNS-REG 3531, and a country code domain CCD-X that is registered (e.g., registered and/or recorded) in the global DNS may not be included in the DNS-REG 3531 that was distributed by the DFM 160 in step 3601 of FIG. 20. Similarly, synchronization lag may be a factor if, for example, the DNS-G/K 3150 determines that a local DNS-REG 3531 stored in the DNS-G/K 3150 has not been updated, based on a data that may be received from DFM 3160, in a relatively long time. Additionally, some requests may relate to domain names that are not in the DNS-REG 3531 due to the use of unregistered (e.g., unregistered and/or unrecorded) domain names by legitimate information exchange services.

In step 3605, a membership test for CCD-X in DNS-REG 3531 may return a FALSE value and, in step 3606F, the associated packet may be dropped. However, when a packet is dropped, no new information is gathered by the DNS-G/K 3150. As an alternative to dropping, if it is determined that there is a sufficient probability that the domain name is actually registered (e.g., registered and/or recorded) in the DNS, or for other possible reasons such as intelligence collection, or such as because a determination may be made that the unregistered (e.g., unregistered and/or unrecorded) domain name is part of a legitimate information exchange service, then the DNS-G/K 3150 may decide not to drop the DNS request packet but instead forward the DNS request packet into the DNS. The DNS-G/K 3150 may monitor and observe the corresponding DNS response, which may contain either a resolved IP address, such that it is determined that the domain name is registered (e.g., registered and/or recorded) in the DNS, or an error code such as NXDOMAIN, such that it is determined that the domain name is not registered (e.g., not registered and/or not recorded) in the DNS; or there will be no response, which may indicate a DNS tunneling attack. In view of those considerations, additional processing may be provided in place of the determination in step 3605. In FIG. 21, such determinations are provided in steps 3615.1 and 3615.2.

In step 3615.1, the DNS-G/K 3150 may test if the domain name is a member of the set represented by the keys contained in DNS-REG 3531, which is representative of all domain names currently registered (e.g., registered and/or recorded) in the DNS. If the membership test returns TRUE, such that the DNS-G/K 3150 determines that the name is registered (e.g., registered and/or recorded) in the DNS, in step 3616T the packet and associated DNS requests may be recorded for statistical purposes and may be stored in MEMORY-STORE 3532. The DNS-G/K 3150 may forward the packet into NETWORK 3110, and the DNS-G/K 3150 may cycle back to step 3612 and process more packets.

If the membership test returns FALSE, such that it is determined that the domain name is not registered (e.g., not registered and/or not recorded) in the DNS-REG 3531, in step 3615.2 the DNS-G/K 3150 may determine whether to forward the packet towards the DNS. The forwarding determination may be based on a determination by DNS-G/K 3150 that the FALSE result of the membership test was due to some type of lag. For example, the DNS-G/K 3150 may determine if the domain name includes a suffix that is a country code. Based on a determination that the domain name includes a suffix that is a country code, the DNS-G/K 3150 may conclude that the FALSE result may have been due to country-code lag (as described above). Alternatively, the DNS-G/K 3150 may determine that the local copy of DNS-REG 3531 has not been updated by DFM 3160 in a relatively long time, and may conclude that the FALSE result may have been due to synchronization lag (described above). The forwarding determination may also be based on a determination by the DNS-G/K 3150 that the FALSE result of the membership test was due to the use of an unregistered (e.g., unregistered and/or unrecorded) domain name as part of a legitimate information exchange service. For example, the DNS-G/K 3150 may determine that the unregistered (e.g., unregistered and/or unrecorded) domain name includes a suffix that corresponds to an authoritative name server operated by a legitimate information exchange service.

When, in step 3615.2, the DNS-G/K 3150 may determine not to forward the DNS request packet towards the DNS, steps 3616F, 3617, and 3618 may be executed. These steps are substantially the same as steps 3606F, 3607, and 3608 of FIG. 20; therefore, a detailed description is not repeated here. When the DNS-G/K 3150 determines to forward the DNS request packet, in step 3619 the DNS-G/K 3150 may forward the DNS request packet towards the DNS via the NETWORK 3110. When the DNS-G/K 3150 determines that a domain name in a request is not registered (e.g., not registered and/or not recorded) in the DNS-REG 3531 but the request packet should be forwarded, the DNS-G/K 3150 may activate logic to monitor for communications associated with the forwarded request packet and may detect a corresponding DNS response. In step 3620, the DNS-G/K 3150 may detect or observe the corresponding DNS response, if any, transiting towards the NETWORK 3114.

In step 3621, the DNS-G/K 3150 may check if the DNS response indicates a resolved IP address, such that it is determined that that the domain name is not represented in the DNS-REG 3531 but is registered (e.g., registered and/or recorded) in the DNS. If the DNS-G/K 350 does not observe a DNS response indicating a resolved IP address, the DNS-G/K 3150 may execute steps 3616F, 3617, and 3618 (as described above), and the DNS-G/K 3150 may cycle back to step 3612 to process additional packets. If the DNS-G/K 3150 does observe a DNS response indicating a resolved IP address, in step 3622 the DNS-G/K 3150 may generate keys based on the domain name and insert those keys into the local DNS-REG 3531, and may record the domain name for informational purposes and may upload it to the DFM 3160 in step 3611. In step 3623, the DNS-G/K 3150 may forward the DNS response packet towards its destination (via NETWORK 3114), and the DNS-G/K 3150 may cycle back to step 3612 to process additional requests.

In step 3620, it may also be the case that no DNS response is observed. For example, when the associated DNS request is a vector for a DNS tunneling attack (e.g., an exfiltration), the collection server CSVR 3148 may not be configured to respond to DNS requests. A logic path for handling this case is not shown in FIG. 21. When no DNS response is observed, the DNS-G/K 3150 may determine that the DNS request may be a vector for a DNS tunneling attack. The DNS-G/K 3150 may capture, may log, and/or may record the DNS request, and may generate an alert to a cyberanalysis application that a DNS tunneling attack may have occurred. An alert, which may be associated with a single domain name or a plurality of domain names, and associated information, may be uploaded to the DFM 160 in step 3611.

Figure 22:
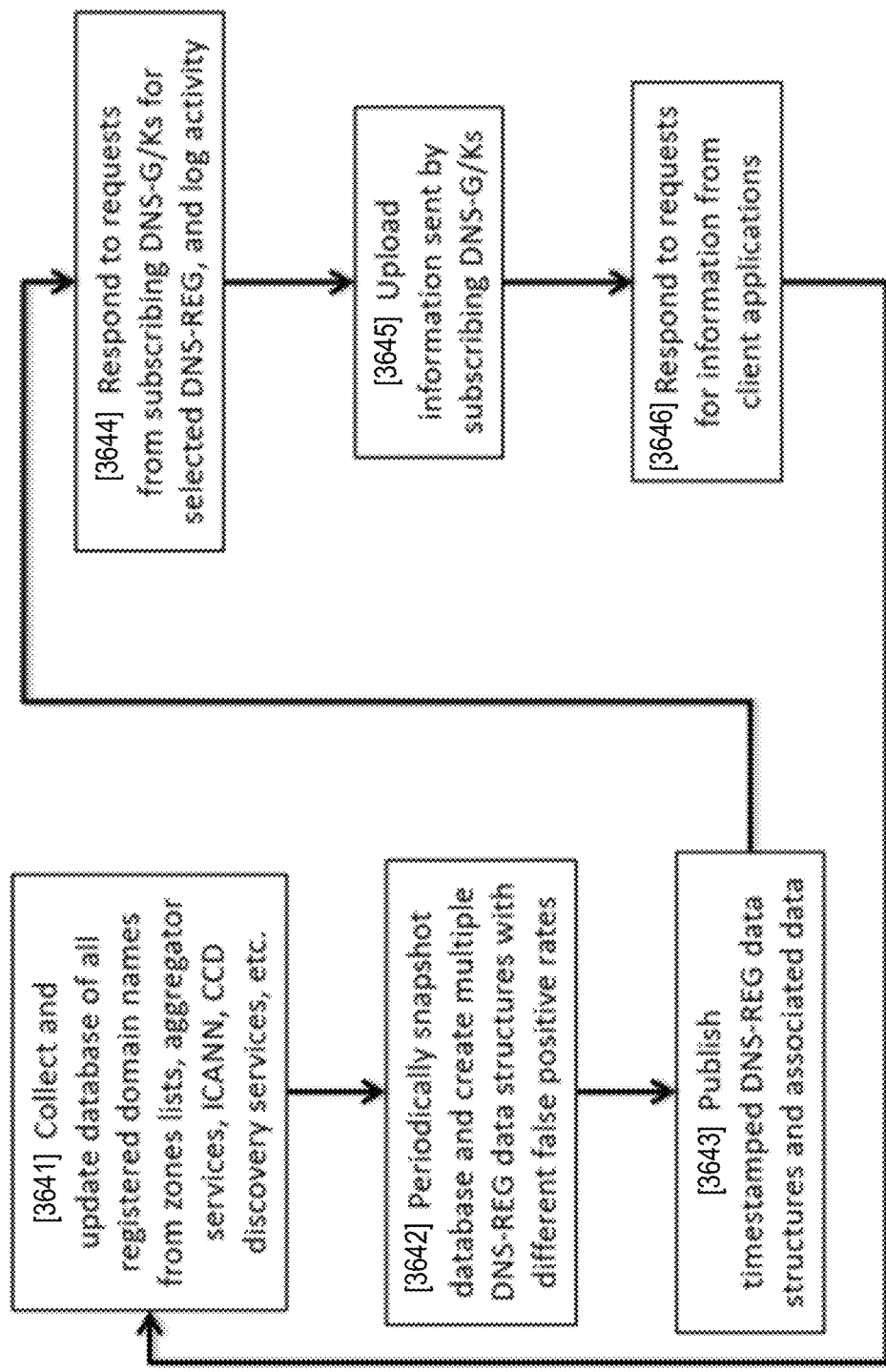
FIG. 22 is a flow chart showing an example method for operating a DNS filter manager.

FIG. 22 is a flowchart showing operational concepts of a DNS Filter Manager (DFM 3160). Note that all of the steps shown in FIG. 22 may be executed in a different order, not just the order shown, and may be executed concurrently and continually. The ordering of steps shown in FIG. 22 is representative and for descriptive purposes only, and not intended to be limiting or restrictive in any way.

In step 3641, the DFM 3160 may collect and may aggregate lists of domain names that are currently registered (e.g., registered and/or recorded) in the DNS. The DFM 3160 may create a database of domain names that is accessible or sharable with other computing devices. Sources of these lists may include zone files, which may be discovered by DNS registry operator organizations and/or associated delegates and/or authoritative name servers, domain list aggregator services, third party services that discover country code domains (CCDs), ICANN, and the like.

In step 3642, the DFM 160 may snapshot the database of currently registered domain names, possibly according to a schedule, which may be periodic. The snapshot may be used as the source data of the DNS-REG 3531 data structures that may be provided to subscribing computing devices, such as DNS-G/Ks 3150 and 3180. Using the data in the snapshot, the DFM 3160 may generate multiple DNS-REG 3531 instances. For example, each local DNS-G/K 3150 may have different limits on available local main memory for storing a DNS-REG instance. As such, the DFM 3160 may offer multiple DNS-REG instances with different memory sizes so that a given DNS-G/K 3150 may select the DNS-REG instance that meets local resource requirements.

In step 3643, the DFM 3160 may publish the newly created DNS-REG$_{PX}$ instances and associated information/metadata, such as timestamp data, and makes the DNS-REG$_{PX}$ instances available to authorized DNS-G/K subscribers. In step 3644, the DFM 3160 may respond to subscriber requests by sending a selected DNS-REG$_{PX}$ and associated information to each requesting subscriber. The DFM 3160 may log each such request and response, and the log data may be used for a global monitoring application for the DNS-G/Ks 3150 and other subscribers. Such a monitoring application may transmit alerts to administrators of subscribing DNS-G/K 3150 instances that have not recently updated their local DNS-REG instances.

In step 3645, the DFM 3160 may upload and store information sent by subscribing DNS-G/Ks 3150. As noted above, this information may include unregistered (e.g., unregistered and/or unrecorded) domain names detected by a subscribing DNS-G/K 3150 and associated metadata (e.g., timestamps, origin host, estimated attack type, etc.), which may be used, for example, as threat intelligence in detecting related packets. The information may also include statistics on DNS requests and responses observed by the DNS-G/K 3150, DNS-G/K 3150 element management information, domain names that DNS-G/K 3150 may have determined to be registered (e.g., registered and/or recorded) in the DNS but for which corresponding keys may not be contained in the local instance of DNS-REG 3531. Such domain names may have been determined in a process described with regards to step 3622 of FIG. 21.

In step 3646, the DFM 3160 may respond to requests for information, including information that may have been collected in step 3645 (described above). Requests for information may be received from various clients systems, such as cyberanalysis applications, threat intelligence provider services, Internet and DNS monitoring systems, domain list aggregator services, and the like. The DFM 3160 may cycle back to step 3641, or the processes described above may be concurrently or continually performed.

Some possible variants of the DFM 3160 concept of operations illustrated in FIG. 22 may reduce resource requirements and reduce lag. For example, in FIG. 22, the most recently generated version of DNS-REG$_{PX}$ containing all registered domain names may be distributed to each subscriber when requested. At scale and at high request frequency, it may be inefficient to continually distribute complete instances of the DNS-REG 3531. In another variant, the DFM 3160 may provide a continual feed of newly registered domain names and newly deregistered domain names. Subscribers to the continual feed may insert the newly registered domain names into their local DNS-REG and delete the recently deregistered domain names from their local DNS-REG. This variant may reduce lag processing issues, as described above.

Some other possible variants of the DFM 3160 concept of operations illustrated in FIG. 22 may reduce DNS-G/K 3150 local resource requirements, including memory requirements and processing requirements. For example, some DNS-G/Ks 3150 may not need a complete DNS-REG 3531 with keys corresponding to all known/available registered (e.g., registered and/or recorded) domain names to provide effective protections against attacks, but instead require only keys corresponding to a relatively small subset of registered (e.g., registered and/or recorded) domain names in their local instances of DNS-REG 3531. Referencing FIG. 18, consider the Network 3116 that may be operated by a first DNS infrastructure provider organization (e.g., DIPO-X). DIPO-X may operate two (2) authoritative name servers NS 3144 and NS 3145 that may be respectively the authoritative name servers for, for example, the domains example- 3144.com and example-3145.com. The DNS may be configured such that all DNS query requests for domain names *.example-3144.com and *.example-3145.com will be routed to authoritative name server NS 3144 and authoritative name server NS 3145 attached to Network 3116. Thus, such requests will pass through, or be filtered by, DNS gatekeeper DNS-G/K 3180 and will be tested for membership in DNS gatekeeper DNS-G/K 180's local instance of DNS-REG 3531.

It is likely the case, however, that most, if not all, DNS query requests that ingress Network 3116 may be requests, both legitimate and bad, bogus, or unregistered (e.g., unregistered and/or unrecorded) domain name DNS requests, for resolving domain names of the form *.example-144.com and *.example-145.com. Therefore, the DNS gatekeeper DNS-G/K 3180's local DNS-REG 3531 does not need to be populated with keys for every registered (e.g., registered and/or recorded) domain name in the DNS, but instead only needs to be populated with keys for registered (e.g., registered and/or recorded) domain names of the form *.example-144.com and *.example-145.com. Compared to a complete DNS-REG 3531, a DNS-REG 3531 containing keys for only these domain names will require less local memory and also less time to perform membership tests. Thus, it may be beneficial if the DFM 3160 allows subscribers to customize the DNS-REGs 3531 that the subscribers use to configure their DNS gatekeepers. The DFM 3160 may maintain and may update the custom DNS-REGs 3531 and provide them upon request to the associated subscribers.

Alternatively, since DIPO-X may be the registrar and administrator for the authoritative name servers example-3144.com and example-3145.com, DIPO-X may create and manage a DNS-REG 3531 containing keys for registered (e.g., registered and/or recorded) domain names of the form *.example-3144.com and *.example-3145.com, and configure DNS-G/K 3180 with this DNS-REG 3531. DIPO-X may also provide this DNS-REG 3531 to DFM 3160 as an alternative to publishing zone files. DFM 3160 may then include this DNS-REG 3531 in the DNS-REGs 1531 that DFM 160 distributes to subscribers. This way, DIPO-X may retain any privacy and protections it desires by not discovering/publishing its zone files, but may participate with the administrators of DFM 160 and the DNS-REG 3531 filters in helping to secure the DNS and the Internet. In practice, for example, this approach may be useful for registrars for country code zones that do not publish their zone files.

Figure 23:
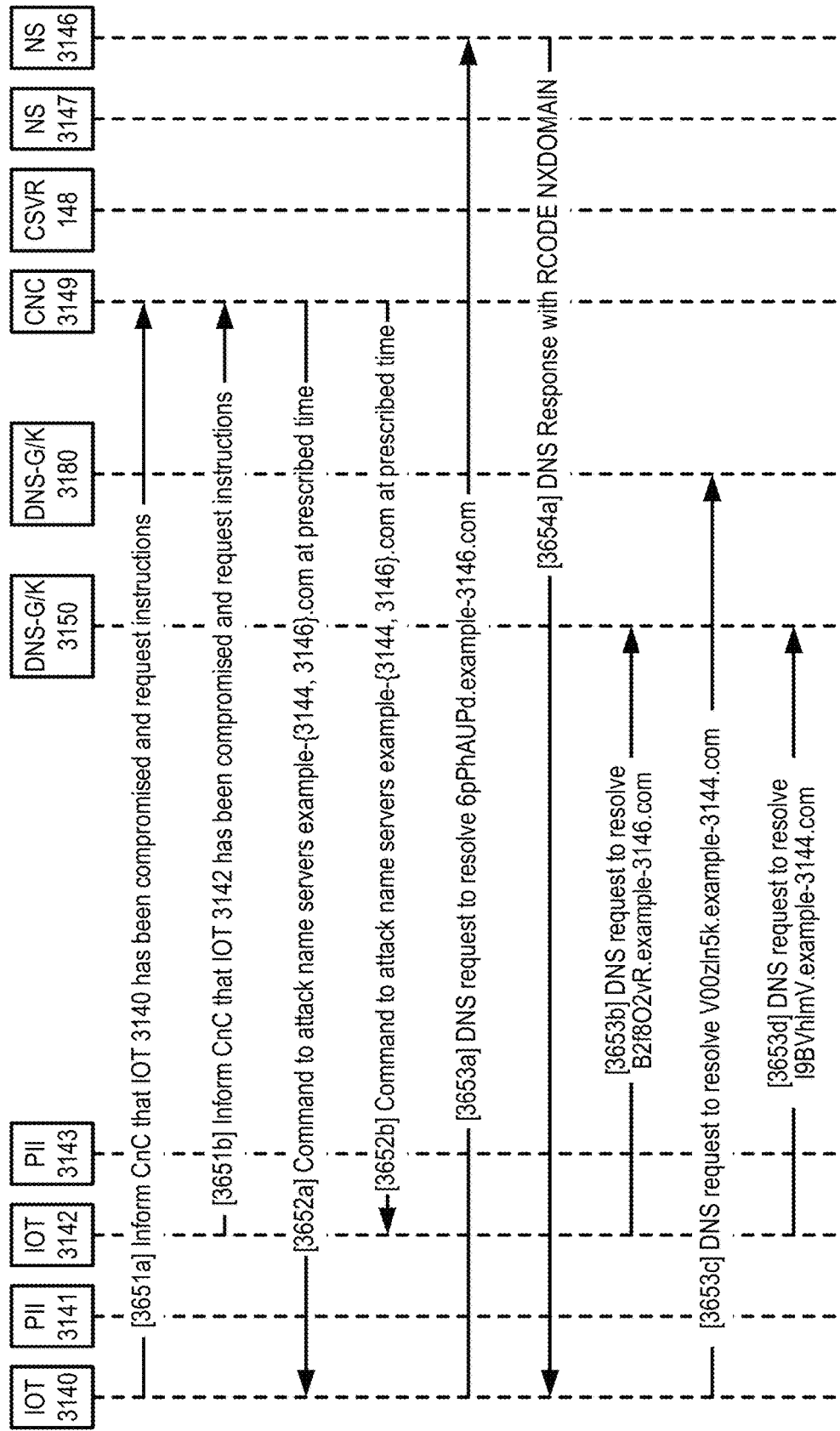
FIG. 23 shows event sequences for an internetwork with DNS gatekeepers that may mitigate or prevent DDoS attacks on the DNS.

FIG. 23 illustrates event sequences for an embodiment of an internetwork with DNS gatekeepers that may mitigate or prevent DDoS attacks on the DNS. In steps 3651a and 3651b, malware that have compromised devices IoT 3140 and IoT 3142 contact a botnet command and control system CNC 3149 to notify the command and control system CNC 3149 of their presence and to request instructions. In steps 3652a and 3652b, the command and control system CNC 3149 may instruct IoT 3140 and IoT 3142 to attack DNS authoritative names servers for example-3144.com and example-3146.com with bad, bogus, or unregistered (e.g., unregistered and/or unrecorded) domain name DNS requests at a prescribed time T.

In step 3653a, at the prescribed time T, IoT 3140 generates a bogus DNS request to resolve the domain name 6pPhAUPd.example-3146.com. IoT 3140 uses a random string generator to create the string "6pPhAUPd", which it then uses as the subdomain label to construct a domain name that the DNS will route to the authoritative name server NS 3146 for example-3146.com for resolution. This domain name generation method assumes that resultant domain names are highly unlikely to have been registered (e.g., registered and/or recorded) in the DNS. IoT 3140 forwards the bogus DNS request towards the authoritative name server NS 3146 for example-3146.com.

In step 3654a, authoritative name server NS 3146 receives the DNS request to resolve 6pPhAUPd.example-3146.com. Since 6pPhAUPd.example-3146.com was never registered (e.g., registered and/or recorded) in the DNS, NS 3146 wastes resources searching for, but not finding, a corresponding DNS entry in its DNS database. NS 3146 generates a corresponding DNS response to the request with RCODE=3 ("NXDOMAIN", which signals that the domain name does not exist in the DNS), and forwards the DNS response towards the requestor IoT 3140. Any caching DNS proxies in the network path between authoritative name server (e.g., NS 3146) and a device (e.g., the IoT 3140) may insert a cache entry for the pair {6pPhAUPd.example-3146.com, NXDOMAIN}.

Thus, the bogus DNS request generated by IoT 3140 in step 3653a has wasted network bandwidth resources, DNS name server resources, and DNS cache resources. These resources may no longer be available to service legitimate DNS requests.

In step 3653b, at the prescribed time T, and similar to step 3653a, IoT 3142 generates a bogus DNS request to resolve the domain name B2f8O2vR.example-3146.com. The IoT 3142 may forward the bogus DNS request towards the authoritative name server NS 3146 for example-3146.com. As the bogus DNS request egresses the network 3114, it may be received by the DNS gatekeeper DNS-G/K 3150. DNS-G/K 3150 may test if B2f8O2vR.example-146.com is a member of its local instance of DNS-REG. The membership test may return FALSE, such that it is determined that B2f8O2vR.example-3146.com is not a member of DNS-REG and therefore is not registered (e.g., not registered and/or not recorded) in the DNS. DNS-G/K 3150 may check its rate of invalid or bogus DNS requests, rate of change in the rate of invalid or bogus DNS requests, and other parameters, and decides that the request may be part of a DDoS attack. Accordingly, the DNS-G/K 3150 may drop the packet containing the DNS request, but does not generate a corresponding DNS response to send back to the originator of the DNS request (as this would consume resources and thus help carry out the DDoS attack). DNS-G/K 3150 may log, capture, and locally store the bogus DNS request, for possible future retrieval by, for example, a threat intelligence provider service, and/or a cyberanalysis service, etc. DNS-G/K 3150 has thus prevented the bogus DNS request from attacking the DNS and wasting resources, which may instead be applied to servicing legitimate DNS requests.

In step 3653c, at the prescribed time T, and similar to step 3653a, IoT 3140 generates a bogus DNS request to resolve the domain name V00zln5k.example-3144.com. The IoT 3140 may forward the bogus DNS request towards the name server NS 3144 for example-3144.com attached to Network 3116. Before ingressing Network 3116, the request may be received by DNS gatekeeper DNS-G/K 3180 (which DIPO-X has installed at the boundary of Network 3116 to protect its DNS infrastructure). The DNS gatekeeper DNS-G/K 3180 may test if V00zln5k.example-3144.com is a member of its local instance of DNS-REG. The membership test returns FALSE, as it may be determined that V00zln5k.example-3144.com is not a member of DNS-REG and therefore is not registered (e.g., not registered and/or not recorded) in the DNS. The DNS gatekeeper DNS-G/K 3180 may decide that the bogus DNS request may be part of a DDoS attack. Accordingly, the DNS gatekeeper DNS-G/K 3180 may drop the packet containing the DNS request, but need not generate a corresponding DNS response to send back to the originator of the DNS request. The DNS gatekeeper DNS-G/K 3180 has thus prevented the bogus DNS request from attacking the DNS and wasting resources, which may instead be applied to servicing legitimate DNS requests.

In step 3653d, at the prescribed time T, and similar to step 3653b, IoT 3142 generates a bogus DNS request to resolve the domain name I9BVhImV.example-3144.com. IoT 3142 forwards the bogus DNS request towards the name server NS 3144 for example-3144.com. As the bogus DNS request egresses the network 3114, it is received by the DNS gatekeeper DNS-G/K 3150. DNS-G/K 3150 tests if I9BVhImV.example-3144.com is a member of its local instance of DNS-REG. The membership test returns FALSE, as it is determined that I9BVhImV.example-3144.com is not a member of DNS-REG and therefore is not registered (e.g., not registered and/or not recorded) in the DNS. DNS-G/K 3150 checks a rate of invalid or bogus DNS requests and/or a rate of change in the rate of invalid or bogus DNS requests, and decides that the request may be part of a DDoS attack. Accordingly, DNS-G/K 3150 drops the packet containing the DNS request, but does not generate a corresponding DNS response to send back to the originator of the DNS request. DNS-G/K 3150 has thus prevented the bogus DNS request from attacking the DNS and wasting resources, which may instead be applied to servicing legitimate DNS requests.

Figure 24:
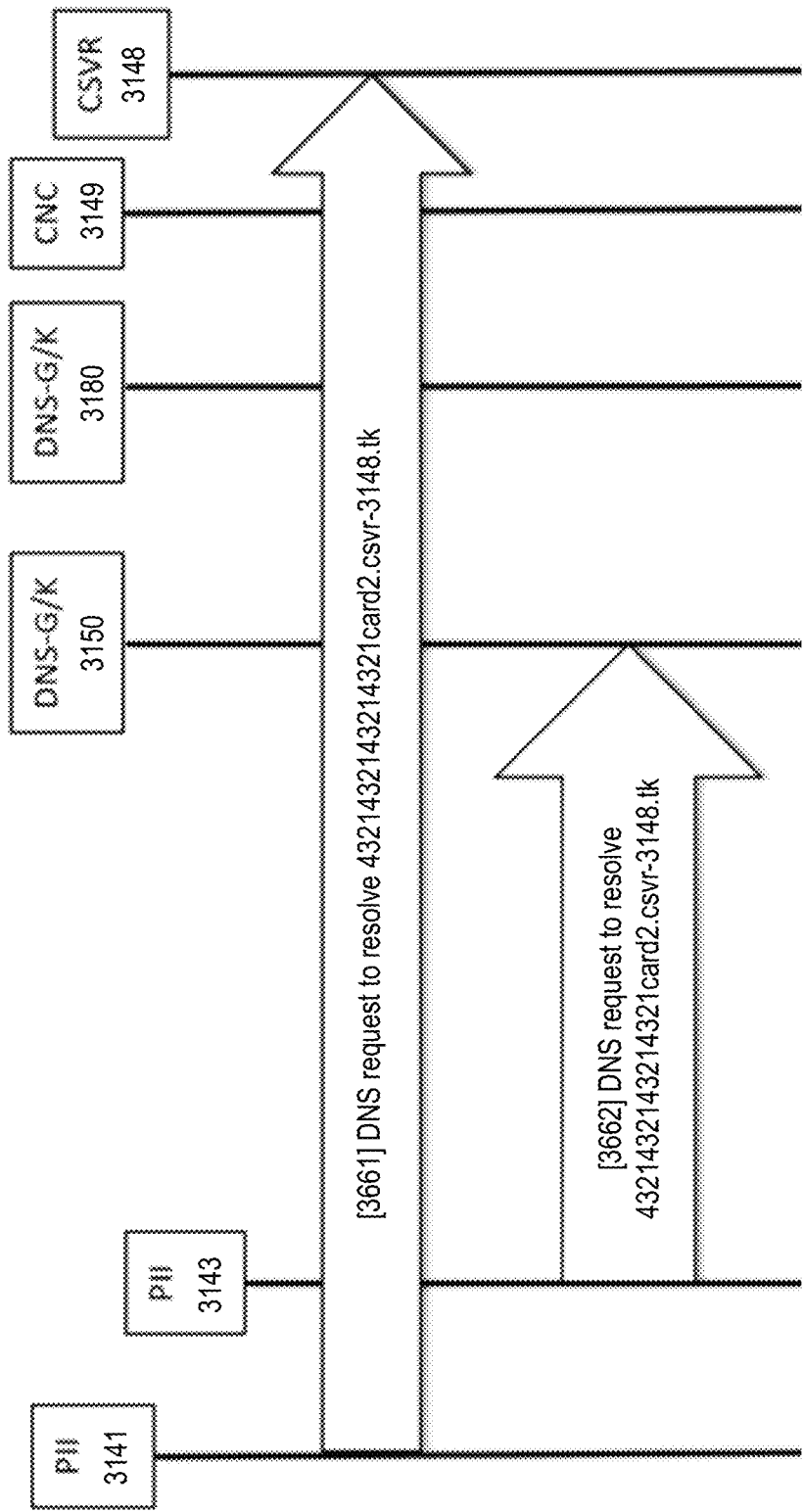
FIG. 24 shows event sequences for an internetwork with DNS gatekeepers that may mitigate or prevent DNS tunneling attacks.

FIG. 24 illustrates event sequences for an embodiment of an internetwork with DNS gatekeepers that may mitigate or prevent DNS tunneling attacks. Recall from above and from FIG. 18 that hosts PII 3141 attached to Network 3112 and PII 3143 attached to Network 3114 may be servers that manage sensitive information, such as personally identifiable information (PII), credit card information, and the like. Hosts PII 3141 and PII 3143 have also been infected by malware that collects credit card information and then uses a DNS tunneling method to exfiltrate the information to collection server CSVR 3148 attached to network 3170 (described below). CSVR 3148 has been assigned a public IP address 21.43.65.87. The collection server CSVR 3148 may be configured with a DNS server that may ingest DNS requests on port 53, the well-known port for DNS. The malware on PII 3141 and PII 3143 have been configured to send DNS requests to IP address 21.43.65.87 (the IP address of collection server CSVR 3148).

In step 3661, PII 3141 attached to Network 3112 reads a credit card number "1234123412341234" and associated credit card issuer name "card" from a local database, constructs a (bogus) DNS request to resolve, for example, 1234123412341234card.csvr-3148.tk, encapsulates the request in a UDP datagram packet with destination port 53, encapsulates the datagram in an IP packet with destination IP address 21.43.65.87, and forwards the packet towards 21.43.65.87 (CSVR 3148). The packet is routed through the internetwork to collection server CSVR 3148 port 53, where the DNS server listening on port 53 receives the bogus DNS request to resolve 1234123412341234card.csvr-3148.tk. The DNS server extracts the (stolen) credit card information "1234123412341234" from the DNS request, and stores the DNS request in a local database, thereby successfully completing the exfiltration. The DNS server does not generate a corresponding DNS response to the bogus DNS request, in order to, for example, avoid detection.

In step 3662, PII 143 attached to Network 3114 may read a credit card number "4321432143214321" and associated credit card issuer name "card2" from a local database, constructs a bogus DNS request to resolve, for example, 4321432143214321card2.csvr-3148.tk. The PII 3143 may encapsulate the request in a UDP datagram packet with destination port 53, may encapsulate the datagram in an IP packet with destination IP address 21.43.65.87, and may forward the packet towards the IP address of collection server CSVR 3148 (21.43.65.87). As the packet egresses the network 3114, it may be received by the DNS gatekeeper DNS-G/K 3150. The DNS-G/K 3150 may test if the request 4321432143214321card2.csvr-3148.tk is a member of its local instance of the DNS-REG. The membership test may return FALSE, as it is determined that 4321432143214321card2.csvr-3148.tk is not a member of the DNS-REG and therefore is not registered (e.g., not registered and/or not recorded) in the DNS. The DNS-G/K 3150 may check the local gatekeeper stored rate of bad, bogus, or unregistered (e.g., unregistered and/or unrecorded) domain name DNS requests and legitimate DNS requests and/or the rate of change in the rate of bad, bogus, or unregistered (e.g., unregistered and/or unrecorded) domain name DNS requests and legitimate DNS requests, and other parameters, and may decide that the request is not part of a DDoS attack but may be part of a DNS tunneling attack. Accordingly, the DNS-G/K 3150 may drop the packet containing the DNS request, but may not generate a corresponding DNS response to send back to the originator of the DNS request. DNS-G/K 3150 may thus prevent a bogus DNS request from exfiltrating stolen credit card numbers to malicious actors. The DNS-G/K 3150 may log, capture, and locally store the bogus DNS request. This information may be provided to, for example, a threat intelligence provider service, and/or a cyberanalysis service, etc. These services may identify a malicious collection server CSVR 3148 (IP address 21.43.65.87) and Network 3170 as being associated with malicious actors, and host PII 3143 as being compromised by exfiltrating malware. This information may be used to further protect the network by, for example, the enterprise disinfecting host PII 3143, and/or by a threat intelligence provider distributing collection server CSVR 3148's IP address 21.43.65.87 and associated threat metadata (e.g., attack type is "DNS tunneling") as a threat indicator to subscribers, as well as distributing the IP address space block of (malicious) Network 3170, for example, 21.43.65.0/24.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

At least in the context of CTI-derived cybersecurity policy enforcement by a TIG, or other packet-filtering appliance, in at least some examples, and without in any way limiting the scope of the disclosure, at least the following novel aspects are disclosed:

Set data structures, index data structures, and associated algorithms may be optimized to exploit the structure of cyber threat intelligence (CTI) indicators to reduce space/ memory requirements for storing the indicators of CTI-derived policies in the data structures, to reduce the expected time to search for the indicators in the data structures, and/or to reduce the space/memory requirements and expected time requirements for enforcing CTI-derived cybersecurity policies on in-transit packets.

Data structures and associated algorithms may be selected to minimize space/memory requirements and/or to reduce the space and/or memory requirements below an upper limit, or budget, for storing indicators of a CTI-derived cybersecurity policy that is enforced on in-transit packets.

Data structures and associated algorithms may be selected to minimize expected search times and/or to reduce the expected search times below an upper limit for searching for the indicators of a CTI-derived cybersecurity policy that is enforced on in-transit packets.

Data structures and associated algorithms may be selected to simultaneously reduce space/memory requirements below an upper limit for storing indicators of a CTI-derived cybersecurity policy and reduce the expected search times below an upper limit for searching for the indicators of a CTI-derived cybersecurity policy that is enforced on in-transit packets.

Data structures and associated algorithms may be selected such that different data structures may be used for different types of indicators in order to optimize performance of TIG policy enforcement on in-transit packets.

Domain name indicators may be processed by a data structure on a per subdomain label basis, beginning with a top-level subdomain label and proceeding sequentially to the next-level subdomain label. Processing an indicator by a data structure may comprise inserting an indicator into a data structure or searching for an indicator in a data structure.

A domain name indicator comprising N subdomain labels may be inserted into a data structure, via a single insertion, on a per subdomain label basis, beginning with the top-level subdomain label and proceeding sequentially to the next-level subdomain label; subsequently, during a search for a domain name indicator with N or more subdomain labels that may be in the data structure, the search may match the inserted domain name indicator if each of the first N subdomain labels of the searched domain name indicator, beginning with the top-level subdomain label and proceeding sequentially to the next-level subdomain label, match the N subdomain labels of the inserted domain name indicator.

URL indicators may be processed by a data structure by: processing the host portion of the URL, which may be a domain name, as a domain name indicator by processing the hostname on a per subdomain label basis, where the subdomain labels are separated by the dot "." character, beginning with the top-level subdomain label and proceeding sequentially to the next-level subdomain label; and by processing the path portion of the URL on a per path segment basis, where the path segments are delineated by the slash "/" character, beginning with the top-level path segment and proceeding sequentially to the next-level path segment.

A host portion of a URL may also be an IP address, either an IPv4 or an IPv6 address. An IPv4 address may be represented in dotted decimal notation, which may be a sequence of four (4) integers in the range [0,255], with each integer separated by the dot "." character. Accordingly, when a host portion of a URL is an IPv4 address, the IPv4 address may be processed similarly as a domain name, with the four (4) integers corresponding to four subdomain labels, separated by dot "." characters. An IPv6 address may be represented as eight (8) groups of four (4) hexadecimal digits, where each group is separated by the colon ":" character. Accordingly, when the host portion of a URL is an IPv6 address, the IPv6 address may be processed similarly as a domain name, with the eight (8) groups corresponding to eight subdomain labels, separated by colon ":" characters instead of "." characters.

A URL indicator comprising a hostname or corresponding IP address and N path segments may be inserted into a data structure, in a single insertion, on a per path segment basis, beginning with the top-level path segment and proceeding sequentially to the next-level path segment; subsequently, during a search for a URL indicator with N or more path segments in the data structure, the search may match the inserted URL indicator if the hostnames or corresponding IP addresses match and if each of the first N path segments of the searched URL indicator, beginning with the top-level path segment and proceeding sequentially to the next-level path segment, match the N path segments of the inserted URL indicator.

Data structures and associated algorithms may be selected to satisfy requirements for a TIG enforcing CTI-derived cybersecurity policies on in-transit packets, where the requirements may be associated with any combination of:
  expected search times for indicators contained in the set data structures and for keys/indicators and associated values/rule IDs contained in the index data structures;
  space/memory sizes for the set data structures containing elements/indicators and for the index data structures containing keys/indicators and values/rule IDs;
  expected time to insert a single element/indicator in a set data structure and to insert a single key/indicator and associated value/rule ID in an index data structure;
  expected time to insert all of the elements/indicators of a single type of a CTI-derived policy in a set data structure and to insert all of the keys/indicators and associated values/rule IDs of a CTI-derived policy in an index data structure;
  support for deletion of elements/indicators from the set data structures and for deletion of keys/indicators and associated values/rule IDs from the index data structures;
  support for the {insertion, deletion} of elements/indicators {into, from} the set data structures and for the {insertion, deletion} of keys/indicators and associated values/rule IDs {into, from} the index data structures while a TIG is enforcing the associated cybersecurity policy on in-transit packets;
  support for storing the elements/indicators in the set data structures and the keys/indicators in the index data structures after applying one or more irreversible functions to the elements and keys.

A search for rules of a policy that match an in-transit packet may comprise a search of one or more index data structures populated with indicators and associated rule identifiers of the policy for one or more indicators corresponding to values contained in the packet and associated rule identifiers mapped to by the indicators, where each rule identifier may be mapped to the rank order of the associated rule in the ordered list of rules of the policy.

A search for rules of a policy that match an in-transit packet may comprise a search, or set membership test, of one or more set data structures populated with indicators of the policy for one or more indicators corresponding to values contained in the packet; if the membership test is positive, or true, then the set membership test is followed by a search for rules of the policy that match the in-transit packet, else if the membership test may be negative, or false, then the search for rules of the policy that match the in-transit packet is skipped/not performed.

A search for rules of a policy that match an in-transit packet may comprise a concurrent membership test and a search for rules, and if the membership test is negative, or false, then the search for rules or rule identifiers is halted or abandoned.

Set data structures may be configured such that the expected time to execute a membership test for an indicator is less than the expected time to execute a policy search for a rule that comprises the indicator.

Multiple different instances of data structures may be configured with indicators of the policy such that a search for a single value contained in an in-transit packet that corresponds to an indicator is executed as a search through multiple different instances of the data structures.

Main memory requirements for enforcing a given CTI-derived policy when using the disclosed data structures and algorithms may be estimated before populating the data structures with the threat indicators of the policy by: (1) assigning threat indicator types to certain data structures; (2) for each threat indicator type, determining the number of threat indicators of a particular type that are comprised by the policy; (3) for each threat indicator type and its associated one or more data structures for storing the indicators of the type, determining a value corresponding to the number of memory bytes required by multiplying the number of threat indicators of the indicator type by a constant C that corresponds to the expected number of bytes required to store one indicator of the indicator type in the associated one or more data structures; and (4) determining an estimate of the main memory requirements by summing each of the values determined in step (3).

A stride length k for a ruletree data structure may be varied in order to achieve improvements in time complexity and performance and/or improvements in space/memory complexity and consumption. Also or alternatively, a single instance of a ruletree data structure may comprise subtrees with different values of the stride length k, in order to similarly achieve improvements (in time complexity and performance and/or in space/memory complexity and consumption).

A set of one or more rule identifiers associated with a key may be replaced by a single rule identifier in the set that corresponds to the highest-ranked rule.

A key for insertion into an index data structure may be comprised of both a fingerprint and a compression. Accordingly, elements being searched for in an index data structure also may be comprised of both a fingerprint and a compression.

Size(s) of the one or more fingerprint(s) for representing an indicator may be chosen to satisfy requirements for collision rates or for space/memory usage or for both.

A key representing an indicator may comprise a fingerprint or a compression or both.

For the avoidance of doubt, and without limiting the breadth of disclosure above or in the drawings, the present application further includes the subject matter described in the following numbered clauses:

1. A method comprising receiving, by a packet-filtering appliance, a plurality of packets transmitted from one or more hosts in a first network to one or more hosts in a second network.
2. The method of clause 1, wherein the packet-filtering appliance is located at a boundary between the first network and the second network.
3. The method of clause 1 or clause 2, wherein the packet-filtering appliance stores a flat hash map index data structure associated with a plurality of rules of a cybersecurity policy enforced by the packet-filtering appliance.
4. The method of any of clauses 1-3, wherein each rule, of the plurality of rules, comprises matching criteria that indicate one or more threat indicators associated with packets to which the rule applies.
5. The method of any of clauses 1-4, wherein the flat hash map index data structure comprises a plurality of keys mapped to a plurality of rule identifiers and wherein each of the rule identifiers corresponds to a rule of the plurality of rules.
6. The method of any of clauses 1-5, wherein each of the keys comprises a value incrementally generated based on portions of a threat indicator from matching criteria of a rule corresponding to a rule identifier to which the key is mapped.
7. The method of any of clauses 1-6, further comprising extracting values from fields of the received plurality of packets and searching the flat hash map index data structure for rule identifiers of rules applicable, based on the extracted values, to the received plurality of packets.
8. The method of clause 7, wherein the searching comprises, for each packet of the received plurality of packets, and for each of multiple parts of the extracted value, generating a value, based on the part, for a portion of the extracted value that comprises the part.
9. The method of clause 8, wherein each of the extracted values comprises a domain name, and wherein, for each packet of the received plurality of packets, the multiple parts comprise multiple labels of the domain name extracted from the packet.
10. The method of clause 8 or clause 9, wherein the searching comprises, for each of the received plurality of packets, comparing each the generated values associated with that packet to keys of the flat hash map index data structure.
11. The method of clause 10, wherein the searching comprises, for each of the received plurality of packets, determining, based on the comparing of the generated values associated with that packet to keys of the flat hash map index data structure, whether one or more rules of the plurality of rules is applicable to the packet.
12. The method of any of clauses 1-11, further comprising, for one or more packets of the plurality of packets, applying one or more rules, of the plurality of rules, determined to be applicable to the one or more packets.
13. The method of clause 12, wherein the applying comprises one or more of: blocking or dropping a packet, forwarding a packet, logging a packet, capturing a packet, re-directing or re-routing a packet, modifying or transforming a packet, or generating or sending a response to the packet.
14. The method of any of clauses 9-13, wherein, for each packet of at least a portion the plurality of packets, the generating a value comprises generating a hash of a first label indicating a top level domain of the domain name extracted from the packet and, for each additional label of one or more additional labels indicating one or more subdomains of the domain name extracted from the packet, generating, based on the additional label, a hash for a portion of the domain name comprising the additional label and the top level domain.

15. The method of any of clauses 9-13, wherein, for each packet of at least a portion the plurality of packets, the generating a value comprises generating a lossless compression of a first label indicating a top level domain of the domain name extracted from the packet and, for each additional label of one or more additional labels indicating one or more subdomains of the domain name extracted from the packet, generating, based on the additional label, a lossless compression for a portion of the domain name comprising the additional label and the top level domain.

16. The method of clause 15, wherein, for each packet of at least a portion the plurality of packets, the generating a value comprises generating, based on a path segment of a path portion of the extracted value, a hash for a portion of the extracted value comprising the path segment and the domain name extracted from the packet.

17. The method of any of clauses 7-16, wherein the value extracted from a first packet of the one or more packets comprises a Uniform Resource Locator (URL) comprising a domain name as a host portion and comprising a path portion having one or more path segments, and wherein the generating a value comprises, for each path segment of the one or more path segments, generating a hash, based on the path segment, for a portion of the URL that comprises the path segment and the domain name of the URL.

18. The method of any of clauses 3-17, wherein the flat hash map index data structure comprises keys that comprise values incrementally generated based on threat indicators having only domain names.

19. The method of any of clauses 3-18, wherein the flat hash map index data structure comprises keys that comprise values incrementally generated based on threat indicators having Uniform Resource Locators (URLs) having domain name portions and path portions.

20. The method of any of clauses 3-19, wherein the packet-filtering appliance stores a second flat hash map index data structure associated with a second plurality of rules of the cybersecurity policy, wherein the plurality of keys, of the flat hash map index data structure, are associated with threat indicators comprising domain names having a first characteristic, and wherein the second flat hash map index data structure comprises a second plurality of keys, mapped to a second plurality of rule identifiers, that comprise values incrementally generated based on portions of threat indicators from matching criteria comprising domain names having a second characteristic different from the first characteristic.

21. The method of any of clauses 1-20, wherein the packet-filtering appliance stores a second index data structure associated with a second plurality of rules of the cybersecurity policy, wherein the second index data structure comprises a plurality of internal nodes.

22. The method of clause 21, wherein each of the internal nodes comprises a first bit array that comprises elements mapped to possible values of a k-bit chunk of a search object, each of the first bit array elements storing a value that indicates, for the possible value mapped to the first bit array element, one of: a presence of a corresponding descendant internal node, of the plurality of internal nodes, or an absence of a corresponding descendant internal node.

23. The method of clause 21 or clause 22, wherein each of the internal nodes comprises a second bit array that comprises elements mapped to possible values of a k-bit chunk of the search object and to possible values of portions of the k-bit chunk of the search object, each of the second bit array elements storing a value that indicates, for the possible value mapped to the second bit array element, one of: the presence of one or more corresponding rule identifiers or an absence of corresponding rule identifiers.

24. The method of clause 23, wherein a total quantity of possible values of the k-bit chunk and portions of the k-bit chunk is $2^{k+1}-2$ possible values.

25. The method of any of clauses 22-24, wherein the internal node comprises one or more pointers that indicate a memory location associated with one or more rule identifiers that correspond to the k-bit chunk.

26. The method of any of clauses 21-25, wherein the second index data structure maps keys, comprising at least portions of Internet Protocol (IP) addresses, to rule identifiers of the second plurality of rules, and further comprising searching, based on an IP address extracted from a field of a first packet received by the packet-filtering appliance, the second index data structure for rule identifiers of rules, of the second plurality of rules, applicable to the first packet.

27. The method of clause 26, further comprising storing, based on the searching and in an order sorted by associated rule priorities, a first rule identifier associated with a first internal node, of the plurality of internal nodes, and a second rule identifier associated with a second internal node, of the plurality of internal nodes, that is a descendant node of the first internal node.

28. The method of clause 26 or clause 27, further comprising storing, based on the searching and in an order sorted by associated rule priorities, a third rule identifier associated with an internal node, of the plurality of internal nodes, and a fourth rule identifier associated with the internal node.

29. A method comprising grouping rules, of a cybersecurity policy, into a plurality of rule groups, wherein each of the rules comprises matching criteria comprising a threat indicator.

30. The method of clause 29, wherein the grouping is based on one or more of: types of threat indicators or common characteristics of threat indicators.

31. The method of clause 29 or clause 30, further comprising selecting, for each of the groups, a type of data structure.

32. The method of any of clauses 29-31, further comprising determining, for at least one of the groups, a k parameter for a ruletree index data structure.

33. The method of any of clause 29-32, further comprising selecting, for at least one of the groups, a set data structure for use in connection with searching of an index data structure selected for the at least one of the groups.

34. The method of any of clauses 29-33, further comprising estimating memory requirements associated with the groups.

35. The method of clause 34, wherein the estimating memory requirements is based on index data structures selected for the groups.

36. The method of clause 34 or clause 35, wherein the estimating memory requirements is based on one or more set data structures selected for one or more of the groups.

37. The method of any of clauses 34-36, further comprising revising, based on the estimated memory requirements, one or more of: the groups, selected index data structures, or selected set data structures.

38. A method comprising receiving, by a device, a packet comprising one or more values, and determining, by testing membership of a data structure, whether the one or more values correspond to threat indicators of matching criteria of any of a plurality of rules of a cybersecurity policy.

39. The method of clause 38, wherein the data structure comprises a flat hash map.

40. The method of clause 39, wherein the flat hash map comprises keys based on one or more of: incremental hashing of the threat indicators of the matching criteria of the plurality of rules, or incremental compression of the threat indicators of the matching criteria of the plurality of rules.

41. The method of clause 39 or clause 40, wherein the testing membership comprises incrementally generating values based on portions of a value extracted from the packet and comparing the incrementally generated values to keys of the flat hash map 42. The method of clause 38, wherein the data structure comprises a tree data structure comprising a plurality of internal nodes, each of the internal nodes comprising: (i) a first bit array that comprises elements mapped to possible values of a k-bit chunk of a value extracted from the packet, each of the first bit array elements storing a value that indicates, for the possible value mapped to the first bit array element, one of: a presence of a corresponding descendant internal node, of the plurality of internal nodes, or an absence of a corresponding descendant internal node, and (ii) a second bit array that comprises elements mapped to possible values of the k-bit chunk and to possible values of portions of the k-bit chunk, each of the second bit array elements storing a value that indicates, for the possible value mapped to the second bit array element, one of: a match to threat criteria of a rule of the plurality of rules, or an absence of a match to a rule of the plurality of rules.

43. The method of clause 42, wherein the testing membership comprises proceeding through levels of internal nodes using successive k-bit chunks of the value extracted from the packet.

44. The method of any of clauses 38-43, wherein the data structure does not store identifiers of the plurality of rules.

45. The method of any of clauses 38-44, wherein the testing membership outputs an indication that the packet corresponds to one or more rules, of the plurality of rules, but does not identify any rules, of the plurality of rules, to which the packet corresponds.

46. The method of any of clauses 38-45, further comprising sending, based on the testing membership indicating that the packet corresponds to one or more rules of the plurality of rules, the packet to another device for determination of the one or more rules and for application of the one or more rules to the packet.

47. The method of any of clauses 38-46, wherein the device comprises a mobile device, a DNS gateway, or another computing device.

48. A packet-filtering appliance configured to perform the method of any of clauses 1-28.

49. A packet-filtering appliance, security policy management server, or other computing device configured to perform the method of any of clauses 29-37

50. A mobile device, a DNS gateway, or another computing device configured to perform the method of any of clauses 38-47.

51. One or more non-transitory computer-readable media comprising stored instructions that, when executed by one or more processors of a device, configure the device to perform the method of any of clauses 1-47.

Although the present disclosure has been described in terms of various examples, many additional modifications and variations would be apparent to those skilled in the art in view of the present disclosure. Any of the various methods described herein may be performed in alternative sequences and/or concurrently with (and/or on different and/or multiple computing devices). It is to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Any and all combinations, subcombinations, and permutations are within the scope of this disclosure. Thus, the present disclosure should be considered in all respects as illustrative and not restrictive.

The invention claimed is:

1. A method comprising:
receiving, by a packet-filtering appliance, a plurality of packets transmitted from one or more hosts in a first network to one or more hosts in a second network, wherein:
the packet-filtering appliance is located at a boundary between the first network and the second network and stores a flat hash map index data structure associated with a plurality of rules of a cybersecurity policy enforced by the packet-filtering appliance,
each rule, of the plurality of rules, comprises matching criteria that indicate one or more threat indicators associated with packets to which the rule applies, and
the flat hash map index data structure comprises a plurality of keys mapped to a plurality of rule identifiers, each of the rule identifiers corresponds to a rule of the plurality of rules, and each of the keys comprises a value incrementally generated based on portions of a threat indicator from matching criteria of a rule corresponding to a rule identifier to which the key is mapped;
extracting values from fields of the received plurality of packets and searching the flat hash map index data structure for rule identifiers of rules applicable, based on the extracted values, to the received plurality of packets, wherein each of the extracted values comprises a domain name, and wherein the searching comprises, for each packet of the received plurality of packets:
for each label of a plurality of labels of the domain name extracted from the packet, generating a value, based on the label, for a portion of the extracted value that comprises the label,
comparing each of the generated values to keys of the flat hash map index data structure, and determining, based on the comparing of the generated values to the keys of the flat hash map index data structure, whether one or more rules of the plurality of rules is applicable to the packet; and for one or more packets of the plurality of packets, applying one or more rules, of the plurality of rules, determined to be applicable to the one or more packets, wherein the applying comprises one or more of: blocking or dropping a packet, forwarding a packet, logging a packet, capturing a packet, re-directing or re-routing a packet, modifying or transforming a packet, or generating or sending a response to a packet.

2. The method of claim 1, wherein, for each packet of the plurality of packets, the generating a value comprises:

generating a hash of a first label indicating a top level domain of the domain name extracted from the packet, and for each additional label of one or more additional labels indicating one or more subdomains of the domain name extracted from the packet, generating, based on the additional label, a hash for a portion of the domain name comprising the additional label and the top level domain.

3. The method of claim 1, wherein, for each packet of the plurality of packets, the generating a value comprises:

generating a lossless compression of a first label indicating a top level domain of the domain name extracted from the packet, and for each additional label of one or more additional labels indicating one or more subdomains of the domain name extracted from the packet, generating, based on the additional label, a lossless compression for a portion of the domain name comprising the additional label and the top level domain.

4. The method of claim 1, wherein the value extracted from a first packet of the one or more packets comprises a Uniform Resource Locator (URL) comprising a domain name as a host portion and comprising a path portion having one or more path segments, and wherein the generating a value comprises, for the first packet:

for each path segment of the one or more path segments, generating a hash, based on the path segment, for a portion of the URL that comprises the path segment and the domain name of the URL.

5. The method of claim 1, wherein the flat hash map index data structure comprises:

keys that comprise values incrementally generated based on threat indicators having only domain names, and keys that comprise values incrementally generated based on threat indicators having Uniform Resource Locators (URLs) having domain name portions and path portions.

6. The method of claim 1, wherein the packet-filtering appliance stores a second flat hash map index data structure associated with a second plurality of rules of the cybersecurity policy, and wherein:

the plurality of keys, of the flat hash map index data structure, are associated with threat indicators comprising domain names having a first characteristic, and the second flat hash map index data structure comprises a second plurality of keys, mapped to a second plurality of rule identifiers, that comprise values incrementally generated based on portions of threat indicators from matching criteria comprising domain names having a second characteristic different from the first characteristic.

7. The method of claim 1, wherein the packet-filtering appliance stores a second index data structure associated with a second plurality of rules of the cybersecurity policy, wherein the second index data structure comprises a plurality of internal nodes, and wherein, for each internal node of the plurality of internal nodes:

the internal node comprises a first bit array, a second bit array, and one or more pointers, the first bit array comprises elements mapped to possible values of a k-bit chunk of a search object, each of the first bit array elements storing a value that indicates, for the possible value mapped to the first bit array element, one of: a presence of a corresponding descendant internal node, of the plurality of internal nodes, or an absence of a corresponding descendant internal node, the second bit array comprises elements mapped to possible values of the k-bit chunk and to possible values of portions of the k-bit chunk, each of the second bit array elements storing a value that indicates, for the possible value mapped to the second bit array element, one of: the presence of one or more corresponding rule identifiers or an absence of corresponding rule identifiers, and the one or more pointers indicate a memory location associated with one or more rule identifiers that correspond to the k-bit chunk.

8. The method of claim 7, wherein the second index data structure maps keys, comprising at least portions of Internet Protocol (IP) addresses, to rule identifiers of the second plurality of rules, the method further comprising:

searching, based on an IP address extracted from a field of a first packet received by the packet-filtering appliance, the second index data structure for rule identifiers of rules, of the second plurality of rules, applicable to the first packet; and storing, based on the searching and in an order sorted by associated rule priorities, a first rule identifier associated with a first internal node, of the plurality of internal nodes, and a second rule identifier associated with a second internal node, of the plurality of internal nodes, that is a descendant node of the first internal node.

9. The method of claim 7, wherein the second index data structure maps keys, comprising at least portions Internet Protocol (IP) addresses, to rule identifiers of the second plurality of rules, the method further comprising:

searching, based on an IP address extracted from a field of a first packet received by the packet-filtering appliance, the second index data structure for rule identifiers of rules, of the second plurality of rules, applicable to the first packet; and storing, based on the searching and in an order sorted by associated rule priorities, a first rule identifier associated with a first internal node, of the plurality of internal nodes, and a second rule identifier associated with the first internal node.

10. The method of claim 1, wherein the searching comprises:

determining, in a first processing thread and by searching a set data structure based on a value extracted from a first packet of the plurality of packets, whether the flat hash map index data structure comprises a first key corresponding to the value from the first packet;

initiating, in a second processing thread executing concurrently with the first processing thread, a search of the flat hash map index data structure based on the value extracted from the first packet; and terminating, based on determining in the first processing thread that the flat hash map index data structure lacks a key corresponding to the value extracted from the first packet, the search of the flat hash map index data structure.

11. A packet-filtering appliance comprising:
one or more processors; and
memory storing instructions that, when executed by one or more processors, configure the packet-filtering appliance to:
receive a plurality of packets transmitted from one or more hosts in a first network to one or more hosts in a second network, wherein:
the packet-filtering appliance is located at a boundary between the first network and the second network and stores a flat hash map index data structure associated with a plurality of rules of a cybersecurity policy enforced by the packet-filtering appliance,
each rule, of the plurality of rules, comprises matching criteria that indicate one or more threat indicators associated with packets to which the rule applies, and
the flat hash map index data structure comprises a plurality of keys mapped to a plurality of rule identifiers, each of the rule identifiers corresponds to a rule of the plurality of rules, and each of the keys comprises a value incrementally generated based on portions of a threat indicator from matching criteria of a rule corresponding to a rule identifier to which the key is mapped;
extract values from fields of the received plurality of packets and search the flat hash map index data structure for rule identifiers of rules applicable, based on the extracted values, to the received plurality of packets, wherein each of the extracted values comprises a domain name, and wherein the searching comprises, for each packet of the received plurality of packets:
for each label of a plurality of labels of the domain name extracted from the packet, generating a value, based on the label, for a portion of the extracted value that comprises the label,
comparing each of the generated values to keys of the flat hash map index data structure, and
determining, based on the comparing of the generated values to the keys of the flat hash map index data structure, whether one or more rules of the plurality of rules is applicable to the packet; and
for one or more packets of the plurality of packets, apply one or more rules, of the plurality of rules, determined to be applicable to the one or more packets, wherein the applying comprises one or more of: blocking or dropping a packet, forwarding a packet, logging a packet, capturing a packet, redirecting or re-routing a packet, modifying or transforming a packet, or generating or sending a response to a packet.

12. The packet-filtering appliance of claim 11, wherein, for each packet of the plurality of packets, the generating a value comprises:
generating a hash of a first label indicating a top level domain of the domain name extracted from the packet, and
for each additional label of one or more additional labels indicating one or more subdomains of the domain name extracted from the packet, generating, based on the additional label, a hash for a portion of the domain name comprising the additional label and the top level domain.

13. The packet-filtering appliance of claim 11, wherein, for each packet of the plurality of packets, the generating a value comprises:
generating a lossless compression of a first label indicating a top level domain of the domain name extracted from the packet, and
for each additional label of one or more additional labels indicating one or more subdomains of the domain name extracted from the packet, generating, based on the additional label, a lossless compression for a portion of the domain name comprising the additional label and the top level domain.

14. The packet-filtering appliance of claim 11, wherein the value extracted from a first packet of the one or more packets comprises a Uniform Resource Locator (URL) comprising a domain name as a host portion and comprising a path portion having one or more path segments, and wherein the generating a value comprises, for the first packet:
for each path segment of the one or more path segments, generating a hash, based on the path segment, for a portion of the URL that comprises the path segment and the domain name of the URL.

15. The packet-filtering appliance of claim 11, wherein the flat hash map index data structure comprises:
keys that comprise values incrementally generated based on threat indicators having only domain names, and
keys that comprise values incrementally generated based on threat indicators having Uniform Resource Locators (URLs) having domain name portions and path portions.

16. The packet-filtering appliance of claim 11, wherein the packet-filtering appliance stores a second flat hash map index data structure associated with a second plurality of rules of the cybersecurity policy, and wherein:
the plurality of keys, of the flat hash map index data structure, are associated with threat indicators comprising domain names having a first characteristic, and
the second flat hash map index data structure comprises a second plurality of keys, mapped to a second plurality of rule identifiers, that comprise values incrementally generated based on portions of threat indicators from matching criteria comprising domain names having a second characteristic different from the first characteristic.

17. The packet-filtering appliance of claim 11, wherein the packet-filtering appliance stores a second index data structure associated with a second plurality of rules of the cybersecurity policy, wherein the second index data structure comprises a plurality of internal nodes, and wherein, for each internal node of the plurality of internal nodes:
the internal node comprises a first bit array, a second bit array, and one or more pointers,
the first bit array comprises elements mapped to possible values of a k-bit chunk of a search object, each of the first bit array elements storing a value that indicates, for the possible value mapped to the first bit array element, one of: a presence of a corresponding descendant internal node, of the plurality of internal nodes, or an absence of a corresponding descendant internal node,
the second bit array comprises elements mapped to possible values of the k-bit chunk and to possible values of portions of the k-bit chunk, each of the second bit array elements storing a value that indicates, for the possible value mapped to the second bit array element, one of:
the presence of one or more corresponding rule identifiers or an absence of corresponding rule identifiers, and the one or more pointers indicate a memory location associated with one or more rule identifiers that correspond to the k-bit chunk.

18. The packet-filtering appliance of claim 17, wherein the second index data structure maps keys, comprising at least portions of Internet Protocol (IP) addresses, to rule identifiers of the second plurality of rules, and wherein the instructions, when executed by one or more processors, configure the packet-filtering appliance to:
search, based on an IP address extracted from a field of a first packet received by the packet-filtering appliance, the second index data structure for rule identifiers of rules, of the second plurality of rules, applicable to the first packet; and
store, based on the searching and in an order sorted by associated rule priorities, a first rule identifier associated with a first internal node, of the plurality of internal nodes, and a second rule identifier associated with a second internal node, of the plurality of internal nodes, that is a descendant node of the first internal node.

19. The packet-filtering appliance of claim 17, wherein the second index data structure maps keys, comprising at least portions Internet Protocol (IP) addresses, to rule identifiers of the second plurality of rules, and wherein the instructions, when executed by one or more processors, configure the packet-filtering appliance to:
search, based on an IP address extracted from a field of a first packet received by the packet-filtering appliance, the second index data structure for rule identifiers of rules, of the second plurality of rules, applicable to the first packet; and
store, based on the searching and in an order sorted by associated rule priorities, a first rule identifier associated with a first internal node, of the plurality of internal nodes, and a second rule identifier associated with the first internal node.

20. The packet-filtering appliance of claim 11,
wherein the searching comprises:
determining, in a first processing thread and by searching a set data structure based on a value extracted from a first packet of the plurality of packets, whether the flat hash map index data structure comprises a first key corresponding to the value from the first packet;
initiating, in a second processing thread executing concurrently with the first processing thread, a search of the flat hash map index data structure based on the value extracted from the first packet; and
terminating, based on determining in the first processing thread that the flat hash map index data structure lacks a key corresponding to the value extracted from the first packet, the search of the flat hash map index data structure.

21. One or more non-transitory computer-readable media comprising stored instructions that, when executed by one or more processors of a packet-filtering appliance, configure the packet-filtering appliance to:
receive a plurality of packets transmitted from one or more hosts in a first network to one or more hosts in a second network, wherein:
the packet-filtering appliance is located at a boundary between the first network and the second network and stores a flat hash map index data structure associated with a plurality of rules of a cybersecurity policy enforced by the packet-filtering appliance,
each rule, of the plurality of rules, comprises matching criteria that indicate one or more threat indicators associated with packets to which the rule applies, and
the flat hash map index data structure comprises a plurality of keys mapped to a plurality of rule identifiers, each of the rule identifiers corresponds to a rule of the plurality of rules, and each of the keys comprises a value incrementally generated based on portions of a threat indicator from matching criteria of a rule corresponding to a rule identifier to which the key is mapped;
extract values from fields of the received plurality of packets and search the flat hash map index data structure for rule identifiers of rules applicable, based on the extracted values, to the received plurality of packets, wherein each of the extracted values comprises a domain name, and wherein the searching comprises, for each packet of the received plurality of packets:
for each label of a plurality of labels of the domain name extracted from the packet, generating a value, based on the label, for a portion of the extracted value that comprises the label,
comparing each of the generated values to keys of the flat hash map index data structure, and
determining, based on the comparing of the generated values to the keys of the flat hash map index data structure, whether one or more rules of the plurality of rules is applicable to the packet; and
for one or more packets of the plurality of packets, apply one or more rules, of the plurality of rules, determined to be applicable to the one or more packets, wherein the applying comprises one or more of: blocking or dropping a packet, forwarding a packet, logging a packet, capturing a packet, re-directing or re-routing a packet, modifying or transforming a packet, or generating or sending a response to a packet.

22. The one or more non-transitory computer-readable media of claim 21, wherein, for each packet of the plurality of packets, the generating a value comprises:
generating a hash of a first label indicating a top level domain of the domain name extracted from the packet, and
for each additional label of one or more additional labels indicating one or more subdomains of the domain name extracted from the packet, generating, based on the additional label, a hash for a portion of the domain name comprising the additional label and the top level domain.

23. The one or more non-transitory computer-readable media of claim 21, wherein, for each packet of the plurality of packets, the generating a value comprises:
generating a lossless compression of a first label indicating a top level domain of the domain name extracted from the packet, and
for each additional label of one or more additional labels indicating one or more subdomains of the domain name extracted from the packet, generating, based on the additional label, a lossless compression for a portion of the domain name comprising the additional label and the top level domain.

24. The one or more non-transitory computer-readable media of claim 21, wherein the value extracted from a first packet of the one or more packets comprises a Uniform Resource Locator (URL) comprising a domain name as a host portion and comprising a path portion having one or more path segments, and wherein the generating a value comprises, for the first packet:

for each path segment of the one or more path segments, generating a hash, based on the path segment, for a portion of the URL that comprises the path segment and the domain name of the URL.

25. The one or more non-transitory computer-readable media of claim 21, wherein the flat hash map index data structure comprises:

keys that comprise values incrementally generated based on threat indicators having only domain names, and keys that comprise values incrementally generated based on threat indicators having Uniform Resource Locators (URLs) having domain name portions and path portions.

26. The one or more non-transitory computer-readable media of claim 21, wherein the packet-filtering appliance stores a second flat hash map index data structure associated with a second plurality of rules of the cybersecurity policy, and wherein:

the plurality of keys, of the flat hash map index data structure, are associated with threat indicators comprising domain names having a first characteristic, and the second flat hash map index data structure comprises a second plurality of keys, mapped to a second plurality of rule identifiers, that comprise values incrementally generated based on portions of threat indicators from matching criteria comprising domain names having a second characteristic different from the first characteristic.

27. The one or more non-transitory computer-readable media of claim 21, wherein the packet-filtering appliance stores a second index data structure associated with a second plurality of rules of the cybersecurity policy, wherein the second index data structure comprises a plurality of internal nodes, and wherein, for each internal node of the plurality of internal nodes:

the internal node comprises a first bit array, a second bit array, and one or more pointers, the first bit array comprises elements mapped to possible values of a k-bit chunk of a search object, each of the first bit array elements storing a value that indicates, for the possible value mapped to the first bit array element, one of: a presence of a corresponding descendant internal node, of the plurality of internal nodes, or an absence of a corresponding descendant internal node, the second bit array comprises elements mapped to possible values of the k-bit chunk and to possible values of portions of the k-bit chunk, each of the second bit array elements storing a value that indicates, for the possible value mapped to the second bit array element, one of: the presence of one or more corresponding rule identifiers or an absence of corresponding rule identifiers, and the one or more pointers indicate a memory location associated with one or more rule identifiers that correspond to the k-bit chunk.

28. The one or more non-transitory computer-readable media of claim 27, wherein the second index data structure maps keys, comprising at least portions of Internet Protocol (IP) addresses, to rule identifiers of the second plurality of rules, and wherein the instructions, when executed by one or more processors, configure the packet-filtering appliance to:

search, based on an IP address extracted from a field of a first packet received by the packet-filtering appliance, the second index data structure for rule identifiers of rules, of the second plurality of rules, applicable to the first packet; and store, based on the searching and in an order sorted by associated rule priorities, a first rule identifier associated with a first internal node, of the plurality of internal nodes, and a second rule identifier associated with a second internal node, of the plurality of internal nodes, that is a descendant node of the first internal node.

29. The one or more non-transitory computer-readable media of claim 27, wherein the second index data structure maps keys, comprising at least portions Internet Protocol (IP) addresses, to rule identifiers of the second plurality of rules, and wherein the instructions, when executed by one or more processors, configure the packet-filtering appliance to:

search, based on an IP address extracted from a field of a first packet received by the packet-filtering appliance, the second index data structure for rule identifiers of rules, of the second plurality of rules, applicable to the first packet; and store, based on the searching and in an order sorted by associated rule priorities, a first rule identifier associated with a first internal node, of the plurality of internal nodes, and a second rule identifier associated with the first internal node.

30. The one or more non-transitory computer-readable media of claim 21, wherein the searching comprises:

determining, in a first processing thread and by searching a set data structure based on a value extracted from a first packet of the plurality of packets, whether the flat hash map index data structure comprises a first key corresponding to the value from the first packet;

initiating, in a second processing thread executing concurrently with the first processing thread, a search of the flat hash map index data structure based on the value extracted from the first packet; and terminating, based on determining in the first processing thread that the flat hash map index data structure lacks a key corresponding to the value extracted from the first packet, the search of the flat hash map index data structure.

* * * * *